United States Patent [19]

McJohnson

[11] 3,986,000
[45] Oct. 12, 1976

[54] LOGARITHMICALLY NORMALIZED CROSS-CORRELATION BAR-CODE READER

[75] Inventor: Robert B. McJohnson, Dallas, Tex.

[73] Assignee: Recognition Equipment Incorporated, Dallas, Tex.

[22] Filed: Aug. 1, 1975

[21] Appl. No.: 601,317

[52] U.S. Cl. .......................... 235/61.11 E; 235/181
[51] Int. Cl.² ..................... G06K 7/08; G06F 15/34
[58] Field of Search .............. 235/61.11 E, 61.11 D, 235/61.9 R, 61.7 R, 181; 325/42; 360/32; 340/146.3 Z

[56] References Cited
UNITED STATES PATENTS

| | | | |
|---|---|---|---|
| 3,646,333 | 2/1972 | Pryor | 235/181 |
| 3,688,955 | 9/1972 | L'Huillier | 340/146.3 Z |
| 3,703,628 | 11/1972 | Philipson | 235/61.9 R |
| 3,717,756 | 2/1973 | Stitt | 235/181 |
| 3,806,807 | 4/1974 | Nakamura | 325/42 |
| 3,899,666 | 8/1975 | Bolger | 235/181 |
| 3,949,206 | 4/1976 | Edwards | 325/42 |

*Primary Examiner*—Daryl W. Cook
*Assistant Examiner*—Robert M. Kilgore

[57] ABSTRACT

Bar-code data is read in the presence of noise. An analog output signal from a bar-code sensor has amplitude variations dependent upon the presence and absence of bars as well as upon differences in backgrounds upon which the bars are printed. The output signal is normalized to minimize variations therein, and the normalized signal in turn is converted to a digital signal at a sample interval small compared to the period of the known waveform. An expected response to each bar is of a known waveform. A digital reference set is stored which represents products formed by multiplying each quantization level of the digital signal by each sample of the known waveform taken at the sample interval. For each sample interval along the output signal, members of the reference set are selected dependent upon the sample interval of the known waveform and the corresponding amplitude of the digital signal, and summed to form one point of a correlation output function. The correlation output function in turn is continuously sensed for the presence of predetermined bar dependent characteristics.

18 Claims, 24 Drawing Figures

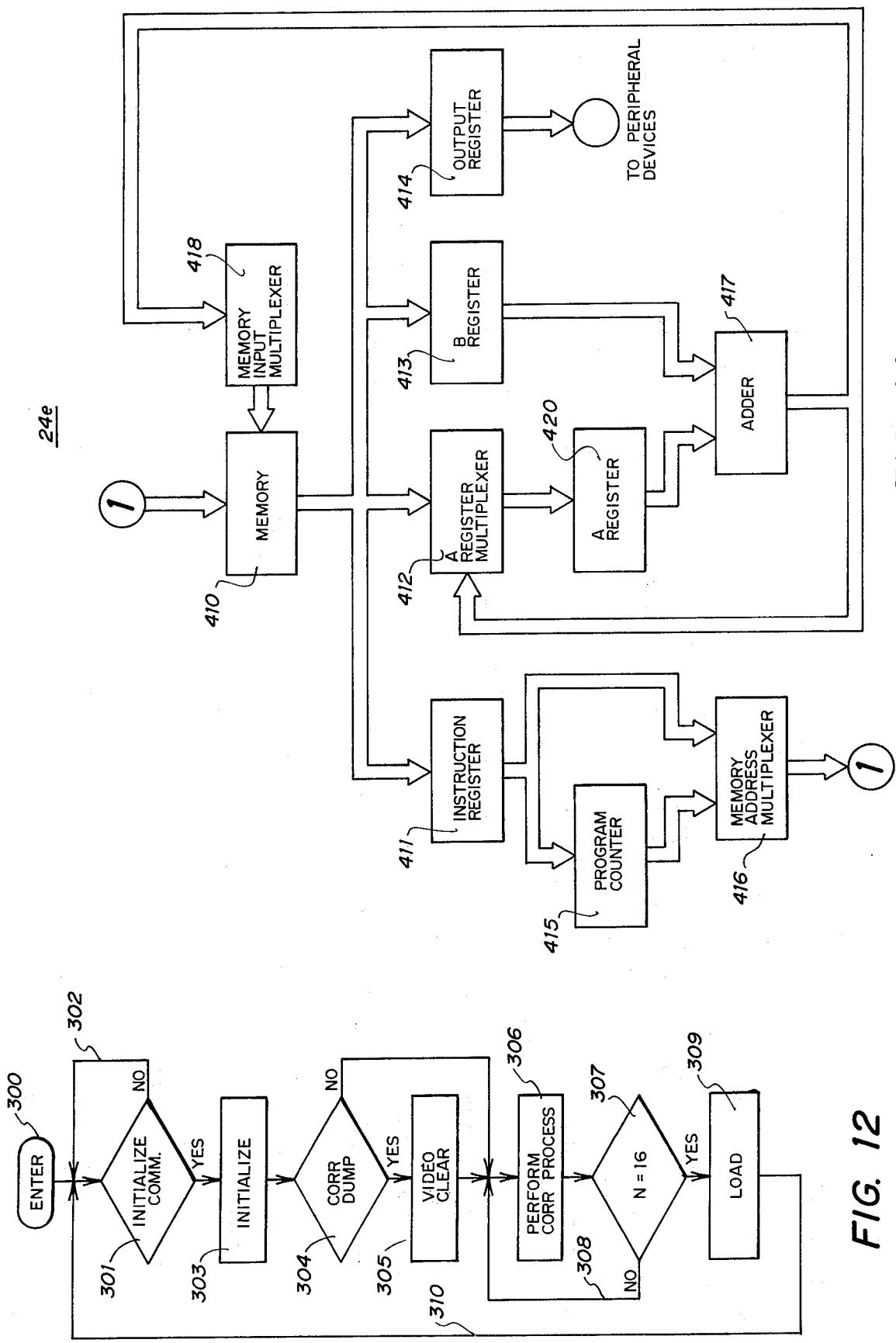

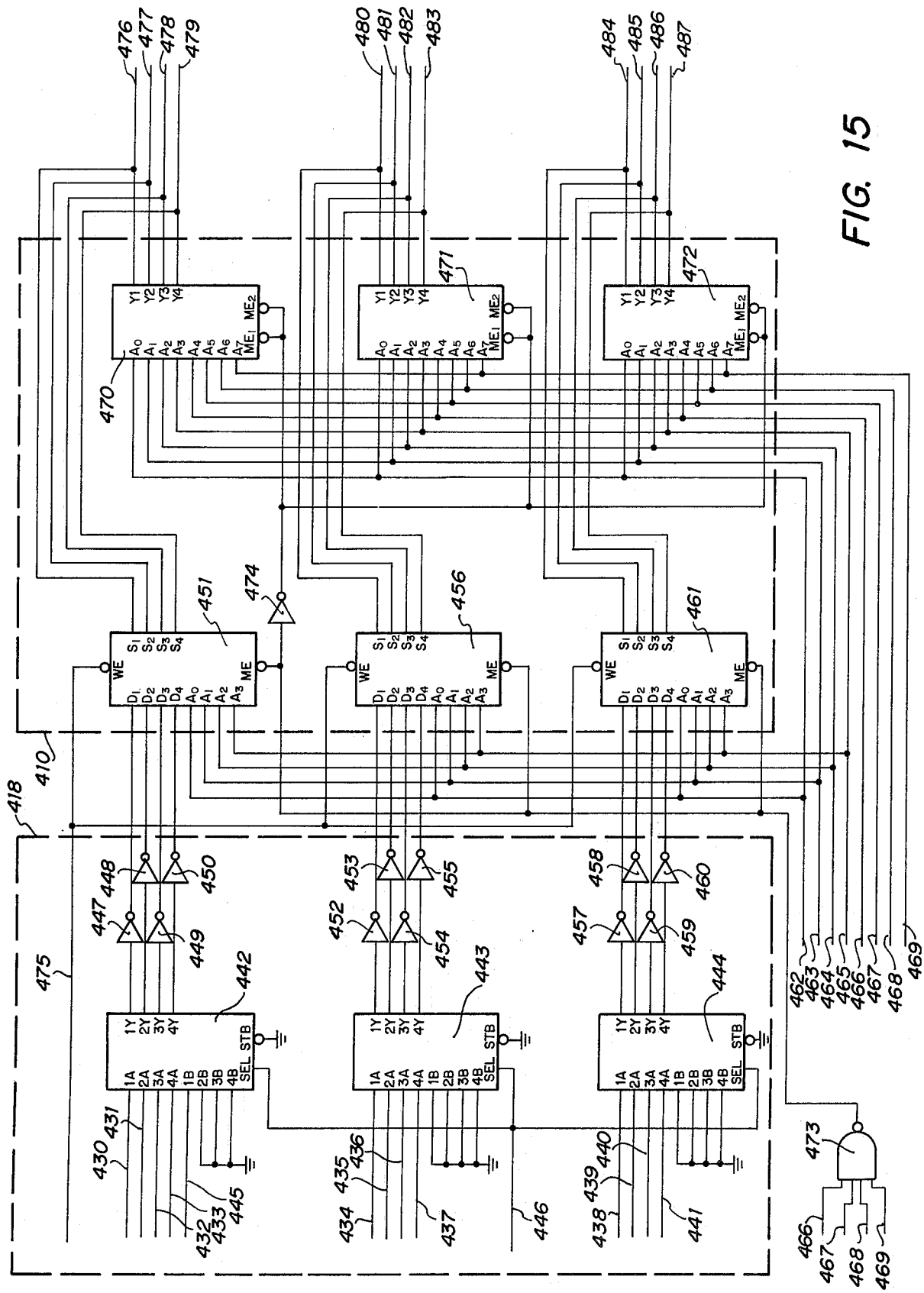

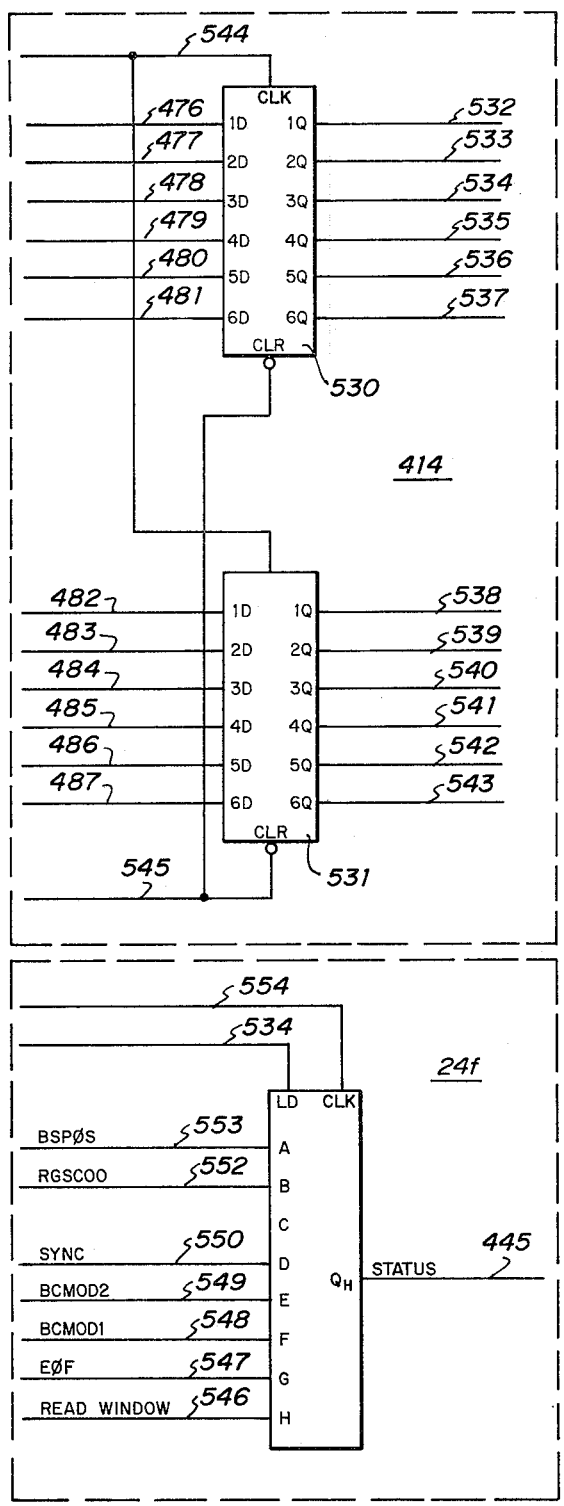
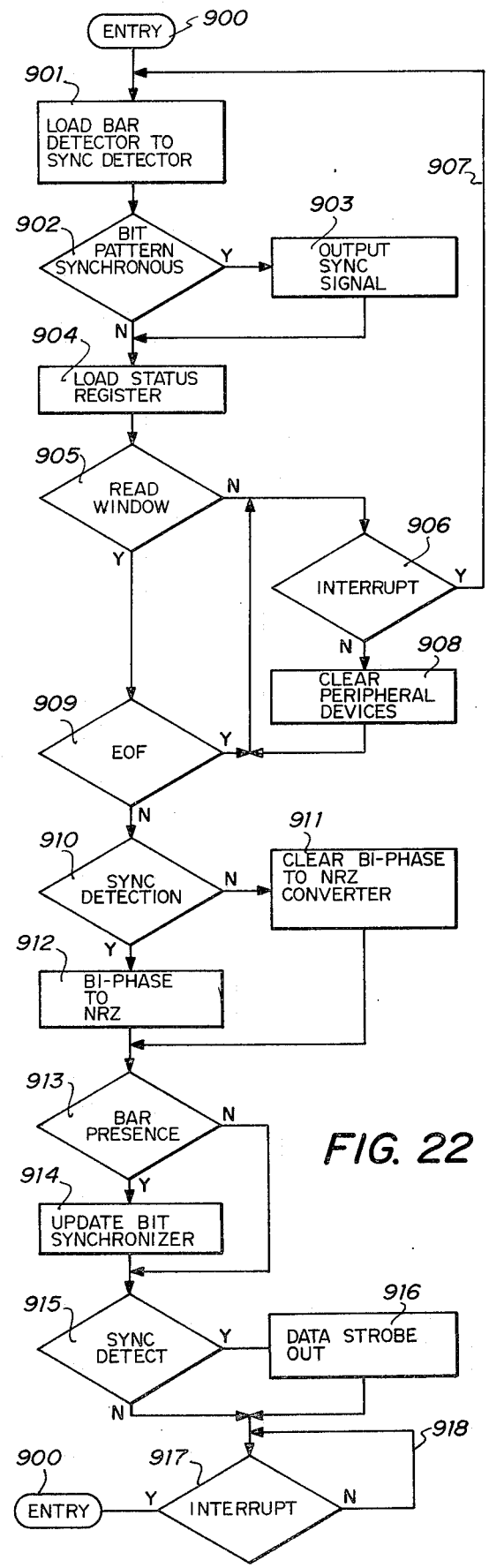
FIG. 18
FIG. 22

LOGARITHMICALLY NORMALIZED CROSS-CORRELATION BAR-CODE READER

FIELD OF THE INVENTION

This invention relates to bar code recognition, and more particularly to a cross-correlation bar-code reader for detecting a bar font imprinted on a document, wherein an array of such bars represents encoded information.

DESCRIPTION OF THE PRIOR ART

Document processing systems have employed small magnetic ink character recognition (MICR) devices for well over a decade. The function performed by such devices typically involves the lifting of data printed on a document, and the printing of encoded data on the document in a MICR format to facilitate high speed data processing.

Systems for sorting high velocity trains of documents also include optical character recognition readers (OCR) to provide a redundant reading system and thus decrease the occurrence of read errors. Data thus read from a document is said to be captured, and in many operations the data then is reprinted upon the face or back of the document in magnetic ink during a first sort operation. Subsequent transactions may require high-speed sorting.

To further simplify high-speed sorting of documents, magnetic ink bar-codes representing the captured information in machine readable form are also printed on the document as disclosed in U.S. Pat. No. 3,703,628 and co-pending application Ser. No. 448,458, filed Mar. 6, 1974 now abandoned. Such bar-codes also are printed on documents in light absorptive, flourescent and phosphorescent inks.

Bar code systems in addition have been used in stand alone operations for the repeated sorting and classification of large quantities of encoded documents. Bar-code reader systems also are used where the bar-codes serve as an escort memory for encoded information in addition to the encoded representations of the original document data. Such escort memory serves to preserve the original data captured, to accommodate the insertion of other data into the coded stream, and to provide a capability for further processing with reduced reject rates and less expensive stand alone systems.

The reliability of prior bar-code readers in detecting encoded information, however, has been affected by the occurrence of noise in the reader data channel. The present invention provides a cross-correlation bar-code reader which reliably extracts the information signal in a noisy channel, and thus provides a significant improvement over the prior art readers.

SUMMARY OF THE INVENTION

In accordance with the present invention, an electrical signal representative of a bar-encoded data field is logarithmically normalized to minimize variations in amplitude. The normalized signal then is digitized and operated upon by a digital correlator to remove high frequency noise and maximize the signal-to-noise ratio. Bar detection is accomplished by comparing the resulting correlation function against height and width thresholds.

In one aspect of the invention, a set of points comprising the correlation function is generated within the time period of an electrical signal representation of a bar in an encoded data field.

In a further aspect of the invention, synchronization between the bar-code reading system and an electrical signal representation of either a bar-no-bar or bi-phase modulated bar-code data field is accomplished by changing the time-phase relationship of the reading system to coincide with that of the incoming video signal, and comparing resident synchronization patterns with bar detection patterns generated in reading the bar-encoded data field.

More specifically, analog output signals from a bar-code sensor include bar responses of a known waveform and have amplitude variations dependent upon presence and absence of bars as well as upon differences in backgrounds upon which the bars are printed. The output signals are normalized to minimize amplitude variations therein, and the normalized signals in turn are converted to digital signals at a sample interval small compared to the period of the known waveform. A digital reference set of products is stored which is formed by multiplying each quantization level of the digital signals by each sample of the known waveform taken at the sample interval. For each such sample interval along an output signal, members of the reference set are selected dependent upon the sample interval of the known waveform and the corresponding amplitudes of the digital signals and summed to form one point of a correlation output function. The correlation output function is continuously sensed for the presence of predetermined bar dependent characteristics.

DESCRIPTION OF THE DRAWINGS

For a more complete understanding of the present invention and for further objects and advantages thereof, reference may now be had to the following description taken in conjunction with the accompanying drawings in which:

FIG. 12 is a logic flow diagram of the correlation process performed by the correlator of FIGS. 10 and 11;

FIG. 14 is a functional block diagram of a microprocessor comprising a component part of the data processor of FIG. 3;

FIGS. 15–18 comprise an electrical schematic diagram of the microprocessor of FIG. 14.

FIG. 22 is a logic flow diagram of the operations of the bar-code reading system of FIG. 3 in processing both bar-no-bar and bi-phase modulated data fields.

DESCRIPTION OF PREFERRED EMBODIMENTS

In the capture of bar-coded data printed on a document, an optical sensor in a bar-code reader generates what is termed a raised cosine output signal whenever a single bar of encoded data is passed through registration with the sensor. Thereafter, read operations involve both the detection of either the presence or the absence of a raised cosine pulse, and the decoding of the resulting binary message in accordance with the encoding scheme utilized. If there is no noise present, a simple threshold detector can be used. When noise from numerous sources corrupt the video signal, however, a more powerful detection system must be used to reliably detect the video bar-code signal.

Noise encountered by the bar-code reader system is a random variable with a Gaussian probability distribution function of zero mean. A random signal is one for which values are not known in advance. Randomness may be a consequence of an inability to describe the signal generating process in detail. In other cases such as in bar-code reader systems, however, randomness is intrinsic.

FIG. 1

Figure 1:
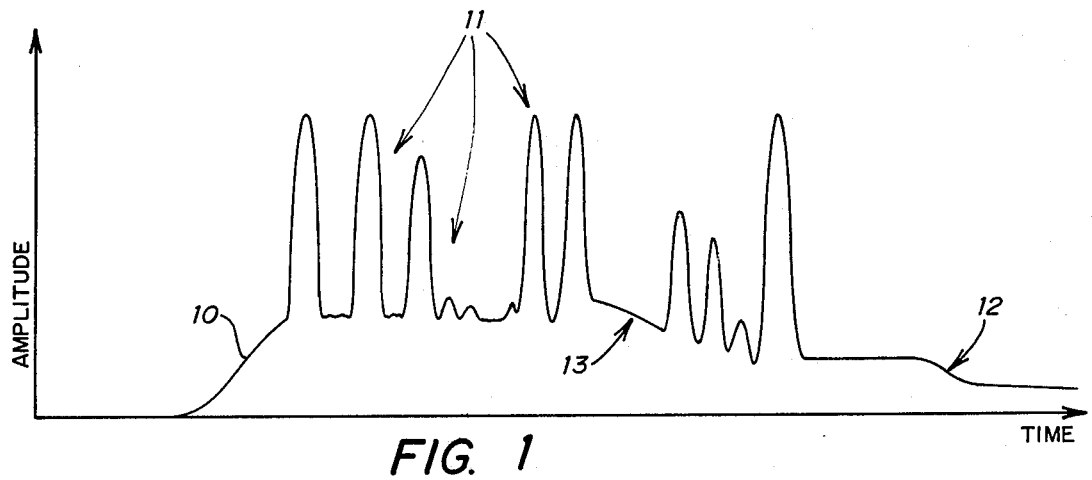
FIG. 1 is an illustration of a video signal generated by a bar-code sensor in a high noise environment.

A video signal generated by a photomultiplier tube of a bar-code reader, with the reader scanning an encoded document in a high noise environment, may be illustrated as shown in FIG. 1. Video signal 10 includes peaks 11 representing individual bar signals in the presence of a lower level and variable noise. A raised portion or pedestal 12 is caused by the occurrence of paper noise. Variance in the magnitudes of the peaks 11 may be caused by the presence of overprint or stamp pad inks on the document surface. Curve portion 13 illustrates the occurrence of a change in pedestal level in the absence of a bar signal. Such a level change also may be caused by the presence of stamp pad inks or other overprints.

It can be shown by analysis that individual bars of an encoded data field printed on a document surface produce a raised cosine pulse in the video signal. A single ideal video bar-code signal B(t) originating at $t=0$, with amplitude A and period $T_B$, is given by:

$$B(t) = 0 \quad , t<0 \quad (1)$$

$$B(t) = \frac{A}{2}[1 - \cos(2\pi t/T_B)] \quad , 0 \leq t \leq T_B$$

$$B(t) = 0 \quad , t > T_B$$

FIG. 2

Figure 2:
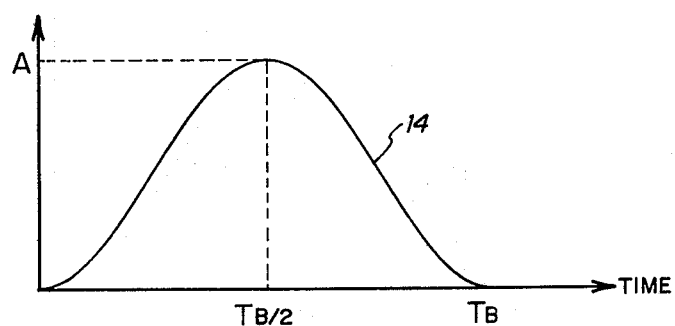
FIG. 2 illustrates a raised cosine representation of a single bar in a bar-coded data field.

FIG. 2 illustrates a video bar-code signal represented by Equation I, where the shape of curve 14 is that of a raised cosine pulse.

A bar-code reader must detect a signal such as that illustrated in FIG. 2, even though the signal may appear in a noisy environment as illustrated in FIG. 1. The presence or absence of a bar signal must be detected during some interval of time, and a prediction of duration and position of a next bar signal must be generated based on immediate past bar signal occurrences.

A bar-code reader has only one opportunity to detect a bar comprising a part of an encoded bar array, and thus may not rely on a repetitive time pattern as may occur in other information systems. The shape of the pulse illustrated in FIG. 2 is utilized as a known condition upon which to base the detection of a bar.

Two criteria typically used as figures of merit in the design of a communication system are maximum fidelity and maximum signal-to-noise ratio. Maximum fidelity is achieved in a system having minimum mean-square error. When signal shape is known and only detection thereof is required, the system may be designed to maximize signal-to-noise ratio. In a bar-code reader, maximization of the signal-to-noise ratio is the more beneficial of the two criteria.

In a linear time invariant (LTI) system such as the bar code reader disclosed herein having as an input a video signal of a known shape as illustrated by the raised cosine signal of FIG. 2, it is known that a cross-correlation filter achieves maximum signal-to-noise ratio in the presence of ergodic additive Gaussian noise.

Consider a noiseless channel involving an LTI system with excitation $x(t)$, response $y(t)$, and impulse response $h(t)$. Then by defining a memory function $m(t)$ to be $$m(t) = h(-t), \quad (II)$$

the output function or the response of the system is $$y(t) = \int_{-\infty}^{\infty} m(T) x(t+T) dT. \quad (III)$$

Equation III is the cross-correlation between the input signal $x(t)$ and the system memory function $m(t)$.

A noisy channel in which the input signal $x(t)$ has a known shape, and the noise $n_i(t)$ is assumed to be an ergodic Gaussian process, may be represented as follows:

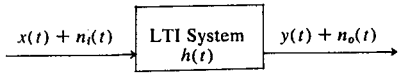

The output or response of the system may be represented by $[y(t) \times n_o(t)]$ in which $n_o(t)$ is the noise component of the output signal.

In the frequency domain, the correlation of signals is identified with multiplication of related spectra. It is clear, therefore, that significant correlation will occur with the noise pedestal 12 as illustrated in FIG. 1. Such a correlation yields a variable level in a correlator output that is highly undesirable. The presence of low frequency pedestal 12 thus necessitates a signal conditioning before bar detection reliably may be made.

FIG. 3

Figure 3:
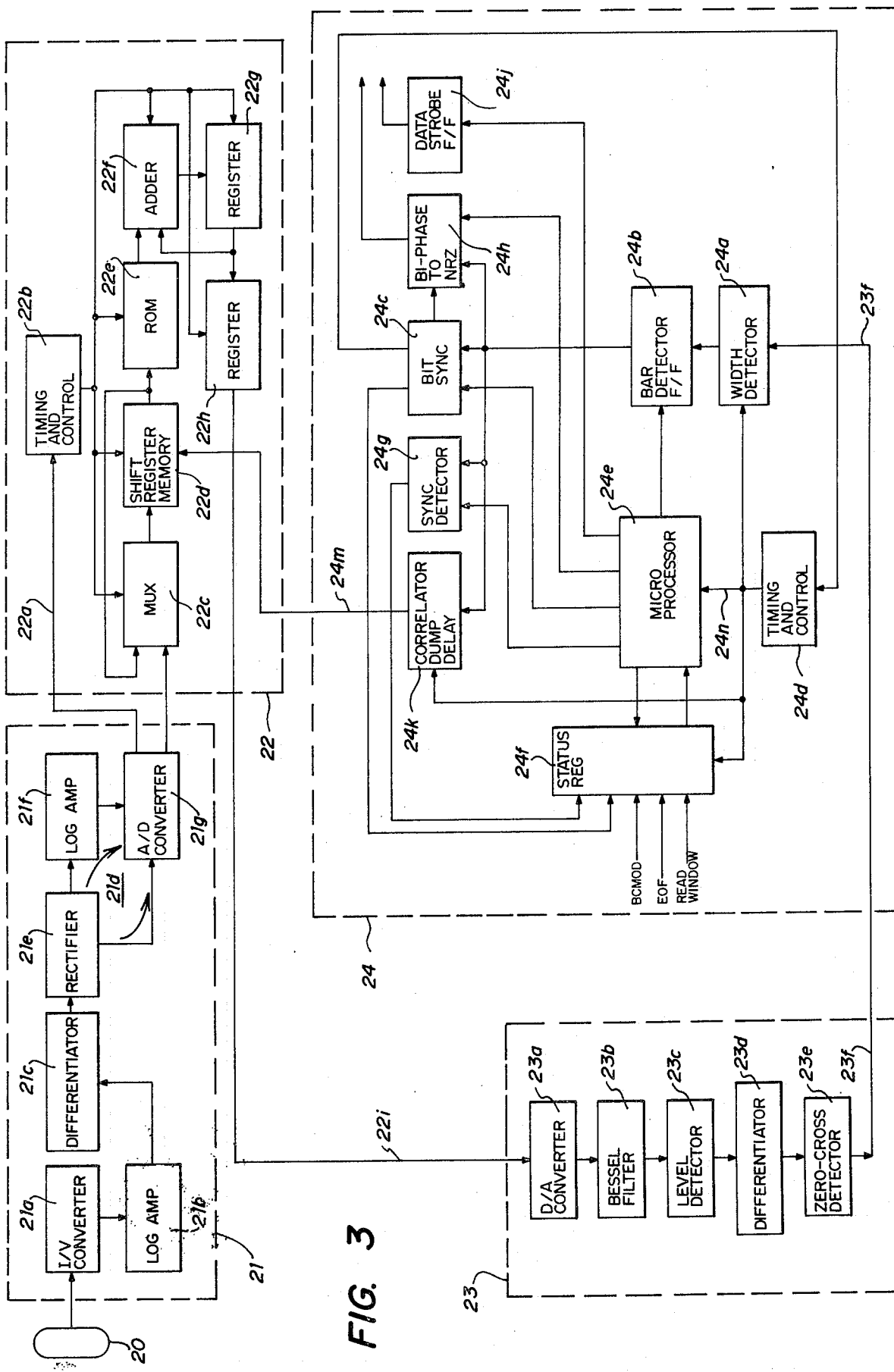
FIG. 3 is a functional block diagram of a bar-code reading system embodying the invention herein disclosed.

FIG. 3 illustrates a cross-correlator bar-code reader comprising a photomultiplier tube 20, a signal conditioner 21, a correlator 22, a bar detector 23 and a data processor 24. When a document passes in registration with tube 20, light is emitted from the flourescent bars on the surface of the document and sensed by the tube. A signal generated thereby is transmitted to a current-/voltage converter 21a of signal conditioner 21.

Where flourescent ink is used in printing bar-code formats on the surface of a document, the flourescent ink must be excited by a light source in the ultra-violet region. This excitation causes electrons in the outer valence bands to gain enough energy to jump to a higher band. As electrons return to their stable valence bands, they lose the absorbed energy in the form of narrow-band light. This flourescent process is highly dependent upon the relative strength of the excitation. On dark documents much of the excitation is absorbed by the document, and less energy is available to excite the flourescent bar-codes. Thus, although an eight or ten to one variation in signal levels is sensed by the photomultiplier tube 20, a more constant level needs to be presented to the reader electronics for reliable bar detection.

To provide a more constant signal, a logarithmic amplifier 21b is placed in the signal path following converter 21a. The logarithmic amplifier performs a normalizing operation upon the video signal to minimize the variations in signal strength due to differing background colors. More particularly, the output signal of converter 21a is a positive signal composed of a $\cos^2 x$ waveform superimposed on a noise pedestal caused by paper flourescence. The logarithmic amplifier is biased to normalize a 20 to 1 variation at the input to a 4 to 1 variation at the output. Thus, strong signals from white document backgrounds are attenuated, while weak signals from dark backgrounds are amplified.

Since pedestal 12 of the video signal 10 of FIG. 1 constitutes a low frequency content caused by paper flourescence, a high pass or differentiation filter may be used to remove such low frequencies. Although high frequency noise is enhanced by differentiation, such noise is effectively suppressed by correlator 22 as will be described below.

The low frequency content of the normalized signal from amplifier 21b is removed by a differentiator 21c, and the resulting signal is processed in circuits 21d to supply an output to correlator 22. Differentiation of the normalized signal involves differentiation of the raised cosine bar signals, FIG. 2, into sine signals. As the frequency spectra of pedestal 12 will, except for extremely unusual cases, be disjoint with the sine pulse spectra, a low value correlation function will be generated by correlator 22 in processing the remaining pedestal signal.

Processor circuits 21d include in serial connection an absolute value rectifier 21e, a logarithmic amplifier 21f and an A/D converter 21g. Circuits 21d reduce the bar-to-bar variation in signal strength due to noise caused by background patterns or stamp pad inks which have overprinted the encoded data to be read. Since the output of differentiator 21c is a bi-polar signal relative to ground level, the bar-to-bar variations may be reduced by first rectifying the signal with rectifier 21e to provide both an absolute value and a sign to distinguish the positive and negative half-waves. The absolute value output of rectifier 21e passes to amplifier 21f, where the signal is normalized to reduce the bar-to-bar variations. More particularly, as there is no longer any pedestal voltage in the video signal, the small video bar signals near ground level are attenuated much less than the higher level video signals. As above mentioned, a 20 to 1 variation at the input of amplifier 21f may yield a 4 to 1 variation at the output of the amplifier.

The normalized output of amplifier 21f and the sign output of rectifier 21e are applied to converter 21g, where the normalized signal is digitized for output to a multiplexer 22c of correlator 22. The signal conditioning process being complete, the video signal next is operated upon by correlator 22.

Correlator 22 includes a timing and control (T/C) system 22b having outputs connected as inputs to each component of a serial circuit comprising a multiplexer 22c, a shift-register memory 22d, a read only memory (ROM) 22e, an adder 22f, a register 22g and a register 22h. To complete correlator 22, the output of memory 22d is connected to the input of multiplexer 22c, and the output of register 22g is connected to the input of adder 22f.

The output of amplifier 21f is digitized into one of 16 possible discrete values by A/D converter 21g, which issues interrupt signals on conductor 22a leading to T/C system 22b of correlator 22. T/C system 22b controls the transfer of the output of converter 21g through multiplexer 22c for storage in shift-register memory 22d.

Successive sets of 16 discrete values of an expected video signal are stored as four bit words in the memory of T/C system 22b, and may be represented by the equation:

$$m(t) = [\log (\sin 2\pi t/T_B)] [sgn (\pi - 2\pi t/T_B)], \quad \text{(IV)}$$

where $sgn\ u = 1, u < 0$ $$= -1, u > 0.$$

ROM 22e stores as a digital reference set products obtained by multiplying each of 16 discrete values representing the memory function, $m(t)$, by each of the possible 16 discrete values representing an input video signal stored in memory 22d.

T/C system 22b controls the four most significant bits of ROM 22e which is an eight bit addressing ROM. The four most significant bits specify the time position of the discrete value of the memory function being correlated with a current video discrete value represented by the four bit output of memory 22d. The 16 discrete values stored in memory 22d are used serially in combination with the T/C signals from system 22b to address a particular product in ROM 22e. Each of the 16 values stored in memory 22d cause a corresponding product stored in ROM 22e to be transferred to adder 22f.

Under the control of the T/C system 22b, adder 22f and register 22g sum the products, and the sum is stored in register 22g. After the last of the 16 discrete values stored in memory 22d have addressed ROM 22e, the sum as an output from register 22g is shifted to output register 22h and transmitted to bar detector 23. Each such output of register 22h represents one data point of a correlation function generated by correlator 22.

FIG. 4

Figure 4:
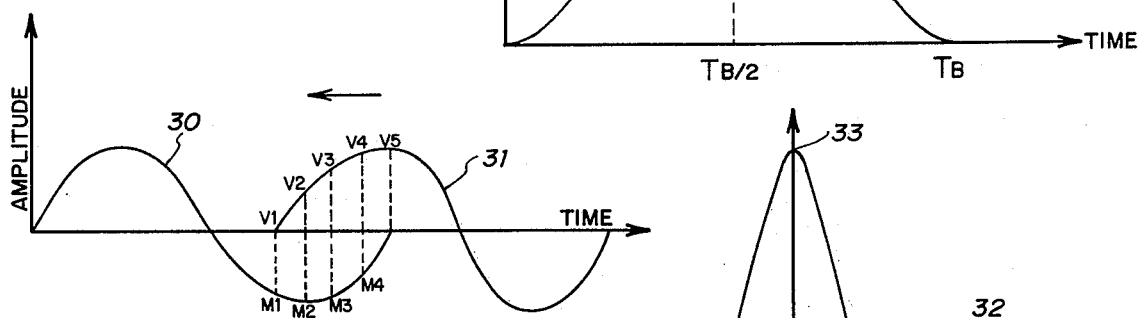
FIG. 4 is an illustration of the relative positions of a resident memory function and an input video waveform at a point in time during a correlation process.

To more fully understand the correlation operation, reference is made to FIG. 4, where there is illustrated a waveform 30 representing an expected video waveform or memory function $m(t)$. This function approximates a sine wave one cylce of which may be digitized into 16 discrete values for correlation with an input video waveform 31. Waveform 31 in turn is stored as 16 discrete values in memory 22d of FIG. 3. As waveform 31 is shifted in the direction of arrow 31a step by step, an equation representing the cross-correlation between waveforms 30 and 31 may be solved by multiplying the overlapping discrete values and summing the products. In the well known cross-correlation equation:

$$y(t) = \int_{-\infty}^{+\infty} m(T) x (t+T) dT, \quad (V)$$

$y(t)$ is the correlation function, $m(T)$ is the stored memory function, and $x(t+T)$ is a delayed input video waveform. Since only one cycle of the memory function $m(t)$ is stored for correlation, Equation V may be rewritten as:

$$y(t) = \int_{t_1}^{t_2} m(T) x (t+T) dT, \quad (VI)$$

where $t_2-t_1$ is the period of $m(t)$. At the instant illustrated by FIG. 4, the solution to the correlation Equation VI would be:

$$y = m_1v_1 + m_2v_2 + m_3v_3 + m_4v_4 + m_5v_5 \quad (VII)$$

As the waveform 31 is shifted across the memory function, the correlation process continues. The correlation output will describe a curve having the characteristics illustrated by waveform 32, FIG. 5.

FIG. 5

The correlation equation yields an even function, i.e., waveform 32 is symmetrical about $t = 0$. In addition, the correlation equation also yields orthogonal high order harmonics as illustrated by waveform 34. Such harmonics have a magnitude of zero at a main lobe peak 33. The correlator, therefore, acts as an effective filter in removing high frequency noise.

The correlation function waveform 32 has a width double that of the video signal. In order to operate in real time, therefore, correlator 22 must be reset during the negative peak times of the correlation waveform in a manner hereinafter explained to maintain the same time width as a full-wave input video signal.

Referring again to FIG. 3, the output of register 22h is connected by way of a data line 22i to the input of a D/A converter 23a of bar detector 23. The bar detector is comprised of a serially connected network including converter 23a, a Bessel filter 23b, a level dectector 23c, a differentiator 23d and a zero-cross detector 23e.

Two criteria are used to detect the presence of a bar signal: (1) bar detector 23 tests main lobe 33 of waveform 32 for a height exceeding a threshold value; and (2) data processor 24 tests a differentation of the main lobe 33 for a width exceeding a second threshold value.

Upon receiving a data point on curve 32 from register 22h, D/A converter 23a of bar detector 23 converts the discrete signal into an analog signal which is smoothed by Bessel filter 23b. Level detector 23c then passes that part of the analog signal which exceeds a height threshold to differentiator 23d.

Figure 5:
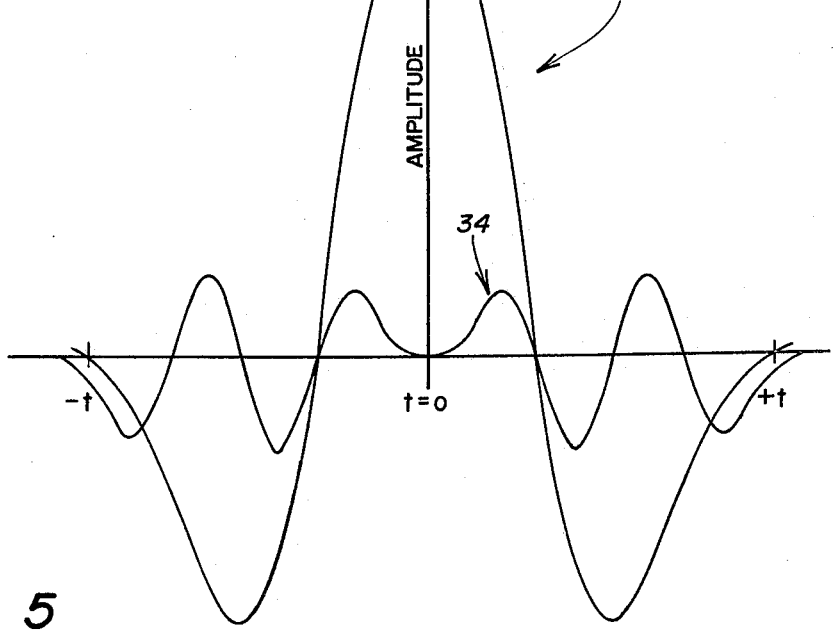
FIG. 5 is an illustration of a correlation function waveform.

The differentiator 23d produces a signal indicating a zero crossing at a time corresponding to the peak 33, FIG. 5. The zero crossing signal is detected by zero-cross detector 23e to provide an indication of the exact time position of peak 33. The output of detector 23e is applied by a data line 23f to data processor 24.

Data processor 24 not only indicates the presence of a bar but also provides a bit synchronization, reader electronics synchronization, demodulation of bar-code data to NRZ (non-return-to-zero) data, a signal for resetting correlator 22, system timing and clock distribution, an interface with other subsystems, and transfers the NRZ (non-return-to-zero) data and a data strobe to succeeding processing systems. In addition, the data processor 24 enables the bar-code reader when a document is present at a read station, and reinitializes the reader to read successive data fields printed on a single document.

Data processor 24 is comprised of a width detector 24a, a bar detector flip-flop 24b, a free running counter hereinafter referred to as bit synchronizer 24c, a timing and control (T/C) system 24d, a microprocessor 24e, a status register 24f, a synchronization detector 24g, a bi-phase to NRZ converter 24h, a data strobe flip-flop 24j and a correlator dump delay circuit 24k. More particularly, the output of width detector 24a provides a first input to flip-flop 24b. An output of microprocessor 24e provides a second input to flip-flop 24b. The output of flip-flop 24b in turn is applied as an input to bit synchronizer 24c, detector 24g, converter 24h and delay circuit 24k.

Microprocessor 24e also provides inputs to detector 24g, bit synchronizer 24c, converter 24h, flip-flop 24j and status register 24f. Status register 24f receives additional inputs from detector 24g, bit synchronizer 24c and a transport system controller (not shown) peripheral to the reader. The output of register 24f in turn is applied to an input of microprocessor 24e.

Converter 24h receives a second input from synchronizer 24c and provides NRZ data to succeeding processing systems. Flip-flop 24j provides a data strobe to such succeeding systems.

Synchronizer 24c also provides an input to T/C system 24d, providing timing and control inputs to detector 24a, microprocessor 24e, status register 24f and delay circuit 24k.

Upon receiving an amplitude detection signal from detector 23e, the signal is further processed by width detector 24a of data processor 24. Unless the signal is of sufficient width, there is no output from detector 24a. If the main lobe of the correlation signal waveform conforms to both the amplitude test of detector 23c and the width test of detector 24a, the output of detector 24a sets bar-detector flip-flop 24b to indicate a bar decision.

Upon the occurrence of a bar decision, correlator dump delay circuit 24k is initialized. Circuit 24k in turn issues a signal on a data line 24m to clear the last eight of sixteen word locations in memory 22d of correlator 22. Delay circuit 24k is a shift register which shifts under the control of T/C system 24d.

Upon the occurrence of a next positive transition of the most significant bit of bit synchronizer 24c, an interrupt is generated by T/C system 24d along line 24n to microprocessor 24e. The microprocessor in turn issues a load command to a status register 24f.

Status register 24f is a parallel input, serial output register which upon receiving a load command, stores an output of bit synchronizer 24c indicating whether a bar has occured in the first or second half of an expected bar time interval, an output of synchronization detector 24g indicating whether the reader electronics are synchronized with the incoming video signal, a two-bit code (BCMOD) indicating the type of bar-code modulation occurring in the input video signal, an EOF signal indicating the end of a reading process relative to a field of data on a document, and a Read Window signal indicating the presence of a document within the field of view of the reader. The BCMOD, EOF and Read Window signals are generated by a transport system controller which controls the interface between the bar-code reader and succeeding subsystems.

Microprocessor 24e operates upon the output of register 24f to determine the status of the bar-code reading system. If a Read Window signal is detected, indicating the presence of a document at the read station, a test is made for an EOF signal. If a Read Window Signal is not present, no further processing is performed by a microprocessor 24e until a succeeding interrupt is received from bit synchronizer 24c. Further, microprocessor 24e enters into a wait state if there is an EOF signal present. However, if a Read Window signal is present and there is no EOF signal, then the microprocessor tests for the type of bar-code modulation selected to process the input video signal.

The microprocessor next tests for synchronization between the reader and the input video signal. In the preferred embodiment described herein, each document is presumed to have two data fields per line, with each data field having ten to twelve precursor synchronizing bars. The detection of any four of six successive synchronization bars signals the occurrence of synchronization. If synchronization exists, the microprocessor resets converter 24h to perform a bi-phase to NRZ demodulation. Finally, microprocessor 24e energizes data strobe flip-flop 24j, and the data strobe and NRZ data from converter 24h are transmitted to a succeeding system for further processing.

In operation, bar encoded information is continually captured by a bar code sensor at the bar information rate, and processed at the capture rate by signal conditioner 21, correlator 22, bar detector 23 and data processor 24 to provide in combination a real time cross-correlation bar code reader.

FIG. 6

Figure 6:
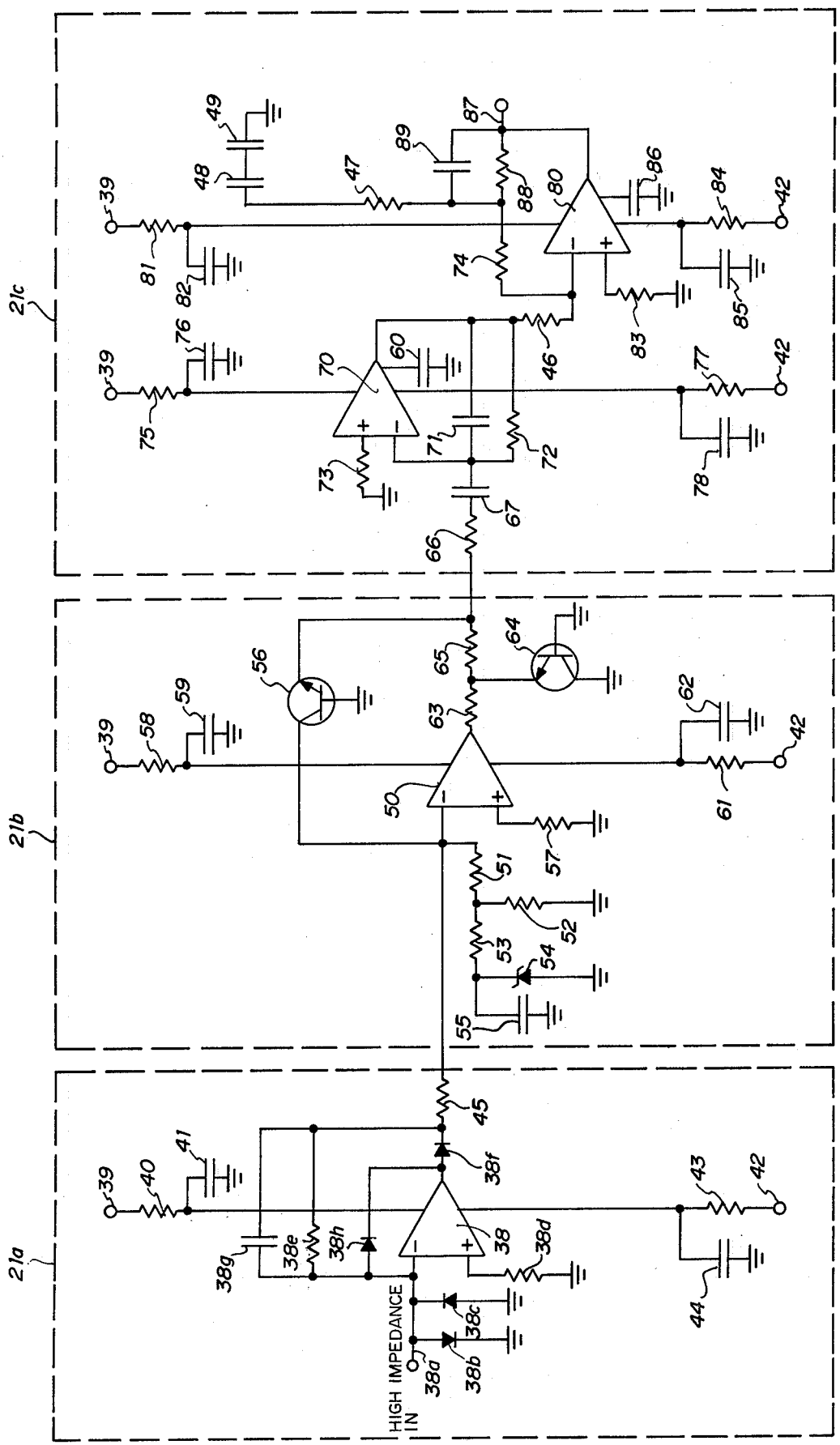
FIGS. 6–8 comprise an electrical schematic diagram of the signal conditioner of FIG. 3.

FIGS. 6–22 provide a more detailed illustration of the system of FIG. 3. FIG. 6 illustrates the current/voltage converter 21a, the logarithmic amplifier 21b and the differentiator 21c, with an input video signal received from a high impedance source along line 38a and applied to the negative input of a differential amplifier 38. Line 38a in addition is connected to the anode of a diode 38b and the cathode of a diode 38c, with the cathode of diode 38b and the anode of diode 38c each connected to ground.

The positive input terminal of amplifier 38 is connected to ground through a 150 K-ohm resistor 38d. The negative input terminal is connected through a 150 K-ohm resistor 38e to the cathode of a diode 38f, through a 10 picofarad capacitor 38g to the cathode of diode 38f, and directly to the anode of a diode 38h. The output of amplifier 38 is applied to the anode of diode 38f and the cathode of diode 38h.

A positive power input to amplifier 38 is provided by a positive 15 volt source 39 through a 47 ohm resistor 40. Positive source 39 also is applied through resistor 40 to a first terminal of a one microfarad capacitor 41 having a second terminal connected to ground. The negative power input to amplifier 38 in like manner is provided by a negative 15 volt source 42 through a 47 ohm resistor 43. Negative source 42 also is applied through a one microfarad capacitor 44 to ground. Amplifier 38, connected as above-described, performs a current to voltage conversion upon a video input signal applied by way of line 38a.

The cathode of diode 38f is connected through a 5.6 K-ohm resistor 45 to the negative input of a differential amplifier 50. The negative input also is connected through a 22 K-ohm resistor 51 and 2.2 K-ohm resistor 52 to ground, and through resistor 51 and a 120 K-ohm resistor 53 to the cathode of a Zener diode 54 and to a first terminal of a one microfarad capacitor 55. The anode of diode 54 and a second terminal of capacitor 55 are each connected to ground.

The negative terminal of amplifier 50 further is connected to the collector of an NPN transistor 56, while the positive input of the amplifier is connected through a one K-ohm resistor 57 to ground. Positive power is supplied to amplifier 50 from the positive source 39, which is applied through a 47 ohm resistor 58 to the positive power input of amplifier 50. Positive source 39 also is connected through resistor 58 and a one microfarad capacitor 59 to ground. Negative power is supplied to amplifier 50 by negative source 42, which is fed through a 47 ohm resistor 61 to the negative power input of amplifier 50. Negative source 42 in addition is applied through resistor 61 and a one microfarad capacitor 62 to ground.

The output of amplifier 50 is connected through a 100 ohm resistor 63 to the emitter of an NPN transistor 64, and through resistor 63 and a 100 ohm resistor 65 to the emitter of transistor 56. The base of transistor 56 is at ground potential, as is both the base and the collector of transistor 64. Amplifier 50, and transistors 56 and 64 together with their associated networks form logarithmic amplifier 21b.

The emitter of transistor 56 also is connected through a 3.74 K-ohm resistor 66 and a 470 picofarad capacitor 67 to the negative input of a differential amplifier 70. The negative input in turn is connected through a 68 picofarad capacitor 71 to the output of the amplifier, and through a 27 K-ohm resistor 72 to the output of the amplifier. The positive input of amplifier 70 is connected through a 27 K-ohm resistor 73 to ground, while a frequency compensation input is connected through a 30 picofarad capacitor 60 to ground.

The positive power input to amplifier 70 is provided by positive source 39, which is applied through a 47 ohm resistor 75 to the positive power input of amplifier 70. Positive source 39 also is connected through resistor 75 and a one microfarad capacitor 76 to ground. The negative power input to amplifier 70 is connected through a 47 ohm resistor 77 to negative source 43, and further connected through a one microfarad capacitor 78 to ground.

The output of amplifier 70 also is connected through a 10 K-ohm resistor 46 to the negative input of a differential amplifier 80. The positive input of amplifier 80 is connected through a 5.1 K-ohm resistor 83 to ground, while the negative input further is connected through a 10 K-ohm resistor 74 and a 33 K-ohm resistor 88 to the output of the amplifier. The negative input also is connected through resistor 74 and a 56 picofarad capacitor 89 to the output of the amplifier. Connected to a node intermediate to resistors 74 and 88 is a first terminal of a 560 ohm resistor 47, the second terminal of which is serially connected through a one microfarad capacitor 48 and a one microfarad capacitor 49 to ground.

Positive source 39 is connected through a 47 ohm resistor 81 to the positive power input of amplifier 80, and through resistor 81 and a one microfarad capacitor 82 to ground. In addition, negatiive source 42 is connected through a 47 ohm resistor 84 to the negative power input of amplifier 80 and through resistor 84 and a one microfarad capacitor 85 to ground. A frequency compensation input to amplifier 80 is connected through a 30 picofarad capacitor 86 to ground.

Amplifier 70 and its associated circuitry performs a differentiation operation upon the input video signal, while amplifier 80 and its associated circuitry constitutes a gain stage for the output of amplifier 70. The differentiator and gain stage together constitute differentiator 21c.

FIG. 7

Figure 7:
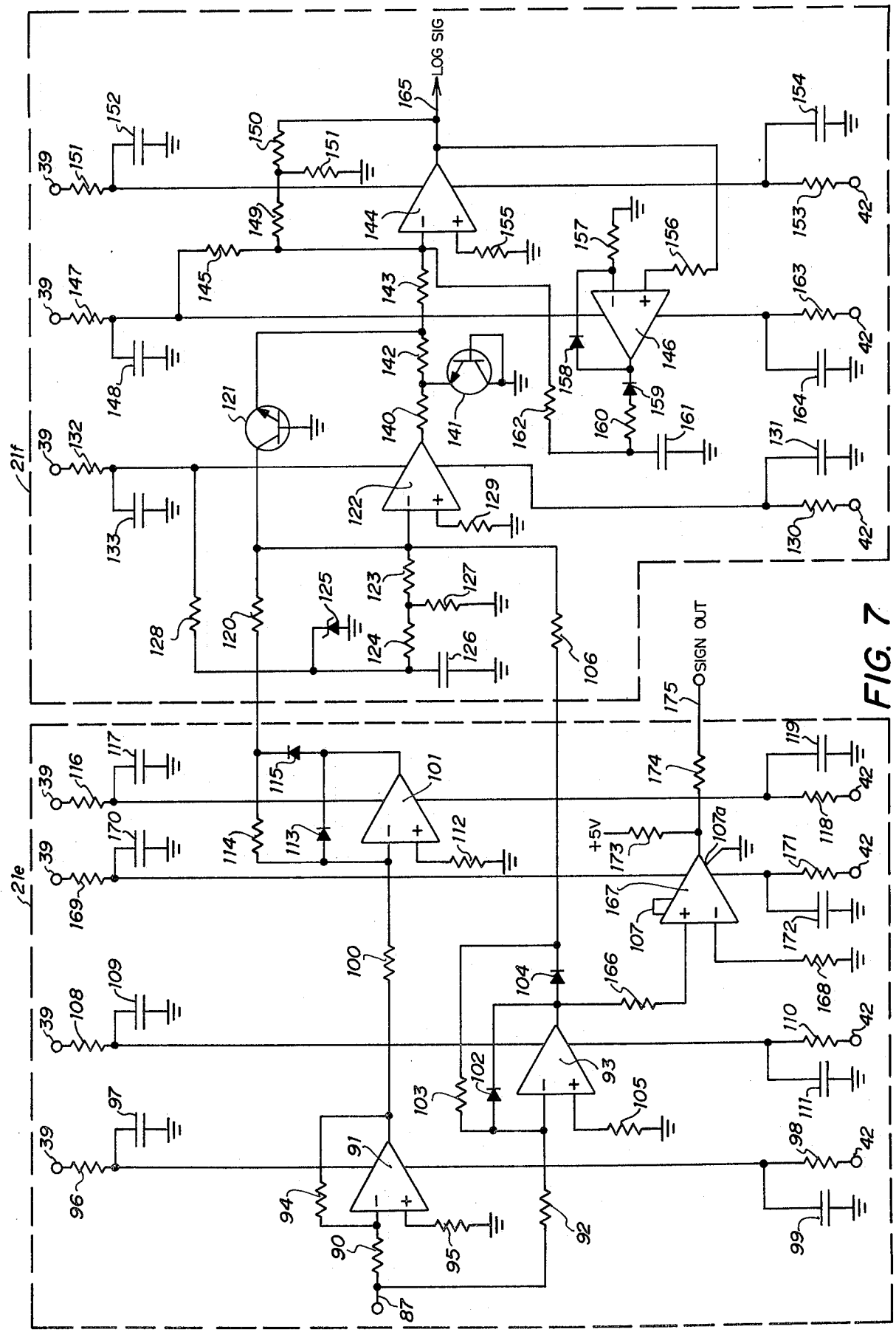

The output of amplifier 80 is applied along a conducting line 87 and through a 10 K-ohm resistor 90 to the negative input of a differentiating amplifier 91 of FIG. 7. The negative input of amplifier 91 also is connected through a 10 K-ohm resistor 94 to the output of the amplifier, while the positive input of the amplifier is connected through a 5.1 K-ohm resistor 95 to ground.

Positive source 39 is applied through a 47 ohm resistor 96 to the positive power input of amplifier 91, and through resistor 96 and a one microfarad capacitor 97 to ground. Negataive source 42 in turn is applied through a 47 ohm resistor 98 to the negative power input of amplifier 91, and through resistor 98 and a one microfarad capacitor 99 to ground. The output of amplifier 91 is applied through a 10 K-ohm resistor 100 to the negative input of a differentiating amplifier 101. The output of amplifier 80 is further applied by way of line 87 and through a 10 K-ohm resistor 92 to the negative input of a differentiating amplifier 93.

The negative input to amplifier 93 also is connected to the anode of a diode 102, and through a 10 K-ohm resistor 103 to the cathode of a diode 104. The positive input to amplifier 93 is connected through a 5.1 K-ohm resistor 105 to ground. The output of amplifier in turn is connected to the cathode of diode 102, the anode of diode 104, and through a one K-ohm resistor 166 to the positive input of a differential amplifier 167.

Positive source 39 is applied through a 47 ohm resistor 108 to the positive power input of amplifier 93, and through resistor 108 and a one microfarad capacitor 109 to ground. Negative source 42 in like manner is applied through a 47 ohm resistor 110 to the negative power input of amplifier 93, and through resistor 110 and a one microfarad capacitor 111 to ground.

Referring to amplifier 101, the positive input of the amplifier is connected through a 5.1 K-ohm resistor 112 to ground, while the negative input is connected to the anode of a diode 113 and through a 10 K-ohm resistor 114 to the cathode of a diode 115. The output of amplifier 101 in turn is applied to the cathode of diode 113, and to the anode of diode 115.

Positive source 39 is applied through a 47 ohm resistor 116 to the positive power input of amplifier 101, and through resistor 116 and a one microfarad capacitor 117 to ground. Negative source 42 likewise is applied through a 47 ohm resistor 118 to the negative power input of amplifier 101, and through resistor 118 and a one microfarad capacitor 119 to ground.

The cathode of diode 115 also is connected through a 5.1 K-ohm resistor 120 to the collector of an NPN transistor 121, and through resistor 120 to the negative input of a differential amplifier 122. In addition, the cathode of diode 104 is connected through a 5.1 K-ohm resistor 106 to the negative input of amplifier 122, the positive input of which is connected through a one K-ohm resistor 129 to ground. The negative input further is connected through a 22 K-ohm resistor 123 and a 120 K-ohm resistor 124 to a first terminal of a capacitor 126 and to the cathode of a Zener diode 125. The anode of diode 125 and a second terminal of capacitor 126 are each connected to ground. Connected at a node intermediate to resistors 124 and 123 is one terminal of a 2.2 K-ohm resistor 127 having a second terminal connected to ground.

The cathode of diode 125 is connected through a 4.7 K-ohm resistor 128 to the positive power input of amplifier 122, and through a 47 ohm resistor 132 to positive source 39. Positive source 39 further is applied through resistor 132 to a first terminal of a one microfarad capacitor 133 having a second terminal connected to ground. The negative power input of amplifier 122 is connected through a 47 ohm resistor 130 to negative source 42, and directly to a first terminal of a one microfarad capacitor 131 having a second terminal connected to ground.

The output of amplifier 122 is connected through a 330 ohm resistor 140 to the emitter of an NPN transistor 141, the base of which is connected to its collector and to ground. The emitter of transistor 141 also is connected through a 330 ohm resistor 142 to the emitter of a transistor 121, and through resistor 142 and a 15 K-ohm resistor 143 to the negative input of a differential amplifier 144.

The negative input to differential amplifier 144 further is connected through a 330 K-ohm resistor 145 to the positive power input of a differential amplifier 146. The positive power input also is connected through a 47 ohm resistor 147 to positive source 39, and to a first terminal of a one microfarad capacitor 148 having a second terminal connected to ground.

The negative input to amplifier 144 additionally is connected through a 15 K-ohm resistor 149 and a 15 K-ohm resistor 150 to the output of the amplifier. Connected to a node intermediate to resistors 149 and 150 is a first terminal of a 3.3 K-ohm resistor 151 having a second terminal connected to ground. The positive input to amplifier 144 is connected through a 6.8 K-ohm resistor 155 to ground, while the output of the amplifier is applied through a one K-ohm resistor 156 to the positive input of amplifier 146.

Positive source 39 further is applied through a 47 ohm resistor 151 to the positive power input of amplifier 144, and through resistor 151 to a first terminal of a one microfarad capacitor 152 having a second terminal connected to ground. Negative source 42 in turn is connected through a 47 ohm resistor 153 to the negative power input of amplifier 144, and through resistor 153 to a first terminal of a one microfarad capaciitor 154 having a second terminal connected to ground.

The negative input of amplifier 146 is connected through a one K-ohm resistor 157 to ground, and directly to the cathode of diode 158. The output of amplifier 146 is connected to the anode of diode 158 and to the cathode of a diode 159. The anode of diode 159 in turn is connected through a 510 ohm resistor 160 to a first terminal of a one microfarad capacitor 161 having a second terminal connected to ground, and through resistor 160 and a 18 K-ohm resistor 162 to the negative input of amplifier 144.

The negative power input to amplifier 146 is connected through a 47 ohm resistor 163 to negative source 42, and directly to a first terminal of a one microfarad capacitor 164 having a second terminal connected to ground.

Amplifiers 91, 93 and 101 together with their associated circuitry comprise rectifier 21e which serves to rectify the differentiated video signal on line 87. The positive half of the video waveform appears at the output of amplifier 101, while the negative half of the waveform appears at the output of amplifier 93. Both the positive and the negative half waves then are applied to the negative input of amplifier 122, which together with amplifiers 144 and 146, and transistors 121 and 141 comprise logarithmic amplifier 21f. The output of the logarithmic amplifier appears at the output of amplifier 144 and is led by way of conducting line 165 to a differential amplifier 180 of FIG. 8.

Referring again to amplifier 93, the output of the amplifier is connected through a one K-ohm resistor 166 to the positive input of a differential amplifier 167, the negative input of which is applied through a one K-ohm resistor 168 to ground. The positive power input to amplifier 167 is connected through a 47 ohm resistor 169 to positive source 39, and connected directly to a first terminal of a one microfarad capacitor 170 having a second terminal connected to ground. The negative power input of amplifier 167 in turn is connected through a 47 ohm resistor 171 to negative source 42, and directly to a first terminal of a one microfarad capacitor 172 having a second terminal connected to ground. The output of amplifier 167 is connected through a one K-ohm resistor 173 to a +5 volt source, and through a 100 ohm resistor 174 to a conducting line 175.

As the offset balance inputs to amplifier 167 are not used, the two inputs are shorted together by a conducting line 107. A connection to ground at input 107a is required for operation. Amplifier 167 and its associated circuitry generate a sign signal to differentiate between the positive and negative half-waves of an input video signal.

As before described, I/V converter 21a, logarithmic amplifier 21b, differentiator 21c, rectifier 21e and logarithmic amplifier 21f comprise signal conditioner 21, FIG. 3.

In operation, an input video current on line 30 is converted to a voltage with some gain by I/V converter 21a, FIG. 6, and applied to the input of logarithmic amplifier 21b. The base to emitter junction of transistor 56 in the feedback of amplifier 50 provides the logarithmic operation wherein the bar signal variations due to differing background colors are normalized. Transistor 64 and resistors 63 and 65 provide a non-linear frequency compensation to offset non-linear gain and thus stabilize the output of amplifier 50.

The output signal of logarithmic amplifier 21b is applied to differentiator 21c, where amplifier 70 and its associated network provide a differentiation of the logarithmic amplifier 21b output. The differentiated signal is then applied through a gain stage provided by amplifier 80 and its associated network, and subsequently applied to rectifier 21e, FIG. 7.

Rectification is necessary to provide a unipolar signal to the second logarithmic amplifier 21f. Rectifier 21e includes a unity gain inverting stage, the network of amplifier 91, to generate a negative image of the positive half-wave of the signal on line 87. The negative image is then applied to the half-wave rectifying network of amplilfier 101, while the negative half-wave of the signal on line 87 is rectified by the half-wave rectifying network of amplifier 93. Amplifiers 101 and 93 comprise rectifying networks wherein the rectified output is inverted with respect to the input.

The outputs of amplifiers 101 and 93 are presented to the summing junction of amplifier 122 comprising a component part of logarithmic amplifier 21f. The output of amplifier 93 in addition is applied through the network of amplifier 167 to provide a logic one output along line 175 during the negative half-cycle of the input waveform on line 87.

The base-emitter junction of transistor 121 in the feedback amplifier 122 provides a logarithmic operation to normalize bar-to-bar variations in the input signal. Further, as the rectified positive and negative half-waves of the input signal are each applied to the summing junction of amplifier 122, the input signal is in effect recombined to a full-wave rectified signal. Transistor 141 and resistors 140 and 142 provide a non-linear frequency compensation to offset non-linear gain and thus stabilize the output of amplifier 122.

The logarithmic operation performed by amplifier 21f tends to force the output signal to a below-ground potential level. To offset this effect, the logarithmic output is summed with a positive bias applied by way of resistors 147 and 145 to the summing junction of amplifier 144. In addition, an error correcting signal generated by the network of amplifier 146 is also applied to the summing junction of amplifier 144. The feedback loop provided by the network of amplifier 146 generates an error signal to correct the output of amplifier 144 to ground potential. The output of amplifier 144 then is applied by way of line 165 to the input of amplifier 180, FIG. 8.

FIG. 8

Figure 8:
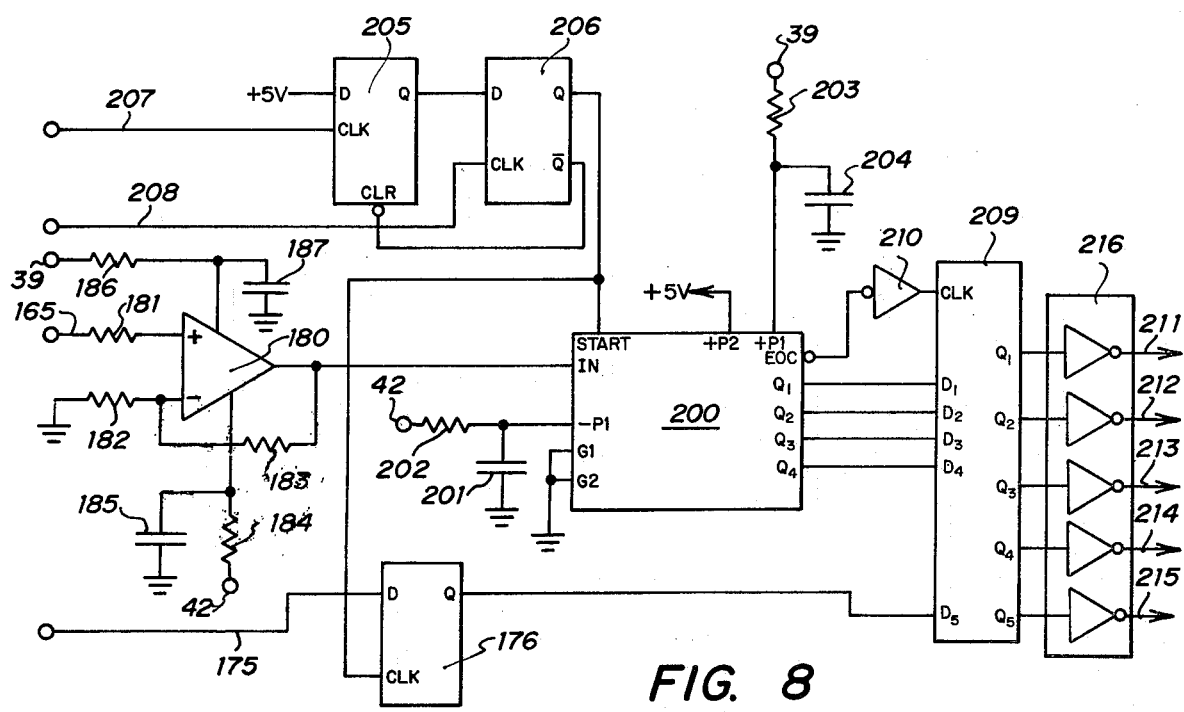

Referring to FIG. 8, the negative input to amplifier 180 is connected through a 6.8 K-ohm resistor 182 to ground, and through a 100 K-ohm resistor 183 to the output of amplifier 180. The negative power input to the amplifier is connected through a 47 ohm resistor 184 to negative source 42, and directly to a first terminal of a one microfarad capacitor 185 having a second terminal connected to ground. The positive power input to amplifier 180 in turn is connected through a 47 ohm resistor 186 to positive source 39, and directly to a first terminal of a one microfarad capacitor 187 having a second terminal connected to ground.

Amplifier 180 and its associated circuitry provide a gain stage for the logarithmic amplifier output along line 165. The output of amplifier 180 is applied to an input (IN) of an A/D converter 200. Ground reference inputs G1 and G2 of converter 200 are shorted together to ground. The negative power input (−P1) is connected to a first terminal of a capacitor 201 having a second terminal connected to ground, and connected through a 10 ohm resistor 202 to negative source 42. The positive power input of the converter (+P1) is connected through a 10 ohm resistor 203 to positive source 39, and is further connected to a first terminal of a one microfarad capacitor 204 having a second terminal connected to ground. A second positive power input (+P2) is connected directly to a +5 volt source.

Converter 200 digitizes the output signal of amplifier 180 upon receiving a start signal provided by a clock network including flip-flops 205 and 206 at its START input. Flip-flop 205 receives at its clock input (CLK) a clock signal along a conducting line 207 having a sample frequency of 211 KHz. This frequency is a multiple harmonic of the bar information rate of 13.2 KHz, which is the information print rate for the embodiment described herein. The D input of flip-flop 205 is connected to a +5 volt source, while the Q output is connected to the D input of flip-flop 206.

The $\overline{Q}$ output of flip-flop 206 is connected to the inverted clear (CLR) input of flip-flop 205, while the Q output is connected to the START input of A/D converter 200 and to the D input of a flip-flop 176. The clock (CLK) input to flip-flop 206 is a 6.76 MHz signal provided by way of conducting line 208.

An inverted end of conversion output (EOC) of converter 200 is a logical low output which is converted to a logical high by an inverter 210, and applied to the clock (CLK) input of latch 209.

In addition, the Q1–Q4 outputs of converter 200 are connected to the D1–D4 inputs of a latch 209, while the D5 input to latch 209 receives a sign designating input from the Q output of a flip-flop 176. The D input of flip-flop 176 is connected by way of line 175 to the output of amplifier 167, while the clock input is connected to the Q output of flip-flop 206.

When an input video signal is being processed, the 211 KHz signal on line 207 sets up a sample frequency for A/D converter 200. Upon a leading edge of the sample frequency, the 5 volt source at the D input of flip-flop 205 is transferred to the Q output of the flip-flop as a logic one level voltage, and applied to the D input of flip-flop 206. Upon the next occurring leading edge of the 6.76 MHz signal on line 208, the D input of flip-flop 206 is transferred to the Q output of that flip-flop. The logic zero occurring at the $\overline{Q}$ output of flip-flop 206 then is inverted and transferred to the CLR input of flip-flop 205, thereby resetting the Q output of flip-flop 205 to a logic zero which is applied to the D input of flip-flop 206. Upon the next occurring leading edge of the 6.76 MHz signal on line 208, the logic zero is transferred to the Q output of flip-flop 206 to generate a start pulse initiating an analog to digital conversion in converter 200.

The output signal of log amplifier 21f, FIG. 7, is thus applied through the gain stage provided by amplifier 180 and digitized by converter 200. The Q1–Q4 outputs of converter 200 thereupon provide a discrete four-bit input to latch 209.

Upon the occurrence of a logic one at the Q output of flip-flop 206, the sign signal appearing on line 175 is clocked through flip-flop 176 and applied to the D5 input of latch 209. In addition, at the end of conversion, converter 200 generates an end of conversion (EOC) signal which is applied through inverter 210 to the clock (CLK) input of latch 209. Latch 209 in turn transfers the four-bit value of the D1–D4 inputs and the sign value at the D5 input to outputs Q1–Q5, respectively, which are applied through inverter bank 216 and along lines 211–215, respectively, to correlator 22.

FIG. 9

Figure 9:
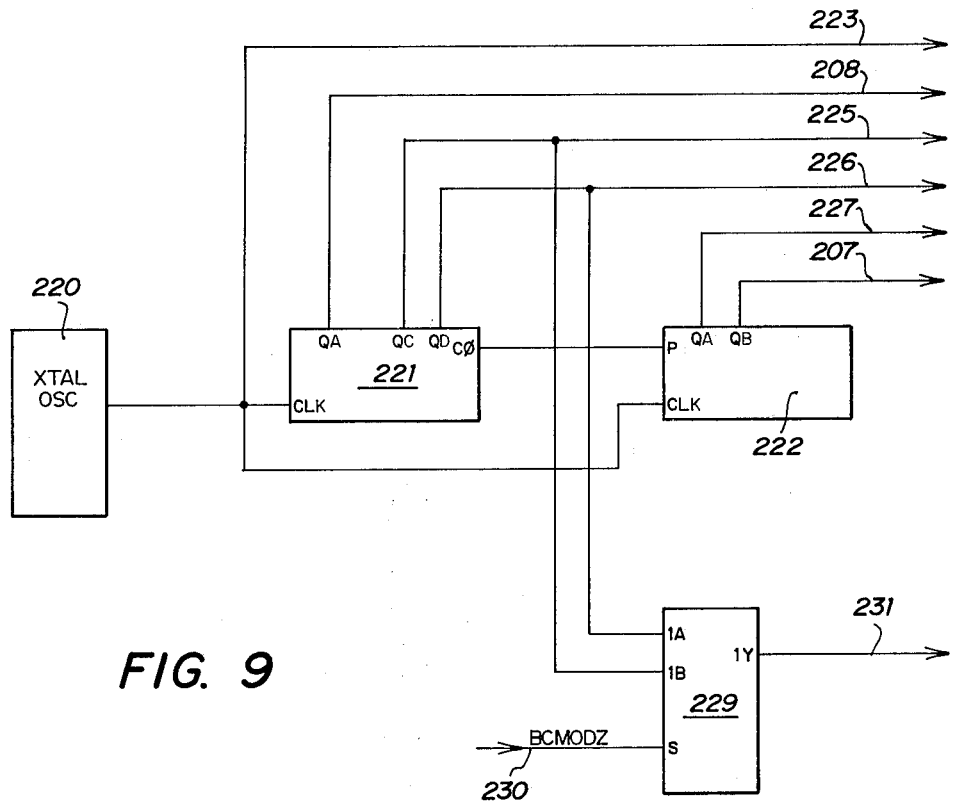
FIG. 9 is a functional block diagram of a clock generation network serving the bar-coded reading system of FIG. 3.

FIG. 9 illustrates the system clock in block diagram form. A crystal oscillator 220 provides a 13.52 MHz signal to the clock inputs of synchronous binary counters 221 and 222, and along a conducting line 223. The carry output (CO) of counter 221 is connected to the P input of binary counter 222 to form a synchronous counter chain, while the QA output of counter 221 provides a 6.76 MHz signal along a conducting line 208. In addition, the QC output provides a 1.70 MHz signal along a conducting line 225, and the QD output provides a 845 KHz signal along a conducting line 226.

The QC and QD outputs of counter 221 also are applied to the 1A and 1B inputs, respectively, of a multiplexer 229 which selects either input depending upon the bar code modulation being used. Such selection is made under the control of a signal (BCMOD2) received at the select input of the multiplexer from the system transport electronics by way of line 230. The output 1Y of multiplexer 229 provides a clock signal along line 231 to the bit synchronizer 24c.

Completing the synchronous counter chain, the QA output of counter 222 provides a 422 KHz signal along line 227, and the QB output provides 211 KHz signal along a conducting line 207.

FIG. 10

Figure 10:
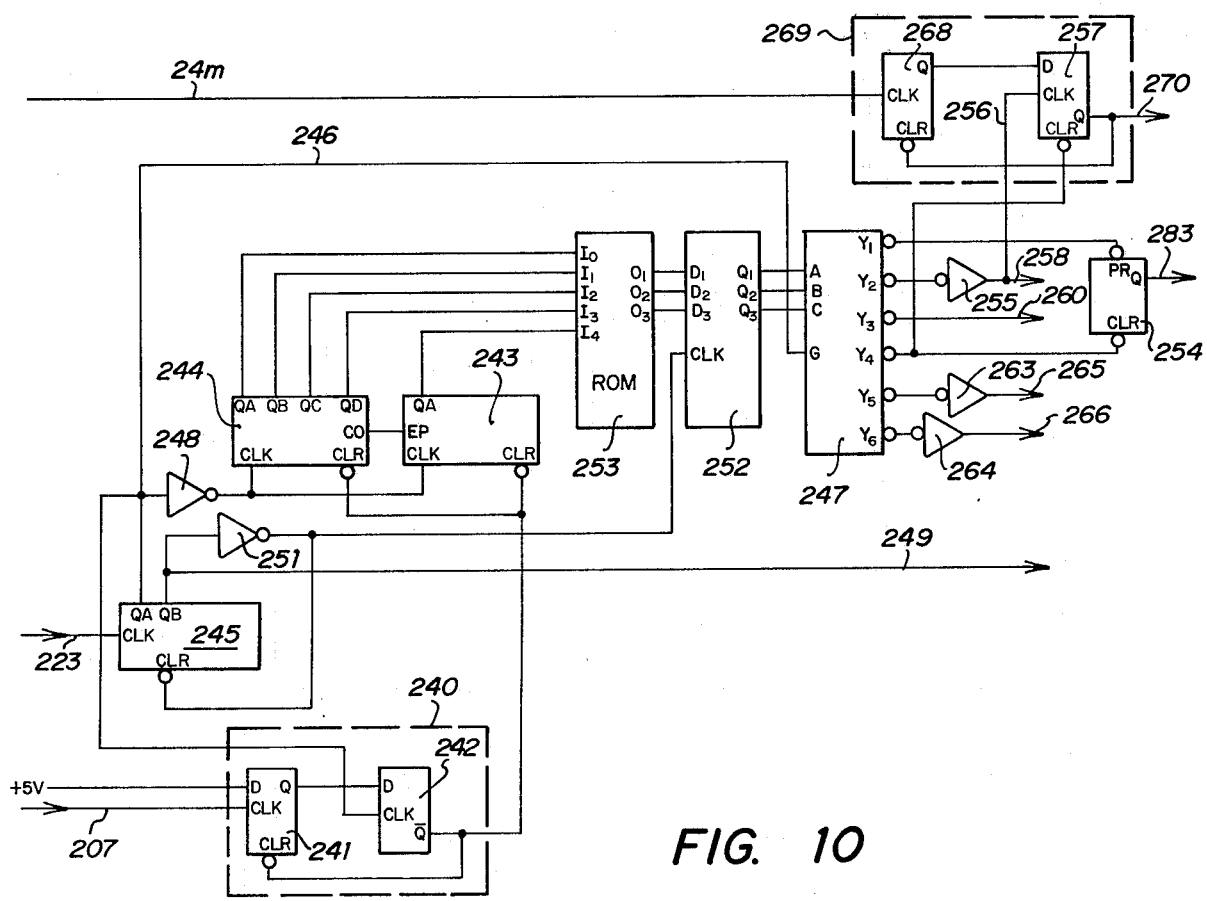
FIGS. 10 and 11 comprise an electrical schematic diagram of the correlator of FIG. 3.
Figure 11:
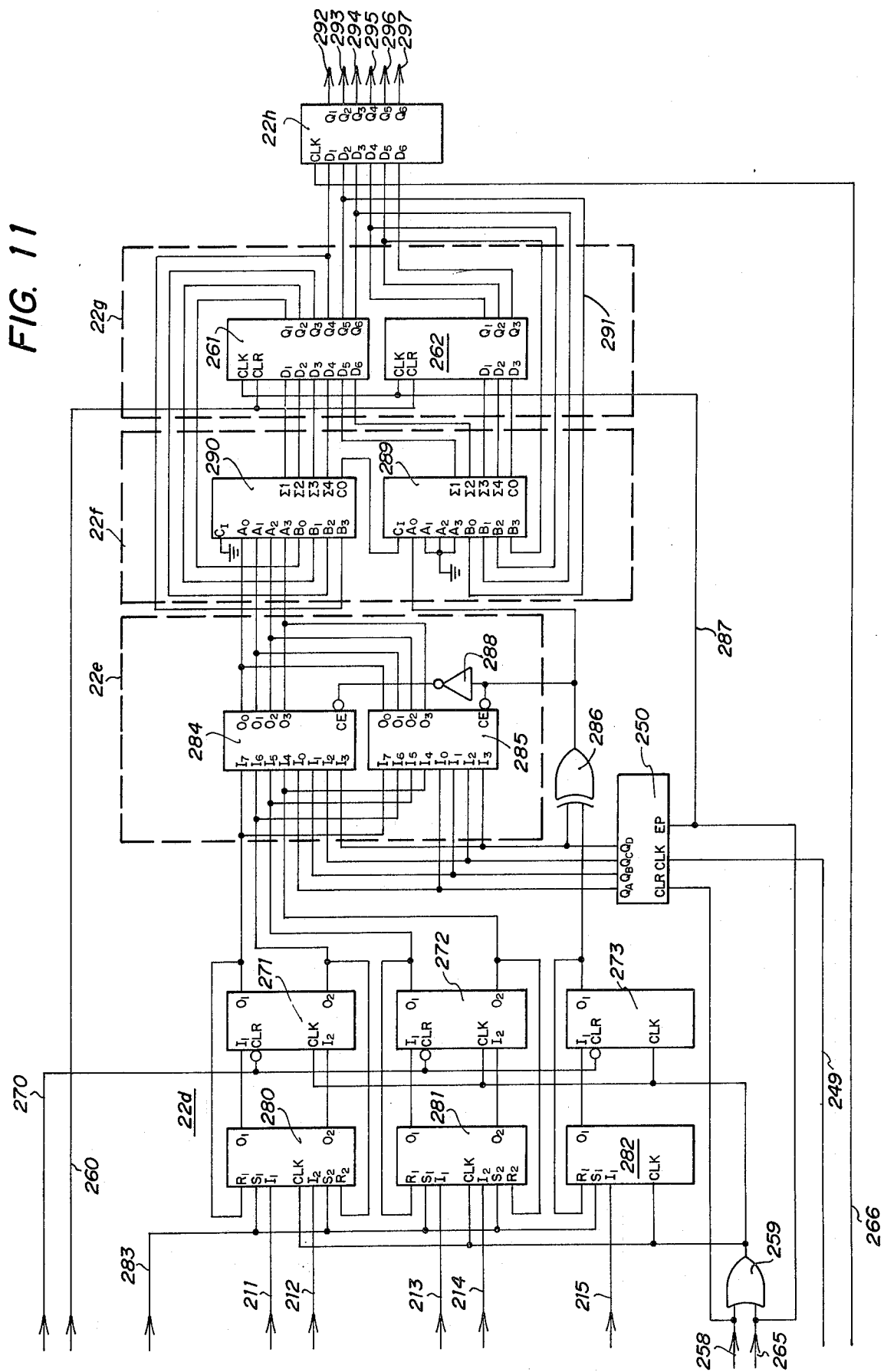

Correlator 22 is shown in detail in FIGS. 10 and 11. The 211 KHz frequency generated by counter 222, FIG. 9, on line 207 is applied to the clock input (CLK) of a flip-flop 241. The Q output of flip-flop 241 is applied to the D input of a flip-flop 242, while the $\overline{Q}$ output of flip-flop 242 is applied to the inverted clear (CLR) inputs of flip-flop 241 and synchronous binary counters 243 and 244. Flip-flops 241 and 242 comprise a strobe generator 240 providing a clear-enable pulse to synchronous binary counters 243 and 244.

The clock input to a synchronous binary counter 245 is provided by oscillator 220 by way of line 223. The QA output of counter 245 is applied to the clock input of flip-flop 242, and along line 246 to the gate-enable input (GI) of a decoder 247. The QA output is also applied as an input to an inverter 248, the output of which provides a clock signal to counters 244 and 243.

The QB output of counter 245 is led by way of line 249 to the clock input of a synchronous binary counter 250 of FIG. 11, and to the input of an inverter 251. The output of inverter 251 in turn is applied to the inverted clear input of counter 245, and to the clock input of a latch 252.

Synchronous counter 245 is the correlator cycle counter providing the clock signals for the correlation process. More particularly, a first clock signal is provided at the output of inverter 248, while a second clock signal is provided at the output of inverter 251 as will be more fully explained below.

The QA–QD outputs of counter 244 are connected to the I0–I3 inputs, respectively, of a ROM 253. In addition, the QA output of counter 243 is connected to the I4 input of the ROM. The 01–03 outputs of ROM 253 in turn are applied to the D1–D3 inputs, respectively, of latch 252, the Q1–Q3 outputs of which are applied to the A-C inputs, respectively, of decoder 247.

The inverted Y1 output of decoder 247 is connected to the inverted preset (PR) input of a flip-flop 254, while the inverted Y2 output of decoder 247 is applied as an input to an inverter 255. The output of inverter 255 in turn is led by way of line 256 to the clock input of a flip-flop 257, and by way of line 258 to one input of an OR gate 259 of FIG. 11. The inverted Y3 output of decoder 247 is applied along line 260 to the clear inputs of latches 261 and 262 of FIG. 11, while the inverted Y4 output is connected to the inverted clear inputs of flip-flops 257 and 254. The inverted Y5 and Y6 outputs are applied to the inputs of inverters 263 and 264, respectively. The output of inverter 263 in turn is led by way of line 265 to a second input of OR gate 259, while the output of inverter 264 is applied along line 266 to the clock input of a latch 267, FIG. 11.

The D input of flip-flop 257 is connected to the Q output of flip-flop 268, the inverted clear input of which is connected to the $\overline{Q}$ output of flip-flop 257. The clock signal to flip-flop 268 is supplied by data processor 24 along a conducting line 24m. Flip-flops 268 and 257 comprise a strobe generator 269 generating a pulse along line 270 to the inverted clear inputs of shift-registers 271, 272, and 273 of FIG. 11.

During a reading or data lift process, bar encoded information is continually being read at the bar information rate of 13.2 KHz. To synchronize the transfer of a new discrete sample of an input video signal with the initialization of the correlator 22, a 211 KHz clock signal is applied along line 207 to generate a start conversion pulse to be applied to A/D converter 200, FIG. 8, and to control the operation of strobe generator 240, FIG. 10. Further, the pulse generated by generator 240 to enable the clear function of counters 243 and 244 is synchronized with the QA output of counter 245. Thus, upon the occurrence of a leading edge of the 211 KHz clock signal on line 207, converter 200 is initialized and flip-flop 241 of strobe generator 240 is clocked. The positive 5 volt source at the D input of the flip-flop is transferred thereby to the Q output for presentation to flip-flop 242. Upon the occurrence of the next leading edge of the QA output of counter 245, flip-flop 242 is clocked and the $\overline{Q}$ output of the flip-flop transitions to a logic zero to clear flip-flop 241, and to enable the clear function of counters 243 and 244. Upon the next positive transition occurring at the output of inverter 248, counters 243 and 244 are cleared. This action initializes the correlator 22, and sets the output of the program counter formed by binary counters 243 and 244 to address the initial location of ROM 253. ROM 253 has stored therein the program instructions for the operation of correlator 22.

Upon the occurrence of a positive transition of the QB output of counter 245, the clear function of the counter is enabled to clear the counter upon the occurrence of a next positive transition on line 223. The occurrence of a trailing edge at the QB output of counter 245, however, causes the program instruction information output by ROM 253 to be clocked through latch 252 and instruction decoder 247. Thus, as the counters 243 and 244 sequentially address ROM 253 beginning from address zero, the corresponding program instructions are stored into latch 252 which serves as an instruction register. Each instruction is then decoded in decoder 247 and applied to the succeeding subsystems of correlator 22 to control the correlation process.

When bar detector flip-flop 24b, FIG. 3, is set to signal the occurrence of a bar decision, correlator dump delay circuit 24k is initialized. Circuit 24k in turn issues a signal along line 24m to initialized strobe generator 269, thereby causing a signal to be generated along line 270 to clear the last 8 of 16 discrete samples of an input video signal stored in correlator 22.

FIG. 11

The Q1 output of latch 209, FIG. 8, is applied by way of line 211 to the I1 input of a shift register 280, FIG. 11, while the Q2 output is applied by way of line 212 to the I2 input of the shift register. The Q3 output of latch 209 is applied along line 213 to the I1 input of a shift register 281, while the Q4 output is applied by way of line 214 to the I2 input of the shift register. The Q5 output of latch 209 in turn is applied by way of line 215 to the I1 input of a shift-register 282.

The R1 inputs to shift-registers 280–282 are connected to the O1 outputs of shift-registers 271–273, respectively, while the S1 and S2 inputs to registers 280–282 are connected to the Q output of flip-flop 254 of FIG. 10 by way of line 283. The clock inputs to registers 280–282 and registers 271–273 are provided by the output of OR gate 259. The R2 inputs of registers 280 and 281 are connected to the O2 outputs of registers 271 and 272, respectively. In addition, the O1 outputs of registers 280–282 are applied to the I1 inputs of registers 271–273, respectively, and the O2 outputs of registers 280 and 281 are applied to the I2 inputs of registers 271 and 272, respectively.

Shift registers 280–282 and 271–273 comprise shift register memory 22d, and operate so as to include the functions of multiplexer 22c. Memory 22d stores 16 discrete values of the input video signal reppresented by four binary bits for correlation against the stored memory function $m(t)$ as defined in Equation IV.

The O1 output of register 271 also is applied to the I7 inputs of ROMs 284 and 285 which comprise ROM 22e of FIG. 3. In addition, the O2 output of register 271 is applied to the I6 input of ROMs 284 and 285. In like manner, the O1 output of register 272 is applied to the I5 inputs of ROMs 284 and 285, while the O2 output is applied to the I4 inputs of the ROMs. Further, the O1 output of register 273 is applied to one input of exclusive OR gate 286, a second input of which is applied by the QD output of a synchronous binary counter 250.

The QD output of counter 250 also is applied to the I3 inputs of ROMs 284 and 285. In addition, the QA-QC outputs of counter 250 are applied to the I0-I2 inputs of ROMs 284 and 285, respectively. The clock input to counter 250 is connected by way of line 249 by the QB output of counter 245, while the clear input is connected by way of line 258 to the output of inverter 255 of FIG. 10. The counter enable input (EP) of counter 250 is supplied by the output of inverter 263 along line 265, and connected by way of a conducting line 287 to the clock inputs of latches 261 and 262.

Counter 250 provides position timing information corresponding to the products of the 16 memory function values stored in ROMs 284 and 285. More particularly, ROMs 284 and 285 have stored therein 16 information segments, each segment comprising 16 products of a given memory function value multiplied by all of the possible 16 discrete values representing an input video signal. Thus, the output of counter 250 addresses the information segment corresponding to the current value of the stored memory function, while the O1–O2 outputs of registers 271 and 272 select the product within that information segment that is to be output by ROM 22e.

Further in FIG. 11, the output of exclusive OR gate 286 is connected to the inverted memory enable input (CE) of ROM 285, and connected through an inverter 288 to the inverted memory enable input of ROM 284. In addition, the output of gate 286 is connected to the A0 input of an adder 289. Exclusive OR gate 286 provides a memory select signal to enable either of ROMS 284 and 285, and provides a bias level input to adder 289.

The A1–A3 inputs to adder 289 are stored to ground, while the carry-in (CI) input is connected to the carry-out (CO) of an adder 290. The sum 1 ($\Sigma1$) and sum 2 ($\Sigma2$) outputs of adder 289 are applied to the D5 and D6 inputs, respectively, of a latch 261, while the sum 3 ($\Sigma3$) and sum 4 ($\Sigma4$) outputs are applied to the D1 and D2 inputs, respectively, of a latch 262. The carry-out output of adder 289 is connected to the D3 input of latch 262, and the sum 1 ($\Sigma1$)-sum 4 ($\Sigma4$) outputs of adder 290 are applied to the D1–D4 inputs, respectively, of latch 261.

The Q1–Q4 outputs of latch 261 in turn are connected to the B0–B3 inputs, respectively, of adder 290. In addition, the Q4 output of latch 261 is connected to the D1 input of a latch constituting output register 22h. The Q5 and Q6 outputs of latch 261 are connected to the D2 and D3 inputs, respectively, of register 22h, and to the B0 and B1 inputs, respectively, of adder 289.

The Q1–Q3 outputs of latch 262 are connected to the D4–D6 inputs of output register 22h. The Q1 and Q2 outputs of latch 262 also are connected to the B2 and B3 inputs, respectively, of adder 289.

Figure 13A:
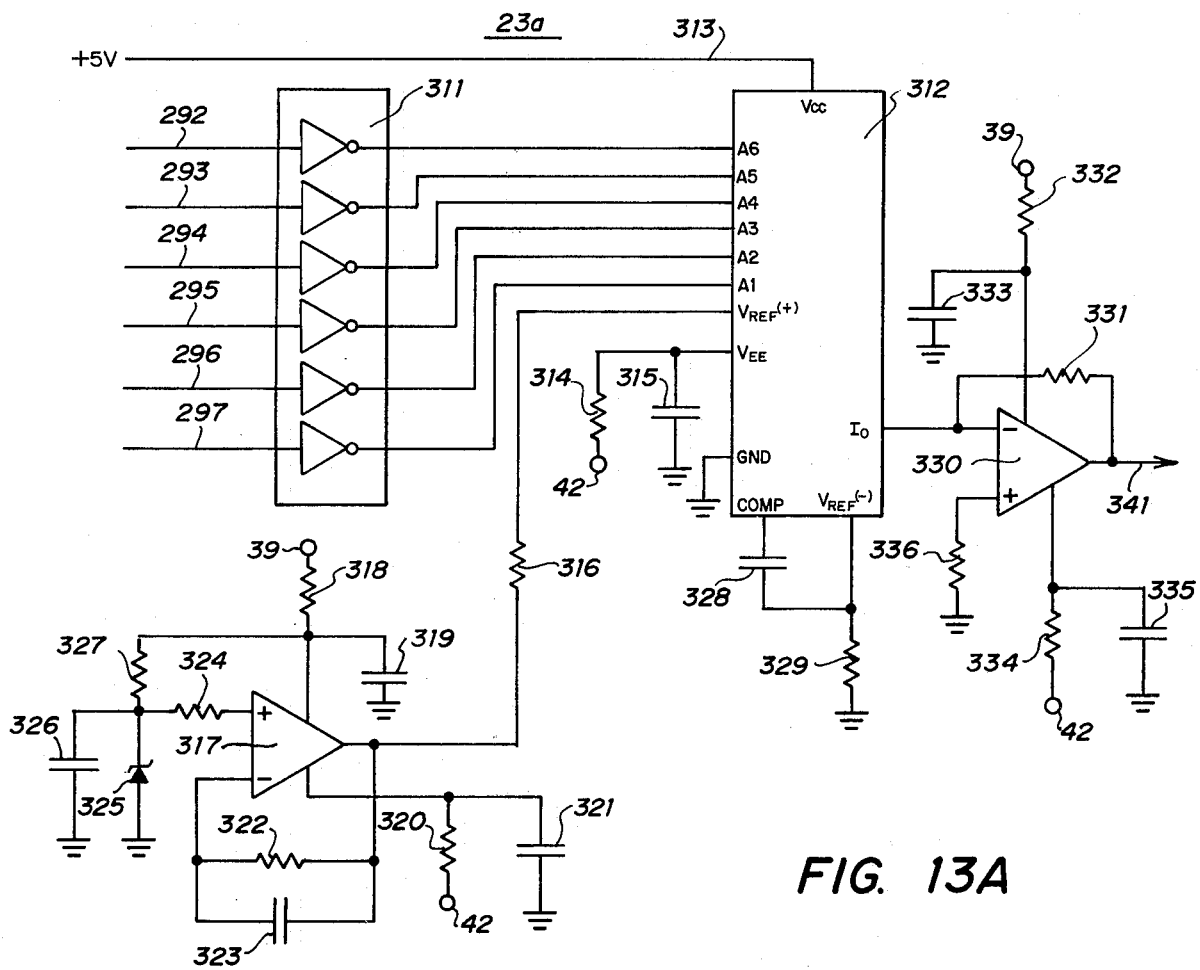
FIGS. 13A and 13B comprise an electrical schematic diagram of the bar-code detector of FIG. 3.

The Q1–Q6 outputs of latch 22h are applied along lines 292–297 through an inverter bank 311 to inputs A6–A1, respectively, of D/A converter 312, FIG. 13A.

In operation, when the correlator 22 receives an interrupt on line 207 leading to a clock input of strobe generator 240, FIG. 10, the output of generator 240 resets the program counter comprised of counters 243 and 244. An instruction stored at address 0 in ROM 253 is output in response to the program counter, and causes flip-flop 254 to be set. A logic one signal thus is applied along line 283 to the S1 and S2 inputs of registers 280 and 281, and to the S1 input of register 282 to select lines 211 through 215. Lines 211 through 214 constitute a four-bit digital value corresponding to a sample of the digitized input video signal, while line 215 carries the sign information corresponding to the video signal sample.

A next instruction of ROM 253 is decoded by instruction decoder 247 to cause a clock signal to be generated at the output of OR gate 259, FIG. 11. As shift register memory 22d has stored therein 16 five-bit words corresponding to the last 16 video signal samples, the clock signal at the output of OR gate 259 causes a next data sample to be loaded into memory 22d. Shift register memory 22d thus is shifted one data word to the right. A succeeding instruction output by ROM 253 is decoded by instruction decoder 247 clears flip-flop 254, thereby selecting registers 280–282 to the R1 and R2 inputs. Registers 280–282 and 271–273 then are connected to form a recirculating shift register memory.

Thus, for each input video signal sample, the I1 and I2 inputs of registers 280 and 281, and the I1 input of register 282 are selected to store a new data word and to delete the oldest resident data word in memory 22d. The R1, R2 inputs of registers 280–281 are then selected to form a recirculating shift register memory. Each of the 16 video signal samples resident in memory 22d may be shifted to outputs O1, O2 of registers 271 and 272, and used in conjunction with the QA–QD outputs of counter 250 to address ROMS 284 and 285. As described before, ROMs 284 and 285 contain the products formed by multiplying memory function $m(t)$, Equation IV, by all possible video signal samples.

Prior to the initiation of the correlation process, latches 261 and 262 are cleared by a ROM instruction applied by way of line 260. In addition, counter 250 is cleared by a signal applied by way of line 258.

The next succeeding 16 instructions output by ROM 253 have the effect of incrementing counter 250 to address 16 successive information segments stored in ROMs 284 and 285, and of shifting memory 22d right one place to output a new data word for addressing one of 16 products in each of the 16 segments. Thus, each of 16 data words in memory 22d addresses a product in each of 16 segments addressed by counter 250 to solve correlation Equation V.

The products of memory function $m(t)$ are stored into ROMs 284 and 285 according to a comparison with a bias level associated with such products. More particularly, as there are two O1 and O2 outputs of ROMs 284 and 284, a maximum of 16 values (0–15) may be represented thereby. If the value seven (7), a near mid-point value, is chosen as the bias level, the storage location of the memory function products may be determined by comparing such products with the bias level.

For example, the product −4, when biased, is represented by the value 3 which is below the bias level 7. Further, the product +4, when biased, is represented by the value 11 which is above the bias level 7. Thus, in storing the memory function products, those products represented by values above the bias level are stored in ROM 284, while those products represented by values below the bias level are stored in ROM 285.

Either ROM 284 or ROM 285 is selected during a correlation process by exclusive OR gate 286. Gate 286, in turn, responds to the most significant bit output (QD) of counter 250 and to the sign information at the O1 output of register 273. Such sign information distinguishes the positive from the negative half-wave of an input video signal. Thus, the selection of ROM 284 or ROM 285 may be represented in tabular form as shown in Table I.

TABLE I

| ROM SELECTION | | | |
|---|---|---|---|
| Input Video | m(t) | $q_D$ | Sign | ROM |
| + | + | 0 | 0 | 285 |
| − | + | 0 | 1 | 284 |
| − | − | 1 | 0 | 285 |
| + | − | 1 | 1 | 284 |

As the products stored in ROMs 284 and 285 are addressed by counter 250 acting in conjunction with memory 22d, they are applied sequentially to the A0–A3 inputs of adder 290. At the instant a first product is applied to the A0–A3 inputs of adder 290, a zero value is resident in latches 261 and 262. This zero value is summed with the product from ROM 284 or 285, and upon receiving the next instruction from ROM 253, FIG. 10, the sum resident in adders 289 and 290 is stored into latches 261 and 262. The sum resident in latches 261 and 262 then is added to a next product in adders 289 and 290. A next succeeding ROM 253 instruction then causes the sum to be stored in latches 261 and 262. This operation continues until all 16 discrete values representing an input video signal have been cycled through memory 22d. Thus, adders 289 and 290 act in conjunction with latches 261 and 262 to provide an accumulation of sums to solve the correlation equation.

Upon completion of the correlation process, ROM 253 outputs an instruction which generates a clock signal to be applied along line 266 to register 22h, thereby storing the accumulation of latches 261 and 262 into register 22h. Upon receiving a command along line 266, the accumulation is transferred to output lines 292–297.

The correlation process as herein described has a time base double that of an input video signal. Therefore, to provide a real time operation, only the main lobe of the correlation function is utilized as before explained. To accomplish this effect, correlator dump delay circuit 24k, FIG. 3, is initialized upon the sensing of a main lobe peak 33, FIG. 5, by bar detector 23. At a delayed time after the main lobe is detected, a signal is generated along line 24m to initialize strobe generator 269 as before explained. The main lobe of the correlation function, therefore, may be utilized to detect the presence of a bar code video signal in a real time operation without overlapping incoming data with residual data of a previous video signal.

FIG. 12

FIG. 12 further illustrates the correlation process by way of a flow diagram. Upon entering the correlator 22 at logic step 300, a transfer is made to logic step 301 to await the occurrence of an initialization interrupt signal on line 207, FIG. 10. Until the signal is received, the correlator cycles about loop 302 to remain in a wait state. Upon receiving the initialization signal, a transfer is made from logic step 301 to logic step 303 where the correlator is initialized by clearing counter 250 and latches 261, 262.

After initialization, a transfer is made from step 303 to logic step 304 where a test is made to detect the presence of a signal from correlator dump delay circuit 24k, FIG. 3. If a dump signal is present, a transfer is made through step 305, where registers 271–273 are cleared to delete eight of 16 input video signal samples resident in memory 22d to logic step 306. If a dump signal is not present, a transfer is made from step 304 to step 306 where the correlation process is initialized.

Upon initialization, a transfer is made from logic step 306 to step 307 to test for completion of the correlation process. If all 16 samples representing an input video signal have not been circulated through memory 22d, a transfer is made along loop 308 to reenter step 306.

If the correlation process has been completed, a transfer is made from step 307 to logic step 309, where an accumulated sum of products representing a single point on the correlation function curve 32, FIG. 5, is transferred to bar detector 23, FIG. 3, for further processing. A transfer then is made from logic step 309 along loop 310 to reenter logic step 301.

FIGS. 13A, 13B

Figure 13B:
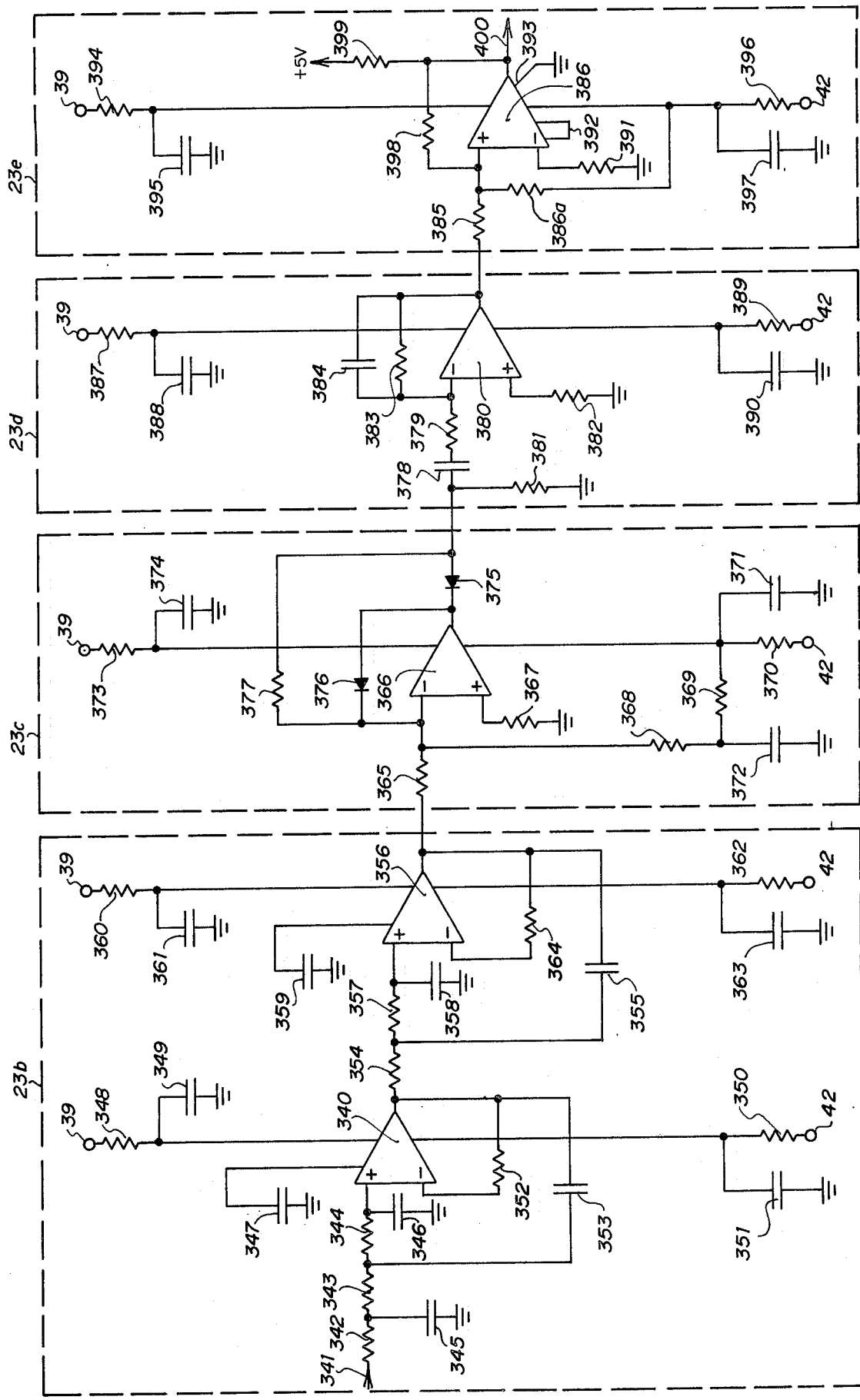

FIGS. 13A and 13B comprise an electrical schematic diagram of bar code detector 23, FIG. 3, wherein the Q1–Q6 outputs of latch 22h, FIG. 11, are applied along lines 292–297 and through inverter bank 311 to inputs A6–A1, respectively, of D/A converter 312.

A +5 volt source is applied by way of a conducting line 313 to a positive power input (VCC) of converter 312, while negative source 42, a 15 volt source, is applied through a 47 ohm resistor 314 to a negative power input (VEE). Also connected to the negative power input is a first terminal of a one microfarad capacitor 315 having a second terminal connected to ground.

A positive voltage reference connection ($V_{REF}+$) is connected through a one K-ohm resistor 316 to the output of a differential amplifier 317. Further, positive source 39, a 15 volt source, is applied through a 47 ohm resistor 318 to the positive power input of amplifier 317, and through resistor 318 to a first terminal of a one microfarad capacitor 319 having a second terminal connected to ground. In like manner, negative source 42 is applied through a 47 ohm resistor 320 to the negative power input of amplifier 317, and through resistor 320 to the first terminal of a one microfarad capacitor 321 having a second terminal connected to ground.

The output of amplifier 317 also is connected through a parallel circuit comprising a one K-ohm resistor 322 and a .01 microfarad capacitor 323 to the negative input of the amplifier. The positive input of the amplifier is connected through a one K-ohm resistor 324 to the cathode of a Zener diode 325 and to a first terminal of a one microfarad capacitor 326 having a second terminal connected to ground. The anode of diode 325 also is connected to ground. The positive amplifier input in addition is connected through resistor 324 and through a 4.7 K-ohm resistor 327 to the positive power input of the amplifier.

Referring again to converter 312, the frequency compensation input of the converter (COMP) is connected to a first terminal of a 51 picofarad capacitor 328 having a second terminal connected through a one K-ohm resistor 329 to ground. A negative voltage reference input ($V_{REF}-$) also is connected through resistor 329 to ground, while the ground connection (GND) is connected directly to ground.

The output (I0) of converter 312 is applied to the negative input of a differential amplifier 330, and through a one K-ohm resistor 331 to the output of the amplifier. The positive input to amplifier 330 is connected through a one K-ohm resistor 336 to ground.

Positive source 39 is applied through a 47 ohm resistor 332 to the positive power input of amplifier 330, and through resistor 332 to a first terminal of a one microfarad capacitor 333 having a second terminal connected to ground. In like manner, negative source 42 is applied through a 47 ohm resistor 334 to a first terminal of a one microfarad capacitor 335 having a second terminal connected to ground.

Upon the completion of a correlation process, the correlation data appearing on lines 292–297 is converted to a continuous waveform by converter 312 receiving a reference voltage from amplifier 317. The output of the converter is applied through the network of amplifier 330 to convert the output current of the converter to a voltage waveform, which in turn is applied to Bessel filter 23b of FIG. 13B. The correlator 22 then enters into a hold state to await the next interrupt on line 207 of FIG. 10.

Bessel filter 23b includes a differential amplifier 340 receiving the output of amplifier 330, FIG. 13A, along line 341. Such output is applied through a series resistance circuit comprising a 6.81 K-ohm resistor 342, a 47.5 K-ohm resistor 343 and a 47.5 K-ohm resistor 344 to the positive input of amplifier 340. Connected at a node intermediate to resistors 342 and 343 is a first terminal of a 100 picofarad capacitor 345 having a second terminal connected to ground. In addition, a first terminal of a 10 picofarad capacitor 346 is connected to the positive input of amplifier 340. The second terminal of capacitor 346 is connected to ground.

A frequently compensation input to amplifier 340 is connected to a first terminal of a 330 picofarad capacitor 347 having a second terminal connected to ground. Positive source 39 is applied through a 47 ohm resistor 348 to the positive power input of amplifier 340, and through resistor 348 to a first terminal of a one microfarad capacitor 349 having a second terminal connected to ground. In like manner, negative source 42 is applied through a 47 ohm resistor 350 to the negative power input of amplifier 340, and through resistor 350 to a first terminal of a one microfarad capacitor 351 having a second terminal connected to ground.

The output of amplifier 340 is connected through a 82 K-ohm resistor 352 to the negative input of the amplifier, through a 10 picofarad capacitor 353 to a node intermediate to resistors 343 and 344, and through a 43.2 K-ohm resistor 354 and a 10 picofarad capacitor 355 to the output of a differential amplifier 356. The output of amplifier 340 is also applied through resistor 354 and a 43.2 K-ohm resistor 357 to the positive input of amplifier 356, and through resistors 354 and 357 to a first terminal of a 10 picofarad capacitor 358 having a second terminal at ground potential.

A frequency compensation input to amplifier 356 is connected through a 330 picofarad capacitor 359 to ground, while positive source 39 is applied through a 47 ohm resistor 360 to the positive power input of the amplifier. Positive source 39 alsi is applied through resistor 360 to a first terminal of a one microfarad capacitor 361 having a second terminal connected to ground. Negative source 42 is applied through a 47 ohm resistor 362 to the negative power input of amplifier 356, and through resistor 362 to a first terminal of a one microfarad capacitor 363 having a second terminal connected to ground.

The output of amplifier 356 is led through a 82 K-ohm resistor 364 to the negative input of the amplifier, and applied through a 27 K-ohm resistor 365 to the negative input of a differential amplifier 366.

Bessel filter 23b provides a smoothing of the discontinuities which may appear in the output waveform of converter 312, FIG. 13A. In addition, the Bessel filter more nearly approximates the linear phase characteristic desired in the signal processing embodied herein, thus allowing the use of a low pass filter and the preservation of the input video signal phase relationships.

Amplifier 366 and its associated network comprise level detector 23c as illustrated in FIG. 3. The positive input of amplifier 366 is connected through an 18 K-ohm resistor 367 to ground, while the negative input of the amplifier is connected through a 200 K-ohm resistor 368 and a 100 K-ohm resistor 369 to the negative power input of the amplifier. The negative power input is also connected through a 47 ohm resistor 370 to negative source 42, and through a one microfarad capacitor 371 to ground. Connected to a point intermediate to resistors 368 and 369 is a first terminal of a one microfarad capacitor 372 having a second terminal connected to ground.

Positive source 39 is applied through a 47 ohm resistor 373 to the positive power input of amplifier 366, and through resistor 373 to a first terminal of a one microfarad capacitor 374 having a second terminal connected to ground. The output of amplifier 366 is connected to the cathode of a diode 375 and to the anode of a diode 376. The anode of diode 375 in turn is connected through a 150 K-ohm resistor 377 to the negative input of the amplifier, while the cathode of diode 376 is connected directly to the negative input of the amplifier. The anode of diode 375 also is connected through a 56 picofarad capacitor 378 and a 33 K-ohm resistor 379 to the negative input of a differential amplifier 380. Connected to a point intermediate to diode 275 and capacitor 378 is a 12 K-ohm resistor 381 having a terminal connected to ground.

Amplifier 380 and its associated circuitry comprise differentiator 23d. The positive input of amplifier 380 is connected to a 100 K-ohm resistor 382 having a terminal at ground potential, while the output of the amplifier is connected through a 100 K-ohm resistor 383 to the negative input of the amplifier. The output of amplifier 380 also is connected to a 22 picofarad capacitor 384 to the negative input of the amplifier, and through a one K-ohm resistor 385 to the positive input of a comparator 386.

Positive source 39 is applied through a 47 ohm resistor 387 to the positive power input of amplifier 380, and through resistor 387 to a first terminal of a one microfarad capacitor 388 having a second terminal connected to ground. In like manner, negative source 42 is applied through a 47 ohm resistor 389 to the negative power input of amplifier 380, and through resistor 389 to a first terminal of a one microfarad capacitor 390 having a second terminal connected to ground.

Continuing with the description of comparator 386, the negative input of the comparator is connected through a one K-ohm resistor 391 to ground. A conducting line 392 shorts the offset balance terminals of comparator 386, while a conducting line 393 provides a ground reference to the comparator. The output of comparator 386 is applied through a 68 K-ohm resistor 398 to the positive input of the comparator, through a one K-ohm resistor 399 to a +5 volt source, and led by way of a conducting line 400 to data processor 24 as illustrated in FIG. 3 and FIGS. 14–22.

Positive source 39 is applied through a 47 ohm resistor 394 to the plus power input of the comparator, and through resistor 394 to a first terminal of a one microfarad capacitor 395 having a second terminal connected to ground. In like manner, negative source 42 is applied through a 47 ohm resistor 396 to the negative power input of comparator 386, and through resistor 396 to a first terminal of a one microfarad capacitor 397 having a second connected to ground. The first terminal of capacitor 397 is also connected through a 180 K-ohm resistor 386a to the positive terminal of comparator 386.

As before described, amplifier 366 and its associated network comprise level detector 23c, which receives the output of Bessel filter 23b and removes the main lobe of the correlation signal for further processing. The main lobe then is applied to differentiator 23d to convert the unipolar lobe to a bipolar signal having a zero-crossover at the main lobe peak.

Comparator 386 and its associated network comprise zero-crossover detector 23e, which provides the exact timing of the occurrence of the correlation main lobe peak.

More particularly, the positive half-wave of the output signal provided by differentiator 23d causes comparator 386 to generate a pulse, the trailing edge of which designates the exact timing of the occurrence of the main lobe peak. Such pulse is applied along line 400 to data processor 24.

FIG. 14

Data processor 24 includes a microprocessor 23e, the architecture of which is generally illustrated in FIG. 14. Microprocessor 24e includes a memory 410, the output of which is applied to an instruction register 411, an A register multiplexer 412, a B register 413 and an output register 414. The output of instruction register 411 in turn is applied to a program counter 415, and to one input of a memory address multiplexer 416. The output of the program counter is connected to a second input of memory address multiplexer 416, while the output of multiplexer 416 is applied to an input of memory 410.

A second input to multiplexer 412 is provided by an adder 417, which also provides an input to a memory input multiplexer 418. Multiplexer 418 receives a second input from status register 24f, FIG. 3, and in turn provides a second input to memory 410. Memory 410 is addressed by the output of multiplexer 416, and is loaded with the data provided by multiplexer 418.

A first input to adder 417 is provided by A register 420 having an input connected to the output of multiplexer 412. A second input to adder 417 is provided by B register 413. Output register 414 provides an input to devices peripheral to microprocessor 24e within the data processor 24.

In operation, status register 24f receives information from data processor 24 during one processing cycle, and in turn provides information upon which the microprocessor 24e shall operate during a succeeding processing cycle. Thus, under the control of timing and control (T/C) system 24d, FIG. 3, status register 24f is loaded to provide a serial input to memory input multiplexer 418 for storage in memory 410. Memory 410 includes not only the program instructions controlling the operation of microprocessor 24e, but also data from status register 24f and adder 417.

During a fetch cycle, under the control of T/C system 24d, memory address multiplexer 416 is selected to program counter 415 to address a memory 410 location having a next program instruction. The program instruction subsequently is loaded under program control from memory 410 into instruction register 411. Such program instruction includes both an operation code and an address to a memory location, the contents of which are to be operated on during an execution cycle.

During the execution cycle, multiplexer 416 is selected to instruction register 411 to provide the address in memory of the information to be operated upon. Instruction register 411 also provides an operation code which is decoded to supply clocking and steering commands to microprocessor 24e.

In processing the status information output by status register 24f, numerous branch instructions are required depending upon the particular status information that is being generated during a given processing cycle. Thus, a portion of memory 410 is reserved as temporary storage wherein branch instructions are stored which correspond to current status information. Such branch instructions are formed by A register multiplexer 412, B register 413, A register 420 and adder 417 acting in conjunction under program control. For example, a control word is formed which corresponds to a particular status bit under consideration. The control word therefore is stored in register 413, and multiplexer 412 is selected to the output of memory 410 to store the status bit in register 420. The control word and status bit then are formed into a program branch instruction by adder 417, and transferred through memory input multiplexer 418 to a temporary storage in memory 410. The branch instruction is executed under the control of a program instruction provided in register 411 to process status register 24f information.

FIG. 15

Twelve bits output by adder 417, FIG. 14, are applied by way of conductors 430–441 to the inputs of multiplexer 418 comprised of multiplexers 442, 443 and 444. More particularly, lines 430–433 are connected to inputs 1A–4A of multiplexer 442, respectively, while lines 434–437 are connected to inputs 1A–4A of multiplexer 443. In addition, lines 438–441 are connected to the inputs 1A–4A of multiplexer 444.

Input 1B of multiplexer 442 is connected to an output of status register 24f by way of line 445. Inputs 2B–4B of multiplexer 442 are shorted to ground, as are inputs 1B–4B of multiplexer 443 and inputs 1B–4B of multiplexer 444.

The select (SEL) inputs of multiplexers 442–444 are connected to a conducting line 446 leading to an output of T/C system 24d, as illustrated in FIG. 3. The inverted strobe inputs (STB) of multiplexers 442–444 are each connected to ground.

Outputs 1Y–4Y of multiplexer 442 are fed through inverters 447–450, respectively, and applied to inputs D1–D4, respectively, of random access memory (RAM) 451. In like manner, outputs 1Y–4Y of multiplexer 443 are fed through inverters 452–455, respectively, and applied to inputs D1–D4, respectively, of a RAM 456. In addition, outputs 1Y–4Y of multiplexer 444 are applied through inverters 457–460, respectively, to inputs D1–D4, respectively, of a RAM 461. Multiplexers 442–444 provide the means for storing data from adder 417 or status register 24f into memory 410.

Continuing with the description of the system as illustrated in FIG. 15, the A0–A3 inputs of RAMs 451, 456 and 461 are connected to conducting lines 462–465, respectively, which in turn lead to the outputs of memory address multiplexer 416, FIG. 14. In addition, lines 462–465 and conducting lines 466–469, also leading from the outputs of multiplexer 416, are connected to the A0–A7 inputs, respectively, of read only memories (ROMs) 470, 471 and 472.

Lines 466–469 are also connected to the inputs of a NAND gate 473, the output of which is applied to the inverted memory enable (ME) inputs of RAMs 451, 456 and 461, and through an inverter 474 to the inverted memory enable inputs (ME1, ME2) of ROMs 470, 471 and 472. Further, a write enable signal is applied by way of a conducting line 475 leading from T/C system 24d, FIG. 3, to the inverted write enable (WE) inputs of RAMs 451, 456 and 461.

The S1-S4 outputs of RAM 451 are connected to the Y1-Y4 outputs, respectively, of ROM 470, and to output lines 476-479, respectively. In like manner, the S1-S4 outputs of RAM 456 are connected to the Y1-Y4 outputs, respectively, of ROM 471 and to output lines 480-483, respectively. In addition, outputs S1-S4 of RAM 461 are connected to the outputs Y1-Y4, respectively, of ROM 472 and to output lines 484-487, respectively.

RAMs 451, 456 and 461 together with the ROMs 470-472 comprise memory 410 of FIG. 14. Selection between the RAMs and the ROMs of memory 410 for output on lines 476-487 is accomplished by the output of gate 473. When the lines 466-469 cause the output of gate 473 to transition to a logic zero, the memory enable functions of RAMs 451, 456 and 461 are activated for output. However, when the output of gate 473 transitions to a logic one, the memory enable functions of ROMs 470-472 are activated for output.

The uppermost 16 locations in memory 410 are resident in RAMs 451, 456 and 461, and are addressed by the four most significant bits of an 8 bit code output by multiplexer 416 on lines 462-465. The program instructions controlling the execution of the data processor 24, however, are resident in ROMs 470, 471, and 472, and are addressed by the entire 8 bit code output of multiplexer 416 are represented on lines 462-469. In addition to the program instruction information, ROMs 470-472 also have stored therein data to be strobed into output register 414 and constants used in the operation of microprocessor 24e.

In operation, an address output by memory address multiplexer 416, FIG. 14, is applied along lines 462-469 to memory 410. If the discrete signal on line 475 is a logic 1, and the output of NAND gate 473 is at the logic zero, data stored in memory 410 at the memory location selected by lines 462-469 is output on lines 476-487. With a logic one both on line 475 and at the output of gate 473, ROMs 470-472 are selected for output on lines 476-487.

In addition, data output by status register 24f and adder 417 is applied through memory input multiplexer 418 for storage in RAMs 451, 456 and 461. Thus, when the discrete signal on line 475 is a logic zero and the select function of multiplexers 442-444 is enabled, the data on lines 430-441 and 445 is stored into RAMs 451, 456 or 461 at the memory location addressed by lines 462-465.

FIG. 16

Figure 16:
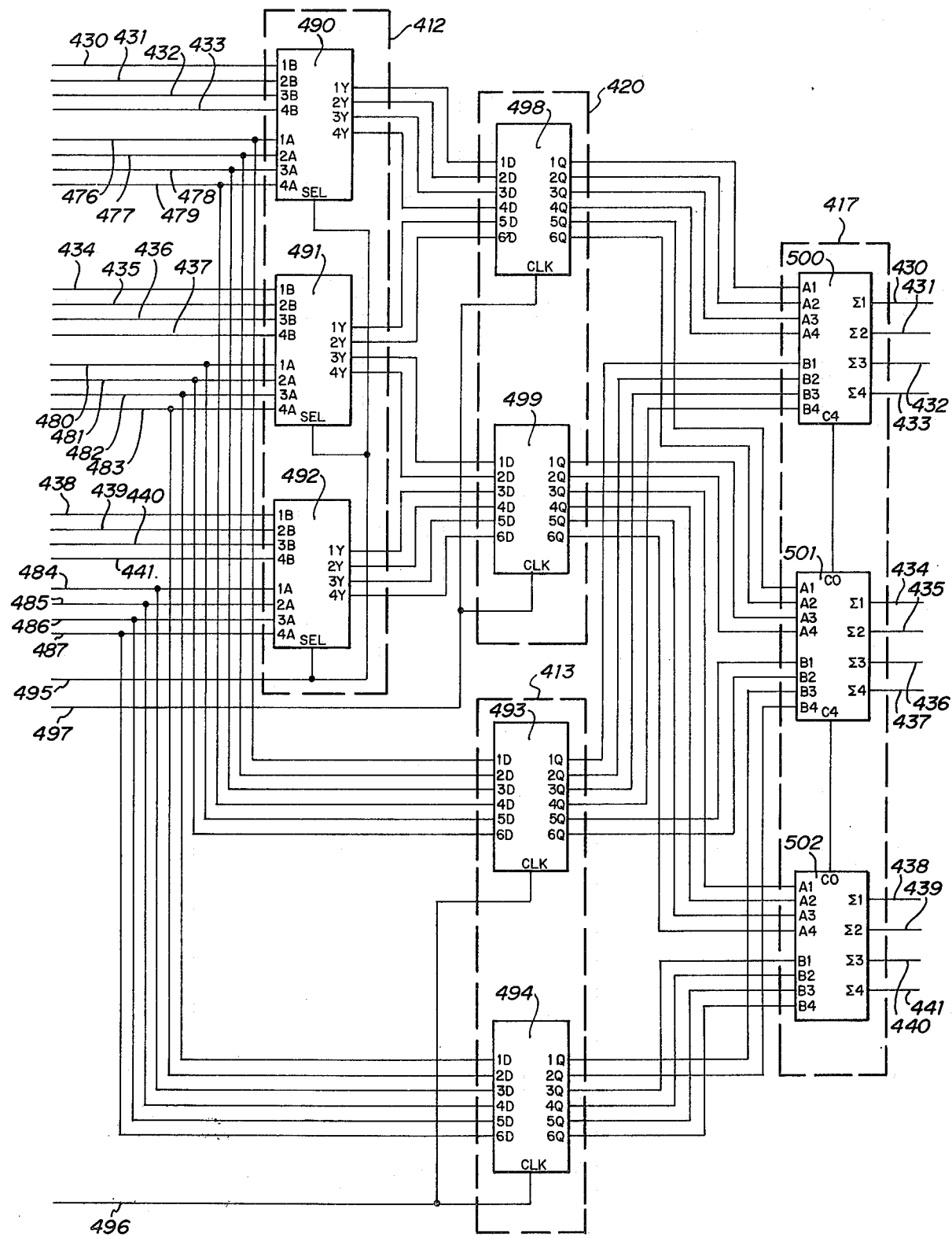

In FIG. 16, outputs of adder 417 applied by way of lines 430-433 are connected to inputs 1B-4B, respectively, of a multiplexer 490. Further, adder output lines 434-437 are connected to inputs 1B-4B, respectively, of a multiplexer 491 and adder output lines 438-441 are connected to inputs 1B-4B of a multiplexer 492.

Memory 410 outputs on lines 476-479 are connected to inputs 1A-4A, respectively, of multiplexer 490, and to inputs 1D-4D of a latch 493. Memory output lines 480-483 in turn are connected to inputs 1A-4A, respectively, of multiplexer 491. Lines 480 and 481 also are connected to inputs 5D and 6D, respectively, of latch 493, while lines 482 and 483 are connected to inputs 1D and 2D, respectively, of a latch 494. Memory output lines 484-487 are connected to inputs 1A-4A of multiplexer 492, and to inputs 3D-6D of latch 494.

A control signal from T/C system 24d, FIG. 3, is applied along a conducting line 495 to the select (SEL) input of multiplexers 490-492. A second control signal from T/C system 24d is applied by way of a conducting line 496 to the clock (CLK) inputs of latches 493 and 494. In addition, the T/C system 24d provides a signal along a conducting line 497 to the clock inputs of latches 498 and 499.

The outputs 1Y-4Y of multiplexer 490 are connected to the inputs 1D-4D, respectively, of latch 498. The 1Y and 2Y outputs of multiplexer 491 are connected to the 5D and 6D inputs, respectively, of latch 498, while the 3Y and 4Y outputs are connected to the 1D and 2D inputs, respectively, of latch 499. The 1Y-4Y outputs of multiplexer 492 in turn are connected to the 3D-6D inputs of latch 499.

Multiplexers 490-492 comprise the A register multiplexer 412 of FIG. 14. Latches 498 and 499 comprise the A register 420, while latches 493 and 494 comprise the B register 413.

The 1Q-4Q outputs of latch 498 are connected to the A1-A4 inputs of an adder 500, while the 5Q and 6Q outputs are connected to the A1 and A2 inputs, respectively, of an adder 501. Further, the 1Q and 2Q outputs of latch 499 are connected to the A3 and A4 inputs, respectively, of adder 501. Outputs 3Q-6Q of latch 499 are connected to inputs A1-A4 of an adder 502. Adders 500-502 comprise adder 417 of FIG. 14.

Outputs 1Q-4Q of latch 493 are connected to inputs B1-B4, respectively, of adder 500, while outputs 5Q and 6Q are connected to inputs B1 and B2, respectively, of adder 501. Further, outputs 1Q and 2Q of latch 494 are connected to inputs B3 and B4, respectively, of adder 501, and outputs 3Q and 6Q of latch 494 are connected to inputs B1-B4, respectively, of adder 502.

Completing adder 417, the carry-out (C4) output of adder 500 is connected to the carry-in (CO) input of adder 501. In like manner, the C4 output of adder 501 is connected to the CO input of adder 502.

The sum 1-sum 4 outputs of adder 500 are applied along lines 430-433, respectively, while the sum 1 - sum 4 outputs of adder 501 are applied along the lines 434-437, respectively. In like manner, the sum 1 - sum 4 outputs of adder 502 are applied along lines 438-441, respectively.

In operation, the outputs of adder 417 and memory 410 are applied to A register multiplexer 412, which under program control selects either the memory or adder inputs for storage in A register 420. In addition, the memory 410 output is provided to the inputs of B register 413. When A register 420 and B register 413 are clocked by signals on lines 497 and 496, respectively, the contents of the registers are summed in adder 417.

FIG. 17

Figure 17:
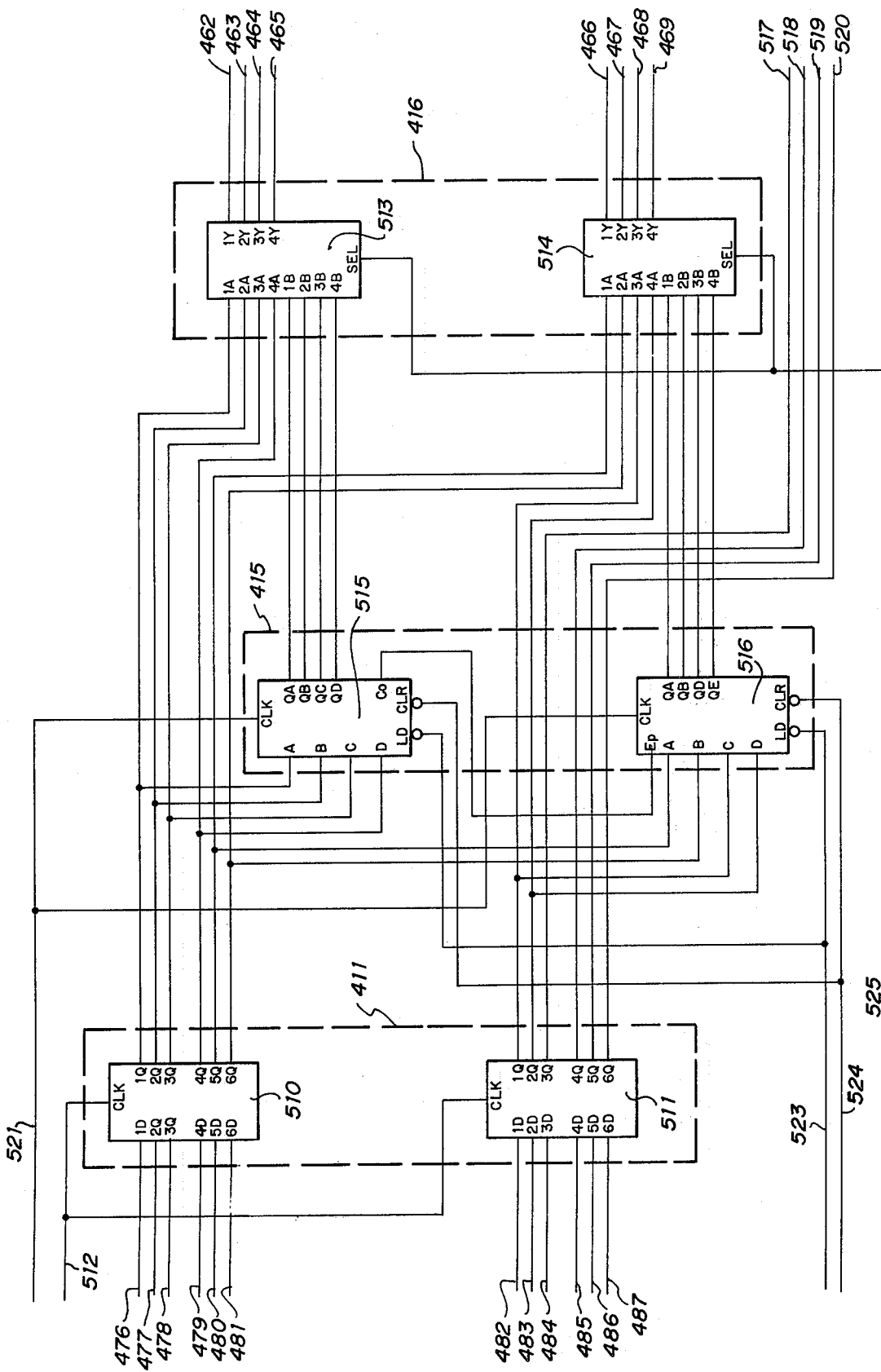

Referring to FIG. 17, a more detailed functional block diagram of instruction register 411, program counter 415 and memory address multiplexer 416, it may be seen that lines 476-481 leading from the output of memory 410, FIG. 15, are connected to the inputs 1D-6D, respectively, of a latch 510. Memory 410 output lines 482-487 in like manner are connected to inputs 1D-6D, respectively, of a latch 511.

The 1Q–4Q outputs of latch 510 are connected to the 1A–4A inputs, respectively, of a multiplexer 513, and to the A–D inputs of a binary synchronous counter 515. Outputs 5Q and 6Q of latch 510 in turn are connected to inputs 1A and 2A, respectively, of a multiplexer 514, and to inputs A and B, respectively, of a synchronous binary counter 516.

Outputs 1Q and 2Q of latch 511 are connected to inputs 3A and 4A, respectively, of multiplexer 514, and to inputs C and D, respectively, of counter 516. Outputs 3Q–6Q of latch 511, forming the operation code executed during an execution cycle, are applied along conducting lines 517–520 which lead to the T/C system 24d, FIG. 3. Further, a load signal generated by T/C system 24d is applied along a conducting line 512 to the clock (CLK) inputs of latches 510 and 511. Latches 510 and 511 comprise instruction register 411, FIG. 14.

Referring again to counter 515, the QA–QD outputs of the counter are connected to the 1B–4B inputs of multiplexer 513. In like manner, the QA, QB, QD and QE outputs of counter 516 are connected to the 1B–4B inputs, respectively, of multiplexer 514.

The carry-out output (CO) of counter 515 is connected to the clock enable input (EP) of counter 516, while a clock signal generated by T/C system 24d is applied along a conducting line 521 to the clock inputs (CLK) of counters 515 and 516. In addition, T/C system 24d generates load and clear signals along conducting lines 523 and 524, respectively, to the inverted load and clear inputs of counters 515 and 516. Counters 515 and 516 comprise program counter 415, FIG. 14.

A select signal also is generated by T/C system 24d and applied along a conducting line 525 to the select (SEL) inputs of multiplexers 513 and 514. The 1Y–4Y outputs of multiplexer 513 are connected by way of conducting lines 462–465, respectively, to address memory 410. In like manner, outputs 1Y–4Y of multiplexer 514 are applied along lines 466–469 to memory 410. Multiplexers 513 comprise the memory address multiplexer 416 of FIG. 14.

During a fetch cycle, under the control of T/C system 24d, memory address multiplexer 416 is selected to program counter 415 to address a memory location having a next program instruction. The program instruction then is loaded from memory 410 into the instruction register 411 during the fetch cycle. The four most significant bits of the instruction as output on lines 517–520 constitute an operation code, while the 8 least significant bits of the instruction constitute the memory address to be utilized during the instruction execution.

During the execute cycle, the memory address multiplexer 416 is selected to the instruction register 411 to address the memory location to be used during the execute cycle. As before described, lines 517–520 provide the operation code controlling the operation to be performed upon the contents of the memory location.

FIG. 18

Referring to FIG. 18, memory 410 output signals are applied along lines 476–481 to the 1D–6D inputs, respectively, of a latch 530. In like manner, the memory output signals along lines 482–487 are applied to inputs 1D–6D of a latch 531.

Outputs 1Q–6Q of latch 530 are connected to conducting lines 532–537, respectively, leading to subsystems external to the reader system disclosed herein. In like manner, outputs 1Q–6Q of latch 531 are connected to conducting lines 538–543 leading to succeeding subsystems.

T/C system 24d generates a clocking signal which is applied along a conducting line 544 to the clock (CLK) input of latches 530 and 531. T/C system 24d also generates a clear signal which is applied along a conducting line 545 to the inverted clear (CLR) inputs of latches 530 and 531. Latches 530 and 531 comprise output register 414 of FIG. 14.

As operated in the microprocessor 24e, only one of 12 bits of output register 414 will be raised to a logic one level at a given time. Thus, the output of register 414 may be used to control the operation of the status register 24f and the devices peripheral to the reader system as herein disclosed.

Status register 24f is a parallel-in-serial-out shift register receiving inputs from the transport system electronics on lines 546–549. More particularly, the Read Window signal is received by way of a conducting line 546 from the transport electronics and applied to input H of register 24f. In like manner, an end of field (EOF) signal is applied to the G input by way of a conducting line 547. Further, bar code modulation signals (BCMOD1, BCMOD2) indicating the type of modulation used in imprinting binary information upon a document are applied by way of conducting lines 548 and 549 to inputs F and E, respectively, of register 24f.

The SYNC signal applied by way of conducting line 550 to input D of register 419 indicates the synchronization of the reader electronics with bar data formats. Further, a signal RGSCOO applied by sync detector 24g, FIG. 3, along a conducting line 552 to the B input of register 24f indicates the presence of a correlation function peak. A signal BSPOS is generated by the bit synchronizer 24c and applied along a conducting line 553 to the A input of the register to indicate the time position of a detected bar within an expected bar time interval.

A load signal is generated by the output register 414 and applied along a conducting line 534 to the load(LD) input of the status register, while T/C system 24d, FIG. 3, applies a clocking signal along a conducting line 554 to the clock (CLK) input of register 24f. The output of the register 24f in turn is applied along a conducting line 445 to the memory input multiplexer 418, FIG. 14.

In operation, the status register is loaded under program instruction control by way of line 534 upon receipt of a clock signal on line 554. The contents of register 24f then are serially clocked along line 445 to the memory input multiplexer 418.

FIG. 19

Figure 19:
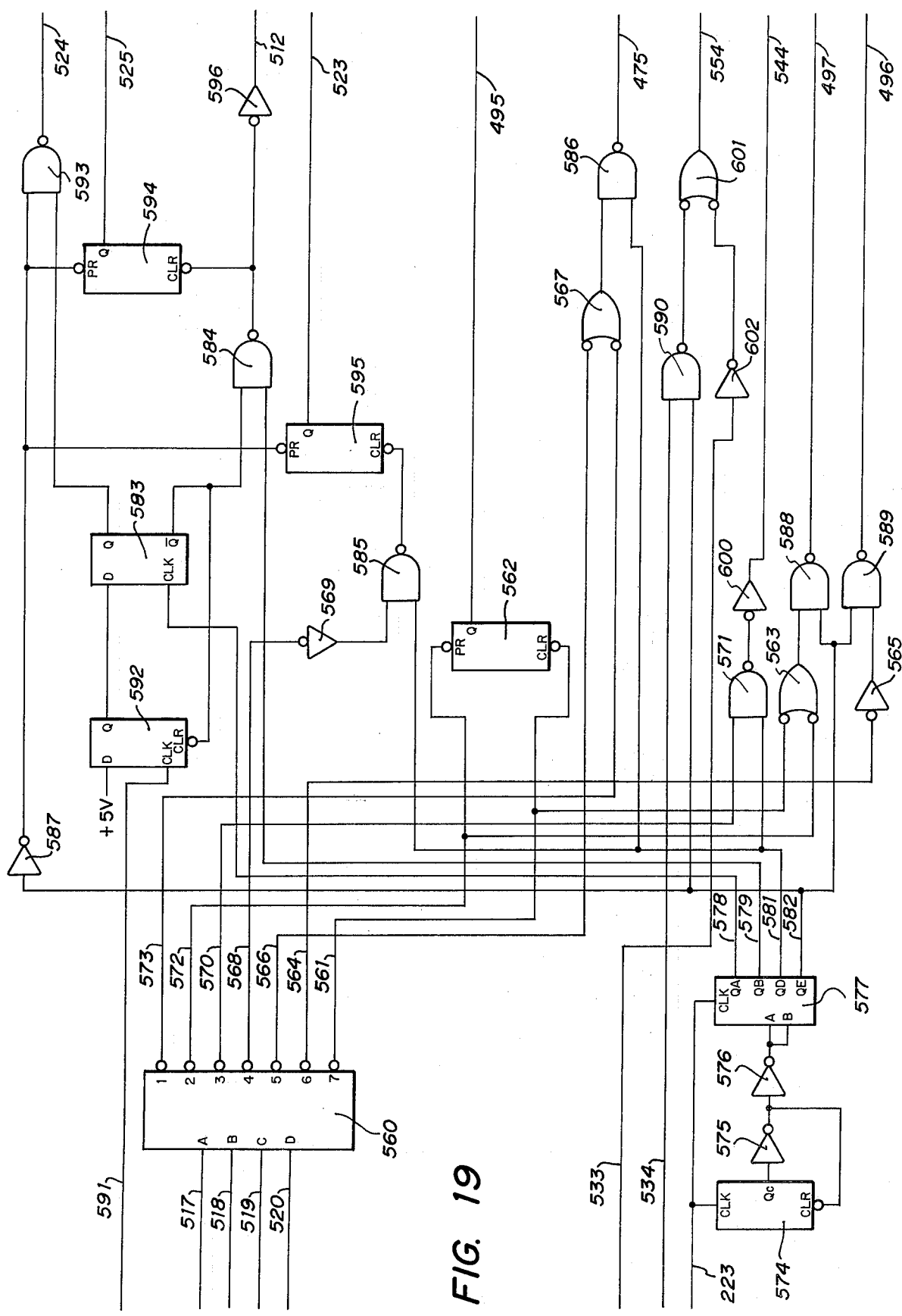
FIG. 19 is an electrical schematic diagram of a timing and control system serving the data processor of FIG. 3.

FIG. 19 illustrates in electrical schematic form the timing and control (T/C) system 24d of data processor 24. An instruction operation code output by register 411 is applied by lines 517–520 to inputs A–d, respectively, of a decade decoder 560. Inverted outputs 1–7 of decoder 560 in turn provide comands for controlling the microprocessor 24e during an execute cycle. More particularly, a load A register command, LDA, is generated at inverted output 7 of decoder 560, and is applied by way of a conducting line 561 to the inverted clear (CLR) input of a flip-flop 562 and to one input of a NOR gate 563. The load instruction selects the multiplexer 412, FIGS. 14 and 16, to memory 410, and subsequently loads the A register 420 from memory. A load B register command, LDB, which is applied by way of a conducting line 564 from inverted output 6 of decoder 560 to an input of an inverter 565, loads the B register from memory 410 during an execute cycle of the microprocessor 24e. A store adder command, STA, is applied by way of a conducting line 566 from inverted output 5 of decoder 560 to an input of a NOR gate 567. The store adder command selects the memory input multiplexer 418 to the output of adder 417 for storage in memory 410 during an execute cycle.

A branch instruction, BRU, at the inverted output 4 of decoder 560 is fed by way of a conducting line 568 to an input of an inverter 569. This instruction loads the program counter 415, FIGS. 14 and 17, with the 8 least significant bits of instruction register 411 during an execute cycle. When the microprocessor 24e is operating under other than a branch instruction, program counter 415 is merely incremented sequentially during the execute cycle.

A data output instruction, DTO, at inverted output 3 of decoder 560 is led by way of a conducting line 570 to an input of a NAND gate 571 to load the output register 414, FIGS. 14 and 18, directly from memory 410 during the execute cycle. An add instruction, ADD, is provided by way of a conducting line 572 from inverted output 2 of decoder 560 to the inverted preset input (PR) of flip-flop 562, and to a second input of NOR gate 563. The ADD instruction selects the A register multiplexer 412 to adder 417, and subsequently loads the A register 420 from adder 417.

A store status instruction, STS, is applied by way of a conducting line 573 from inverted output 1 of decoder 560 to a second input of NOR gate 567. When line 520 is high, memory input multiplexer 418, FIGS. 14 and 15, is selected to status register 24f. Upon the occurrence of a store status instruction on line 573, the serial output of status register 24f is loaded into memory 410 during an execute cycle.

The 13.52 MHz output of crystal oscillator 220, FIG. 9, is applied along line 223 to the clock (CLK) inputs of a synchronous binary counter 574 and a shift register 577. The QC output of counter 574 is connected to the input of an inverter 575, the output of which is connected to an inverted clear (CLR) input of the counter. The feedback through inverter 575 places counter 574 in a divide-by-five configuration. The output of inverter 575 is also connected to the input of an inverter 576, the output of which is applied to the A and B inputs of a shift register 577.

When counter 574 reaches a 5 count, a logic one level is presented to the A and B inputs of shift-register 577, and to the inverted clear input of counter 574. Upon the occurrence of a next clock signal, the logic one at the input of register 577 is loaded to the QA output of the register, and counter 574 is cleared. The logic one at the QA output is transferred to the QB output of register 577 by a next clock signal, and the QA output transitions to a logic zero. Succeeding clock pulses cycle the logic one through the remaining outputs QC–QE. Upon counter 574 again reaching a count of 5, which occurrence is synonymous with the appearance of a logic one at the QE output of register 577, the above-described process again occurs.

The action of counter 574 in conjunction with register 577 provides a noise-free clock signal which is utilized in T/C system 24d to control the operation of microprocessor 24e.

Microprocessor 24e is a fixed cycle machine, the operation cycles of which are defined by the register 577 outputs QA–QB and QD–QE appearing on conducting lines 578, 579, 581 and 582, respectively. More particularly, the timing interval defined by outputs QA and QB appearing on lines 578 and 579, respectively, comprises a fetch cycle in which a next instruction is fetched from memory 410 and loaded into the instruction register 411. The timing interval defined by outputs QD and QE appearing on lines 581 and 582, respectively, comprises an execute cycle during which an instruction stored in instruction register 411 is executed.

The QA output of register 577 is applied by way of lines 578 to the clock (CLK) input of a flip-flop 583. The QB output is applied by way of line 579 to an input of a NAND gate 584.

The QC output of register 577 remains open. However, the logic one value is cycled through the QC output to allow the outputs of memory 410 to settle between a fetch and an execute cycle.

The QD output of register 577 is led by way of line 581 to an input of NAND gates 585, 571 and 586. The QE output in turn is applied along line 582 to an input of an inverter 587, to an input of NAND gates 588 and 589, and to an input of a NAND gate 590.

The most significant bit at the output of bit syncronizer 24c, FIG. 3, is applied along a conducting line 591 to the clock (CLK) input of a flip-flop 592, the D input of which is connected to a +5 volt DC source. The Q output of flip-flop 592 in turn is connected to the D input of a filp-flop 583 having a $\overline{Q}$ output connected to the inverted clear (CLR) input of flip-flop 592. The $\overline{Q}$ output of flip-flop 583 also is connected to a second input of NAND gate 584, while the Q output is connected to an input of a NAND gate 593. A second input to NAND gate 593 is connected to the output of inverter 587 and to the inverted preset (PR) inputs of flip-flops 594 and 595.

The output of NAND gate 584 is applied to the inverted clear (CLR) input of flip-flop 594 and to the input of an inverter 596. The inverted clear input to flip-flop 595 is provided by the output of NAND gate 585 having a second input connected to the output of an inverter 569.

The output of NAND gate 593 in turn is applied along line 524 to the clear inputs of counters 516 and 515, FIG. 17, while the Q output of flip-flop 595 is applied along line 523 to the load inputs of counters 516 and 515. Counters 515 and 516 comprise the program counter 415.

The output of inverter 596 is led by way of line 512 to the clock input of latches 510 and 511, FIG. 17, comprising instruction register 411. The Q output of flip-flop 594 is turn is connected by way of line 525 to the select inputs of multiplexers 513 and 514, FIG. 17 comprising memory address multiplexer 416.

Upon receipt of the leading edge of the most significant bit pulse of bit synchronizer 24c at the clock input of flip-flop 592, the logic one at the D input of the flip-flop is transferred to the D input of flip-flop 583. During the next positive transition of the signal on line 578, the logic one at the D input of flip-flop 583 is transferred to the Q output of the flip-flop. Such transfer occurs during a fetch cycle of the microprocessor 24e.

Upon receiving a signal along line 582 during an execution cycle, a signal is generated at the output of NAND gate 593 and applied along line 524 to reset the program counter 415. An interrupt is generated thereby to take the microprocessor 24e out of a hold state and to initialize a program to be executed.

Simultaneously, during the transfer of a logic one from the D input to the Q output of flip-flop 583, a logic zero appears at the $\overline{Q}$ output to clear flip-flop 592. A logic zero subsequently is transferred from the D input to the Q output of flip-flop 583 upon the occurrence of a next positive transition of a signal on line 578. Normally, during a non-interrupt fetch cycle, i.e., a fetch cycle not initiated by the occurrence of a bit pulse from bit synchronizer 24c on line 591, the $\overline{Q}$ output of flip-flop 583 is high. During such fetch cycle, the logic one signal on line 579 generates a clock signal at the output of inverter 596 which is applied along line 512 to load the instruction register 411. However, during an interrupt fetch cycle, the $\overline{Q}$ output of flip-flop 583 transitions to a logic zero state to inhibit the load signal on line 512.

Upon the occurrence of a leading edge of a signal on line 582, flip-flop 594 is preset to transition the Q output to a logic one level. This logic level is applied along line 525 to select the memory address multiplexer 416 to the program counter 415. The address for the next program instruction to be stored in the instruction register 411 during a next fetch cycle is then presented to memory 410.

Upon receiving a timing signal along line 581 and a branch instruction, BRU, along line 568 during an execute cycle, flip-flop 595 is cleared to provide a logic zero to line 523. The load functions of counters 515 and 516, FIG. 17, are enabled thereby, and the 8 least significant bits of instruction register 411 are loaded under the control of a timing signal on line 521. The 8 least significant bits loaded from instruction register 411 are the address bits of the next instruction which the microprocessor 24e shall execute.

Termination of a branch instruction occurs during the timing interval when flip-flop 595 is preset to a logic one, thereby disabling the load signal on line 523. Simultaneously, the contents of the instruction register 411 are loaded into the program counter 415.

Upon receiving a logic zero along line 572 from decoder 560, flip-flop 562 is preset. A logic one thus appears at the Q output of the flip-flop, and is applied along line 495 to select the A register multiplexer 412 to the output of adder 417. When an LDA instruction is received from decoder 560 on line 561, flip-flop 562 is cleared and the Q output of the flip-flop transitions to a logic zero. Multiplexer 412 is selected thereby to the output of memory 410.

Continuing with the description of the timing and control system of data processor 24, the output of NAND gate 571 is connected to an input of an inverter 600 having an output applied along line 544 to the clock inputs of the output register 414. Upon the occurrence of a data output instruction, DTO, on line 570 and a timing signal on line 581, a clock signal generated at the output of inverter 600 loads the contents of a memory location into output register 414.

The output of NOR gate 563 is connected to a second input of NAND gate 588, while the output of inverter 565 is connected to a second input of NAND gate 589. Further, the output of NAND gate 588 is applied along a line 497 to the clock inputs of A register 420, and the output of NAND gate 589 is applied along a line 496 to the clock inputs of B register 413.

Upon the occurrence of either a load A register instruction, LDA, or an add instruction, ADD, and the simultaneous occurrence of a timing signal on line 582, a clock signal is generated at the output of NAND gate 588 to load the A register 420. In like manner, upon the occurrence of a load B register instruction, LDB, and the simultaneous occurrence of a timing signal on line 582, a signal is generated at the output of NAND gate 589 to load B register 413 from the output of memory 410.

The output of NOR gate 567 is connected to a second input of NAND gate 586, the output of which is applied along a line 475 to the inverted write-enable inputs of the RAMs comprising memory 410.

Upon the occurrence of a store adder instruction, STA, on line 566 or a store status register instruction, STS, on line 573, and the simultaneous occurrence of a timing signal on line 581, a write-enable signal is generated at the output of NAND gate 586 to load either the adder or the status register output into memory 410.

A second input to NAND gate 590 is applied by way of line 534 from output register 414. The output of NAND gate 590 in turn is connected to an input of a NOR gate 601, the output of which is applied along line 554 to the clock input of status register 24f, FIG. 18. In addition, output 2Q of latch 530 is connected by way of line 533 to an input of an inverter 602, the output of which is connected to a second input of NOR gate 601.

Upon the occurrence of a logic one from output register 414 on line 534, and the simultaneous occurrence of a timing signal on line 582, a clock signal is generated at the output of NOR gate 601 to parallel load status register 24f. Further, such clock signal is generated upon the occurrence of a logic one from output register 414 on line 533. However, a signal on line 533 merely shifts register 24f right one place.

FIG. 20

Figure 20A:
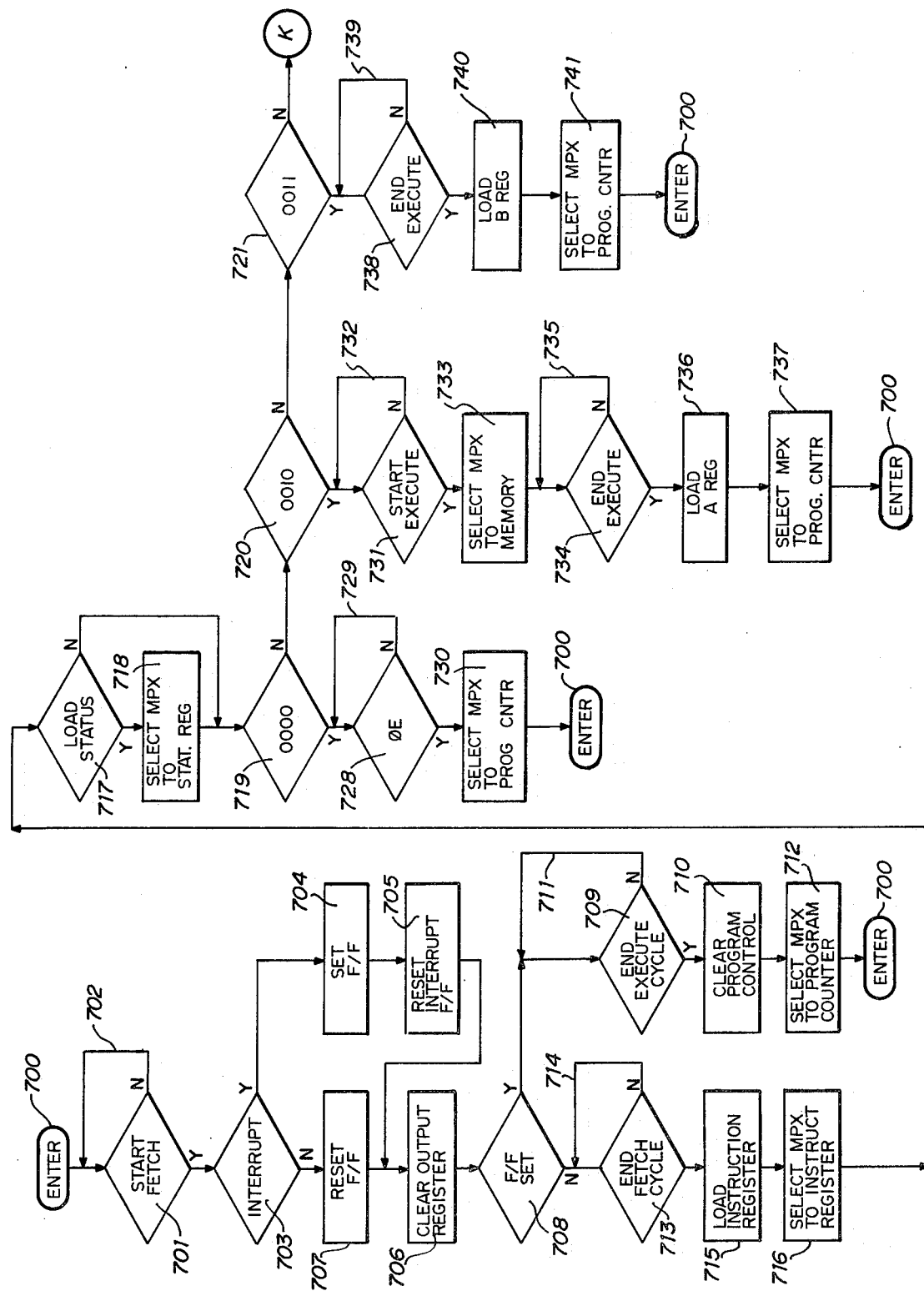
FIGS. 20A and 20B comprise a logic flow diagram of the operations performed by the microprocessor of FIG. 14.
Figure 20B:
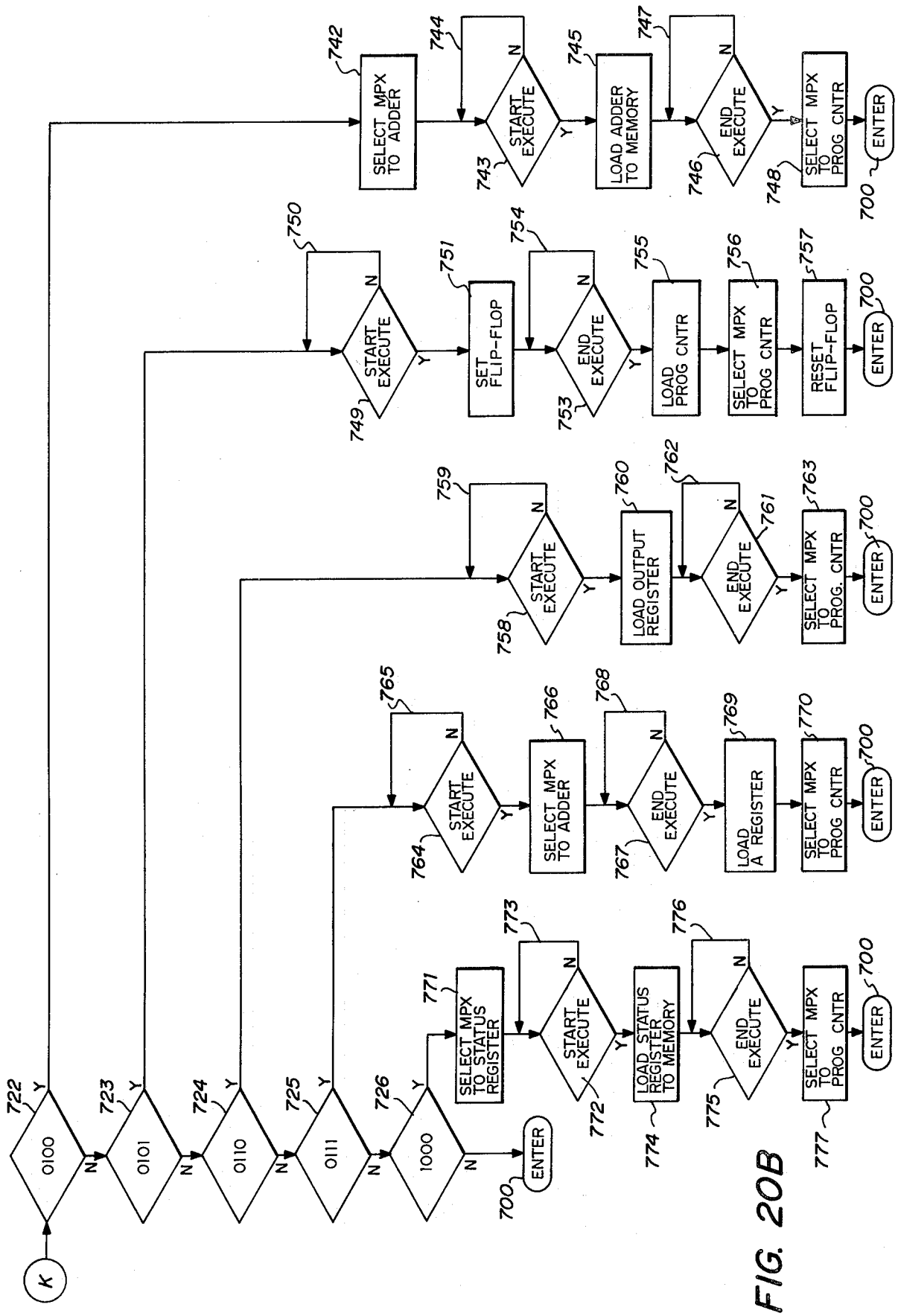

As a further aid in understanding the internal processes of microprocessor 24e, a flow chart of the fetch and execute cycles, and of other attendant processes of the microprocessor are illustrated in FIGS. 20A and 20B. Entry into the processor is made at logic step 700, from which a transfer is made to logic step 701 to test for the pressure of a timing signal at the QA output of shift register 577 indicating the beginning of a fetch cycle.

If the timing signal is not present, the processor recycles about loop 702 until the signal is detected. When the timing signal occurs, a transfer is made from step 701 to logic step 703 to test for the occurrence of an interrupt signal on line 591 leading to flip-flop 592, FIG. 19. If such an interrupt has occurred, a transfer is made from step 703 to logic step 704 to set flip-flop 583, FIG. 19. Flip-flop 592 of FIG. 19 then is reset at logic step 705, and a transfer is made to logic step 706 where the output register 414 is cleared.

If, however, an interrupt did not occur during the last machine cycle comprising both a fetch and an execute cycle, a transfer is made from step 703 to logic step 707, where flip-flop 583 is reset. A transfer then is made from step 707 to logic step 706 to clear output register 414, and thence to logic step 708 to sense the state of flip-flop 583.

If flip-flop 583 has been set, an interrupt on line 591 has occurred, and a transfer is made to logic step 709 to test for the occurrence of a timing signal at the QE output of register 577 indicating an end of an execute cycle. If the timing signal is present, a transfer is made from step 709 to logic step 710 where program counter 415, FIG. 17, is cleared. However, if the timing signal is not detected, the microprocessor recycles about loop 711 until the signal is detected.

From logic step 710, a transfer is made to logic step 712 where memory address multiplexer 416 is selected to program counter 415. From step 712, the microprocessor transfers back to the initial logic step 700. Thus, an interrupt has been detected and processed during one machine cycle, and the program counter has been reset to reinitialize the sequential logic process.

Referring again to logic step 708, if flip-flop 583 is not in a set state, a transfer is made from step 708 to logic step 713 to test for the presence of a timing signal at the QB output of register 577. If the timing signal is not present, the microprocessor cycles about loop 714 until the timing signal occurs. When the timing signal is detected, a transfer is made from step 713 to logic step 715 to load the instruction register 411 from memory 410.

From step 715, a transfer is made to logic step 716 where the memory address mulitplexer 416 is selected to the instruction register 411 to prepare the microprocessor 24e for an execution cycle. The microprocessor then transfers from step 716 to logic step 717 to test for the presence of a program instruction directing the storage of the serial output of status register 24f into memory 410.

If a load status register instruction is present, a transfer is made from step 717 to logic step 718 where memory input multiplexer 418 is selected to status register 24f. However, if the instruction is not present, a transfer is made from step 717 to logic step 719, the first of eight operation code tests. Further, step 719 represents the beginning of the exection cycle of the microprocessor 24e.

Logic steps 719–726 perform a series of tests to detect the presence of one of eight possible operation codes in a program instruction. At logic step 719, a test is made for the occurrence of a no-operation code (0000). If a no-operation code is present, a transfer is made from logic step 719 to logic step 728 to test for the presence of an end of fetch cycle signal at the QE output of register 577. If the timing signal is not present, the microprocessor cycles about loop 729 until the timing signal occurs. Upon the occurence of the timing signal, a transfer is made from logic step 728 to logic step 730 where the memory address multiplexer 416 is selected to program counter 415. From logic step 730, the microprocessor transfers back to the initial logic step 700.

If a no-operation code (0000) is not present, transfer is made from logic step 719 to logic step 720 to test for the presence of a load A register 420 command (0010). If the load command is present, the microprocessor transfers from step 720 to logic step 731 to test for the presence of a timing signal at QD output of register 577 indicating the beginning of an execute cycle. If the timing signal is not present, the microprocessor cycles about loop 732 to await the receipt of the timing signal. Upon the occurrence of the timing signal, a transfer is made from logic step 731 to logic step 733 where the A register multiplexer 412 is selected to memory 410. The microprocessor then proceeds to logic step 734 to test for the presence of a timing signal at the QE output of register 577 indicating an end execution.

If the timing signal is not present, the microprocessor cycles about loop 735 until the timing signal is received. Upon receipt of the timing signal, a transfer is made from step 734 to logic step 736 where the A register 420 is clocked to store the contents of a memory 410 location, the address of which is stored in the instruction register 411. In addition, the memory address multiplexer 416 is selected to the program counter 415 at logic step 737, and a transfer is made to reenter the initial logic step 700.

If a load A register command is not detected, a transfer is made from logic step 720 to logic step 721 to test for the presence of a load B register command (0011). If such a command is present, the microprocessor proceeds from step 721 to logic step 738 to test for the presence of a timing signal at the QE output of register 577, FIG. 19. If the timing signal is not present, the processor cycles about loop 739 to await the receipt of the timing signal. When the timing signal is received, a transfer is made from step 738 to logic step 740 to load the B register 413 from memory 410. In addition, multiplexer 416 is selected to program counter 415 at logic step 741, and a transfer is made to reenter step 700.

If a load B register command is not present, a transfer is made from logic step 721 through node K to logic step 722 to test for the presence of a store adder command (0100) in the program instruction being processed. If a store adder command is present, a transfer is made from step 722 to logic step 742 where the memory input multiplexer 418 is selected to adder 417. The microprocessor then proceeds to logic step 743, where a test is made for the presence of a timing signal at the QD output of register 577 indicating the start of an execution cycle.

If the timing signal is not present at the QD output, the processor cycles about loop 744 to await the receipt of the signal. When the timing signal is received, a transfer is made to logic step 745 to load the contents of adder 417 into a memory 410 location currently addressed by instruction register 411.

From step 745 a transfer is made to logic step 746 to test for the presence of a timing signal at the QE output of register 577. If the timing signal is not present, the processor cycles about loop 747 to await the receipt of the signal. When the timing signal is received, a transfer is made from step 746 to logic step 748 to select the memory address multiplexer 416 to program counter 415. A transfer then is made from step 748 to the initial logic step 700.

If a load adder command is not present, a transfer is made from step 722 to logic step 723 to test for the presence of a branch command (0101) in the program instruction. If a branch command is present, the microprocessor proceeds from step 723 to logic step 749 to test for the presence of a timing signal at the QD output of register 577. If the timing signal is not present, the microprocessor cycles about loop 750 to await the receipt of the timing signal. When the timing signal is received, a transfer is made from step 749 to logic step 751, where flip-flop 595 of FIG. 19 is reset. The presence of a logic zero at the Q output of the flip-flop enables the parallel load input of program counter 415, FIG. 17, thereby loading the contents of register 411 into the counter upon the occurrence of a next clock signal. Normally, flip-flop 595 is in a set state, wherein the program counter 415 is incremented upon the occurrence of each clock signal at the QE output of shift register 577, FIG. 19.

From step 751, the microprocessor proceeds to logic step 753 to test for the occurrence of a timing signal at the QE output of register 577. If the timing signal is not present, the microprocessor cycles about loop 754 to await the receipt of the signal. Upon receiving the timing signal, a transfer is made from step 753 to logic step 755, where the program counter 415 is loaded with the contents of the instruction register 411. The microprocessor then proceeds to logic step 756 where the memory address multiplexer 416 is selected to the program counter 415. Flip-flop 595 then is set at logic step 757, thereby indicating the end of a branch instruction execution, and a transfer is made from step 757 to reenter step 700.

If a branch instruction is not present in the program instruction, a transfer is made from logic step 723 to logic step 724 to test for the presence of a data output operation code (0110) in the program instruction. If such a code is present, the microprocessor proceeds from step 724 to logic step 758 to test for the presence of a timing signal at the QD output of register 577. If the signal is not present, the microprocessor cycles about loop 759 to await the receipt of the signal. Upon receiving the timing signal, a transfer is made from step 758 to logic step 760 where the output register 414 is loaded from memory 410. A transfer then is made from logic step 760 to logic step 761 to test for the presence of a timing signal at the QE output of register 577, FIG. 19. If the signal is not present, the microprocessor cycles about loop 762 until the timing signal is received. Upon receiving the timing signal, a transfer is made from step 761 to logic step 763 where the memory address multiplexer 416 is selected to program counter 415. A transfer then is made to reenter step 700.

If the data output operation code is not present, a transfer is made from logic step 724 to logic step 725 to test for the presence of an add operation code (0111). If an add code is present, a tranfer is made from logic step 725 to logic step 764 to detect the presence of a timing signal at the QD output of register 577. If the timing signal is not present, the processor cycles about loop 765 to await the receipt of the signal. Upon receiving the timing signal, a transfer is made from step 764 to logic step 766 where the A register multiplexer 412 is selected to adder 417. The microprocessor then proceeds from step 766 to logic step 767 to test for the presence of a timing signal at the QE output of register 577. If the signal is not present, the processor cycles about loop 768. Upon detecting the signal, a transfer is made from step 767 to logic step 769 to load the A register 420 with the contents of adder 417. Memory address multiplexer 416 then is selected to program counter 415 at logic step 770, and a transfer is made to reenter logic step 700. Thus, after A register 420 and B register 413 have been loaded from memory 410, the register contents are added in adder 417 and stored in A register 420. Upon information from memory 410 being loaded into B register 413, the process repeats as an accumulation wherein the sums of the contents of the A register and the B register are loaded into the A register 420 upon the occurrence of an add instruction.

If an add instruction is not present in the program instruction, a transfer is made from logic step 725 to logic step 726 to test for the occurrence of a store status register command (1000). If a store status register command is present, the microprocessor proceeds from step 726 to logic step 771 where the memory input multiplexer 418 is selected to status register 419. From step 771, a transfer is made to logic step 772 to test for the presence of a timing signal at the QD output of register 577. If the signal is not present, the microprocessor cycles about loop 773 to await the receipt of such a signal. When the timing signal is received, a transfer is made from step 772 to logic step 774, where the contents of status register 419 are loaded into the memory location addressed by the instruction register 411. The microprocessor then proceeds from step 774 to logic step 775 to test for the presence of a timing signal at the QE output of register 577. If the timing signal is not present, the microprocessor cycles about loop 776 to await the occurrence of the signal. When a timing signal occurs, a transfer is made from step 775 to logic step 777, where the memory address multiplexer 416 is selected to program counter 415. Transfer then is made to reenter logic step 700. If no operation codes are detected in the program instruction, the process continues through a main loop comprising logic steps 700–701, 703–710, 712–713 and 715–726, until a recognized instruction may be decoded, or until an interrupt occurs.

FIG. 21

Figure 21:
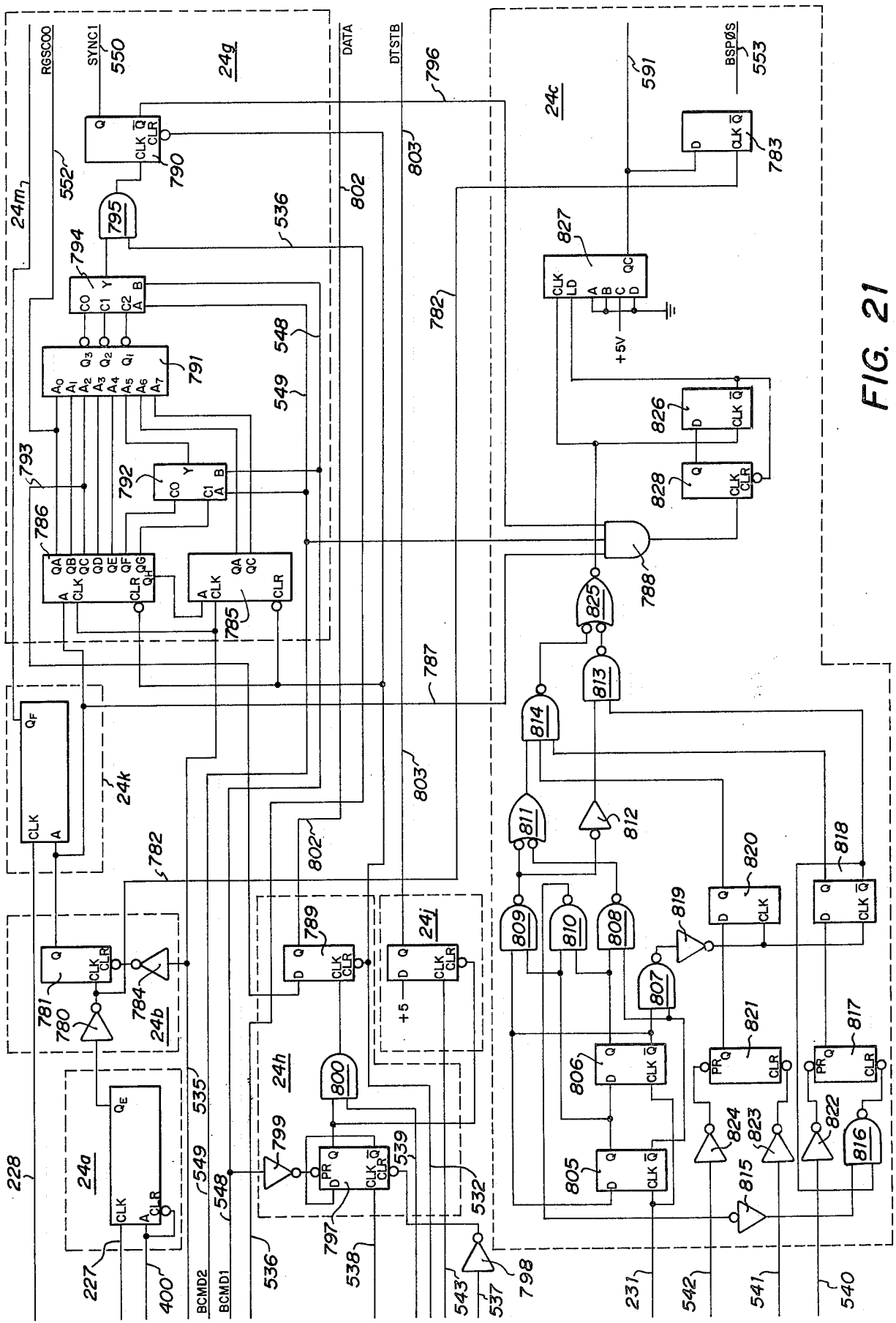
FIG. 21 is an electrical schematic diagram of that part of the data processor of FIG. 3 which is peripheral to the microprocessor of FIG. 14.

FIG. 21 illustrates those devices peripheral to microprocessor 24e and comprising data processor 24, FIG. 3. A 422 KHz timing signal is output by counter 222, FIG. 9, along line 227 and applied to the clock (CLK) input of width detector 24a, a shift register. A signal output by zero-cross detector 23e of FIG. 13 is applied along line 400 to the A and inverted clear (CLR) inputs of detector 24a. Detector 24a tests for the threshold width of the signal output by detector 23e. If a return to zero occurs before threshold width is detected, the detector 24a is reset.

The QE output of detector 24a is applied to the input of an inverter 780, the output of which is applied to the clock (CLK) input of a flip-flop 781. The QE output of the detector 24a also is applied through inverter 780 and along a conducting line 782 to the clock (CLK) input of a flip-flop 783 of bit synchronizer 24c.

The inverted clear (CLR) input of flip-flops 781 is provided by output register 414 by way of line 535 and through an inverter 784. Line 535 also leads to the clock inputs of shift-registers 785 and 786. Inverters 780, 784 and flip-flop 781 comprise bar detector flip-flop 24b.

The Q output of flip-flop 24b is connected to the A input of correlation dump delay circuit 24k which is a shift register, to the A input of shift register 786, and along a conducting line 787 to one input of an AND gate 788. The QF output of correlator dump delay 24k in turn is applied along line 24m to shift register memory 22d, FIG. 11.

When the amplitude criteria has been met in bar detector 23, FIG. 3, and a threshold width has been detected by width detector 24a, bar detector flip-flop 24b is clocked to raise the Q output of the flip-flop to a logic one level. Such output signals a bar presence during the time interval in which a bar may occur. The correlator dump delay 24k is initiated thereby to output a correlator dump signal along line 24m after a predetermined delay.

During a wait or hold state of the microprocessor 24e, a signal is carried along a data line 532 to the inverted clear input of a flip-flop 789, to the inverted clear inputs of shift registers 785 and 786, and to the inverted clear input of a flip-flop 790. In addition, the QH output of shift register 786 is connected to the A input of shift register 785, while the QA–QE outputs are connected to the A0–A4 inputs, respectively, of a ROM 791. The QF and QG outputs of shift register 786 in turn are connected to the C0 and C1 inputs, respectively, of a multiplexer 792. The QA output of register 786 also is applied along line 552 to status register 24f, and the QC output also is applied along a conducting line 793 to the D input of flip-flop 789.

The QA and QC outputs of shift register 785 are connected to the A6 and A7 inputs, respectively, of ROM 791. The Q1, Q2 and Q3 outputs of ROM 791 in turn are connected to the C2, C1 and C0 inputs, respectively, of a multiplexer 794.

The A and B select inputs of multiplexer 794, and the A and B select inputs of multiplexer 792 are provided by a transport electronics system along lines 549 and 548, respectively. The Y output of multiplexer 792 in turn is connected to the A5 input of ROM 791, while the Y output of multiplexer 794 is connected to one input of an AND gate 795. A second input of AND gate 795 is provided by way of line 536 leading to output register 414 of microprocessor 24e.

The output of AND gate 795 is applied to the clock (CLK) input of flip-flop 790, the Q output of which is applied along line 550 as the SYNC input to status register 24f. The $\overline{Q}$ output of flip-flop 790 is applied by way of a conducting line 796 to a second input of AND gate 788. A third input to AND gate 788 is provided by the transport electronics system by way of line 549. Shift registers 785 and 786, multiplexers 792 and 794, ROM 791, AND gate 795 and flip-flop 790 comprise synchronization detector 24g, FIG. 3.

In operation, the transport electronics system indicates by way of line 549 the type of modulation employed in the bar code format imprinted on a document surface, thereby selecting multiplexers 792 and 794 to the appropriate outputs of register 786 and ROM 791, respectively. When a bar presence is indicated by the Q output of flip-flop 781, the output is loaded into the serial-input-parallel-output (SIPO) register comprised of shift-registers 785 and 786. The outputs of registers 785 and 786 thus address the memory locations of ROM 791, which has stored therein values corresponding to permissable synchronization bar code patterns.

More particularly, the values stored in ROM 791 constitute all possible combinations of any four of six consecutive bar code signal detections that may occur for permissible bar code formats. When any four of six signals addressing ROM 791 are at a logic one level, a logic one is output by ROM 791. Thus, if a permissible synchronization bar code pattern is present, a signal is output by ROM 791 to clock flip-flop 790 upon command of microprocessor 24e. The Q output of flip-flop 790 thereby indicates when the bar reader electronics are synchronized with an input video signal.

Continuing with the description of the system of FIG. 21, an output of register 414, FIG. 18, is applied along line 538 to the clock input of a flip-flop 797. The inverted clear (CLR) input of flip-flop 797 is provided by an inverter 798 having an input supplied by output register 414 by way of line 537. The $\overline{Q}$ output of flip-flop 797 in turn is connected to the D input of the flip-flop. The Q output of flip-flop 797 is applied to an input of an AND gate 800, a second input of which is connected by way of line 539 to an output of register 414. The Q output of flip-flop 797 also is applied to the inverted clear (CLR) input of data strobe flip-flop 24j, FIG. 3, the clock input to which is supplied by output register 414 by way of line 543. The inverted preset input (PR) of flip-flop 797 is supplied by an inverter 799, the input of which is connected to line 548.

The output of gate 800 provides a clocking signal to the clock (CLK) input of flip-flop 789. The Q output of flip-flop 789 is applied by way of a conducting line 802 as a data output to succeeding subsystems for further processing, while the Q output of flip-flop 24j is supplied along a conducting line 803 as a data strobe to such succeeding subsystems. Flip-flop 797, gate 800 and flip-flop 789 comprise the bi-phase to NRZ converter 24h, FIG. 3.

In operation, where bar-no-bar modulation is being used, the output of inverter 799 transitions to a logic zero level, thereby presenting a logic one to an input of AND gate 800 and to the inverted clear input of flip-flop 24j. In sequence, when bit O of the output register 414 transitions to a logic one, flip-flop 789 is cleared. When bit seven of output register 414 transitions to a logic one level along line 539, the QC output of shift register 786 is transferred from the D input to the D output of flip-flop 789. Thereafter, when bit eleven of output register 414 transitions to a logic one level along line 543, a +5 volt source at the D input of flip-flop 24j is clocked to the Q output of the flip-flop.

Prior to the clocking of a next data bit through flip-flop 789, flip-flop 24j is cleared by a transition to a logic one level occurring on line 538. Thus, a data strobe pulse is generated on line 803 which is delayed from the data bit transmissions occurring on line 802.

The bar-code reading system disclosed herein provides for the detection of both bar-no-bar modulation and bi-phase modulation. In bar-no-bar modulation, a shown in Table II, data is encoded by the occurrence or non-occurrence of a bar within a time period called a bit bin.

TABLE II

| Bit Bin | 0 | 1 | 2 | 3 | 4 | 5 | 6 | 7 | 8 |
|---|---|---|---|---|---|---|---|---|---|
| Logic Data | 1 | 0 | 0 | 1 | 1 | 1 | 0 | 1 | 0 |
| Bar Pattern | 1 | | | 1 | 1 | 1 | | 1 | |

In bi-phase modulation, as shown in Table III, each bit bin is divided into two half-periods. Further, a logic one data input is represented by a (0,1) bi-phase symbol, while a logic zero data input is represented by a (1,0) symbol. The corresponding bar patterns results from the occurrence of a bar in a first half-period of a bit bin for a logic zero data input, and in a second half-period of a bit bin for a logic one data input.

TABLE III

| Bit Bins | 0 | | 1 | | 2 | | 3 | | 4 | | 5 | | 6 | | 7 | | 8 | |
|---|---|---|---|---|---|---|---|---|---|---|---|---|---|---|---|---|---|---|
| Logic Data | 1 | | 0 | | 0 | | 1 | | 1 | | 1 | | 0 | | 1 | | 0 | |
| Bi-Phase | 0 | 1 | 1 | 0 | 1 | 0 | 0 | 1 | 0 | 1 | 0 | 1 | 1 | 0 | 0 | 1 | 1 | 0 |
| Bar Pattern | | 1 | 1 | | 1 | | | 1 | | 1 | | 1 | 1 | | | 1 | 1 | |

Continuing with the description of data processor 24 as illustrated in FIG. 21, the preset input of flip-flop 797 is disabled for normal operation in the event biphase modulation is utilized. Upon detection of synchronization between the bar code reader electronics and an input video signal, as indicated by the Q output of flip-flop 790 on line 550, a signal is output on line 537 by microprocessor 24e to clear the contents of flip-flop 797. A clock signal then occurs on line 538, and the Q output of flip-flop 797 transitions to a logic one level. The AND gate 800 thus is enabled for a microprocessor 24e clock signal on line 539.

When the output of AND gate 800 transitions to a logic one level, a data bit at the D input of flip-flop 789 is transferred to the Q output of the flip-flop. If the data bit is present when the Q output of flip-flop 790 transitions to a logic one to signify synchronization between the bar code reader electronics and an input video signal, the bit data is recognized as a synchronization bit which preceeds the encoded data field and thus is decoded as a logic one. Thereafter, during each half-period of an expected bar signal time interval or bit bin, a signal is generated on line 538 to toggle flip-flop 797. Gate 800 thus is disabled during the first half of each such bar interval.

Positive transitions appearing on line 539 from output register 414 define the time boundaries of each half-period of a time interval during which a bar video signal may be detected. As AND gate 800 is disabled during the first half-period of such time intervals, flip-flop 789 is toggled only during the second half-period to provide a bi-phase to NRZ conversion along line 802.

Subsequent to flip-flop 789 being clocked to transfer information from the D input to the Q output thereof, a positive transition on line 538 occurs to toggle flip-flop 797 and disable AND gate 800. Concurrently, flip-flop 24j is cleared. Thus, the clock signal on line 538 clears flip-flop 24j in a half-period of a bar time interval subsequent to that during which information was transferred from the D input to the Q output of flip-flop 789.

Upon the occurrence of a next positive transition on line 543, a logic one is generated at the Q output of flip-flop 24j, but delayed from the output signal at the Q output of flip-flop 789. Flip-flop 24j then is cleared during the next half-period of the bar time interval.

Continuing with the description of data processor 24, the output of multiplexer 229, FIG. 9, is applied by way of line 231 to the clock inputs of flip-flops 805 and 806. The $\overline{Q}$ output of flip-flop 805 is connected to an input of a NAND gate 807, and to an input of a NAND gate 808. The $\overline{Q}$ output of flip-flop 806 is connected to the D input of flip-flop 805, to a second input of NAND gate 807, and to an input of a NAND gate 809. The Q output of flip-flop 806 in turn is applied to a second input of NAND gate 808, and an input to a NAND gate 810. The Q output of flip-flop 805 is connected to the D input of flip-flop 806, to a second input of NAND gate 810, and to a second input of NAND gate 809.

Flip-flops 805 and 806, NAND gates 807, 808, 809 and 810 comprise a modulo-2 counter generating sequential timing pulses at the outputs of NAND gates 807–810.

The output of NAND gate 809 is connected to the input of a NOR gate 811, and through an inverter 812 to an input of a NAND gate 813. The output of NAND gate 808 is connected to a second input of NOR gate 811, the output of which is connected to an input of a NAND gate 814.

The output of NAND gate 810 is applied through an inverter 815 to an input of a NAND gate 816, the output of which is applied to the inverted clear input (CLR) of flip-flop 817. A second input to NAND gate 816 is supplied by the $\overline{Q}$ output of a flip-flop 818, the Q output of which is connected to a second input of NAND gate 814. The $\overline{Q}$ output of flip-flop 818 is connected to a second input of NAND gate 813.

The Q output of flip-flop 820 is connected to a third input of NAND gate 814, while the D input of the flip-flop is connected to the Q output of a flip-flop 821. The clock inputs (CLK) of flip-flops 818 and 820 are supplied by the output of NAND gate 807 through an inverter 819.

The D input of flip-flop 818 is connected to the Q output of flip-flop 817, the inverted preset input (PR) of which is supplied by the eighth bit of register 414 along line 540 and through inverter 822. The ninth bit of the register 414 is applied along line 541 and through an inverter 823 to the inverted clear input (CLR) of flip-flop 821, the inverted preset input (PR) of which is supplied by the tenth bit of register 414 applied along line 542 and through inverter 824.

The output of NAND gate 814 is applied to an input of a NOR gate 825 having a second input supplied by the output of NAND gate 813. The output of NOR gate 825 in turn is applied to the clock input of a flip-flop 826, and to the clock input of a counter 827.

The D input of flip-flop 826 is connected to the Q output of a flip-flop 828, while the $\overline{Q}$ output of flip-flop 826 is connected to the inverted clear input of flip-flop 828. The $\overline{Q}$ output of flip-flop 826 also is connected to the load input (LD) of counter 827. The clock input of flip-flop 828 is supplied by AND gate 788.

The A, B and D inputs of counter 827 are shorted to ground, while the C input is connected to a positive 5 volt source. The QC output of counter 827 in turn is connected to the D input of flip-flop 783, and applied along a conducting line 591 to the clock input of a flip-flop 592, FIG. 19. The $\overline{Q}$ output of flip-flop 783 is applied along line 553 to status register 24f, FIG. 18.

Flip-flops 783, 805, 806, 817, 818, 820, 821m, 826, and 828; gates 788, 807–811, 813, 814, 821, and 825; inverters 812, 815, 819, 822–824; and counter 827 comprise bit synchronizer 24c, FIG. 3.

The modulo-2 counter comprising flip-flops 805 and 806 generates four timing intervals in sequence at the output of gate 807, 809, 810 and 808. The generation of one sequence of such timing intervals constitutes a single clock interval of counter 827, the QC (most significant bit) output of which generates an interrupt along line 591 at twice the bar information rate of 13.2 KHz.

The QC output of counter 827 acts to clear program counter 415 of microprocessor 24e, and thus reinitialize the microprocessor by addressing the first memory position of memory 410.

When width detector 24a issues a clocking signal along line 782 to toggle flip-flop 783, microprocessor 24e issues a set interrupt command by way of line 540. More particularly, the $\overline{Q}$ output of flip-flop 783 is applied along line 553 to status register 24f to be processed by microprocessor 24e. The $\overline{Q}$ output of flip-flop 783 indicates the relationship of the most significant bit of counter 827 at the instant a main lobe peak of a correlation function signal has been detected by width detector 24a. This information is used by microprocessor 24e in determining whether counter 827 must be decremented, or incremented by one clock signal to synchronize the most significant bit output of counter 827 with the expected time positions of bar code signals.

If the most significant bit is at a logic zero level when the correlation function peak is detected the microprocessor 24e issues an increment command along line 542 to set flip-flop 821. However, if the most significant bit is at a logic one level, then a decrement command is issued along line 541 to clear flip-flop 821. Thus, the microprocessor utilizes the $\overline{Q}$ signal of flip-flop 783 to synchronize the execution of the microprocessor program with the occurrence of a correlation function peak. As the counter 827 is running at twice the bar information rate, the microprocessor may execute a complete program in each of two halves of an expected bar time period to accommodate bi-phase modulation.

In operation, flip-flop 817 is preset by microprocessor 24e upon the occurrence of a correlation function peak. If the most significant bit output of counter 827 occurs prior to the detected peak, flip-flop 821 is preset to generate one extra clock pulse at the clock input of counter 827. If the most significant bit occurs late, however, flip-flop 821 is cleared to delete one clock pulse at the clock input of counter 827.

Before a clock pulse correction is made, however, the increment or decrement command resident in flip-flop 821 is synchronized with the interrupt request resident in flip-flop 817. Such synchronization occurs during the first of four timing intervals generated by the modulo-2 counter comprising flip-flops 805 and 806. The first timing interval, phase A, is generated at the output of NAND gate 807 to strobe flip-flops 820 and 818, thereby simultaneously loading the increment or decrement command into flip-flop 820 and the interrupt command into flip-flop 818.

Under normal operations and with no interrupt occurring along line 540, gate 814 is disabled while 813 is enabled. Thus, the timing interval, phase B, provided at the output of gate 809 is applied continuously to the clock input of counter 827. Upon the occurrence of an interrupt, however, gate 814 is enabled during one clock interval only. One clock interval to counter 827 comprises a single sequence of the four timing intervals provided at the outputs of gates 807, 809, 810 and 808, respectively.

If an increment command occurs during a clock interval that gate 814 is enabled, the gate 809 output and the gate 808 output, phase D, are applied through gate 814 to increment the clock input of counter 827. However, if a decrement command occurs during such clock interval, both gate 814 and gate 813 are disabled. Thus, there is not clock pulse to the clock input of counter 827 and a decrement occurs.

Under bar-no-bar modulation with no synchronizing bars, synchronization occurs upon detecting the presence of two sequential bars. Prior to this time, however, and upon the occurrence of a bar detection signal at the Q output of flip-flop 781, a timing pulse is generated by flip-flop 828 and flip-flop 826 under the control of gate 788 to load counter 827. The load process repeats upon detection of each bar signal of flip-flop 781 until a synchronizing signal occurs at flip-flop 790. Thereafter, the operation of the bit synchronizer is as has been previously described.

The timing interval provided at the output of gate 810, phase C, constitutes the third of the four timing intervals generated by the modulo-2 configuration of flip-flops 805 and 806, and serves to clear flip-flop 817 after an interrupt occurs. More particularly, after an interrupt occurs on line 540, the flip-flop 817 is preset thereby and the Q output of the flip-flop transitions to a logic one level. During the timing interval defined by the output of gate 807, the interrupt is clocked through flip-flop 818 to the input of NAND gate 814. Thereafter, during the timing interval defined by the output of gate 810, the flip-flop 817 is cleared.

FIG. 22

FIG. 22 illustrates a flow diagram of the bar-code reader in processing bi-phase and bar-no-bar modulated bar-code signals. Upon the occurrence of a positive transition at the QC output of counter 817, FIG. 21, entry is made to logic step 900. A transfer then is made to logic step 901 to load the bar presence signal of bar detector 24b into shift register 786 of synchronization detector 24g. In addition, flip-flop 781 is cleared.

From step 901, transfer is made to logic step 902 where the bit pattern resident in shift-registers 785 and 786 is tested for conformance with predetermined synchronization patterns stored in ROM 791. For bi-phase modulation, every other output of shift registers 785 and 786 forms a significant address to ROM 791. For example, outputs QA, QC, QE and QG of register 786, and outputs QA and QC of register 785 collectively form the significant address to ROM 791. If a bar-no-bar modulated data field is being processed, the QA–QF outputs of register 786 form the significant address to the ROM 791. As before described, ROM 791 has stored therein all possible combinations of 4 bar detections out of 6 expected bar time intervals.

When a logic one appears at the Y output of multiplexer 794, not only has the 4 out of 6 criteria been met, but also the phasing between an incoming video data and the bar code reader electronics has been synchronized as provided by bit synchronizer 24c.

If the resident pattern conforms to a synchronization pattern stored in ROM 791, a transfer is made from step 902 to logic step 903 and a synchronization signal is generated on line 550 at the Q output of flip-flop 790. A transfer then is made from step 903 to logic step 904, where the status register 24f is parallel loaded with status information. However, if the bit patterns resident in registers 785 and 786 do not conform with the predetermined synchronization patterns, a transfer is made directly from step 902 to logic step 904.

From logic step 904, a transfer is made to logic step 905 to detect the presence of a Read Window signal received from the transport system electronics. If the signal is not present, a transfer is made from step 905 to logic step 906 to test for the presence of an interrupt signal, the leading edge of the most significant bit of counter 827. Upon the occurrence of an interrupt, the microprocessor returns along loop 907 to logic step 901. If an interrupt signal is not present, however, a transfer is made from logic step 906 to logic step 908 where the bar detector flip-flop 24b, the sync detector 24g, the bi-phase to NRZ converter 24h and the data strobe flip-flop 24j are cleared. From step 908, logic step 906 is reentered to await the occurrence of an interrupt.

If a Read Window signal is present at logic step 905, a transfer is made from step 905 directly to logic step 909 to test for the occurrence of an end of data field signal. If the end of field (EOF) signal is detected, then a transfer is made to logic step 906 to test for the presence of an interrupt as before described. However, if an EOF signal is not present, then a transfer is made from logic step 909 to logic step 910 to test for the presence of a synchronization signal at the output of sync detector 24g. If a synchronization signal is not detected, then a transfer is made from step 910 to logic step 911 to clear flip-flop 797 of the bi-phase to NRZ converter 24h. The flip-flop is used to initialize the converter and thus correct phasing in the decoding of bi-phase modulated data. For example, when synchronization bars leading a data field are being decoded, the converter must be initialized so as to decode as logic ones those bar signals occurring in the second half of a bar time period. If the converter were initialized so as to decode information in the first half of the time period, then logic zeroes would be decoded for every bar present.

If a synchronization signal is detected at the output of sync detector 24g, a transfer is made from step 910 to logic step 912 where converter 24h performs a bi-phase to NRZ conversion upon bi-phase modulated data. Thus, upon synchronization occurring as indicated by the synchronization patterns resident in shift registers 785 and 786, the output of synchronization detector 24g will transition to a logic one level on line 550. Line 550 remains high until an end of field occurs or a Read Window signal ceases to occur. At such time, the line 550 transitions to a logic zero. When a logic zero on line 550 occurs, a flip-flop 797 is cleared to present a logic zero at the input of gate 800 and thus inhibit the clock input to flip-flop 789. As flip-flop 789 has previously been cleared, the data output remains at a logic zero.

When synchronization occurs, flip-flop 790 is set and the Q output on line 550 is at a logic one level. The flip-flop 797 then is clocked to present a logic one to the intput of gate 800 to initiate a transfer of information from the D input to the Q output of flip-flop 789. Flip-flop 797 will not be cleared until an EOF signal is received or until a Read Window signal ceases to be detected. However, the flip-flop is clocked during each processing interval initiated by the bit synchronizer 24c interrupt appearing on line 591.

It is to be remembered that the bit synchronizer 24c produces an interrupt at the beginning of the first half of a bar time period, at the half-way mark of the time period, and at the end of the time period. Thus, during each time period or bit bin, there are two process intervals. As gate 800 alternately is enabled and disabled, the flip-flop 789 is clocked so that the transfer of information from the D input to the Q output of the flip-flop occurs during the second half of a bar time period.

Continuing with the description of the flow diagram of FIG. 22, a transfer next is made from logic step 912 to logic step 913 to test for the presence of a bar signal. As the processing that occurs is delayed a half-period of a bar time interval after the presence of a bar is detected at the output of flip-flop 24b, a bar presence decision is made from information stored in the status register 24f. Thus, when a bar has been detected or an interrupt generated at the most significant bit output of counter 827, the Q output of flip-flop 781 indicating a bar presence is loaded into shift register 786. The bar presence signal then is applied along line 552 as the signal RGSCOO. Flip-flop 781 then is cleared for further processing of succeeding bar signal information.

Referring again to logic step 913, if a bar presence signal is detected at step 913, a transfer is made to logic step 914 to update bit synchronizer 24c. When a bar has been detected during the preceeding processing interval, the bit synchronizer 24c output on line 591 is loaded into flip-flop 783 at the time of the occurrence of such bar. If line 591 transitions to a logic one before a bar signal is detected in a half-period of a bar time interval, then the $\overline{Q}$ output of flip-flop 783 transitions to a logic zero. However, if line 591 transitions to a logic one after a bar is detected, $\overline{Q}$ output of flip-flop 783 transitions to a logic one. The $\overline{Q}$ output of flip-flop 783 is stored in status register 24f and processed to either increment or decrement the bit synchronizer 24c by one clock count during a process cycle. The trailing edge of the bit synchronizer 24c output on line 591 thus converges toward a bar detection signal by one count during each processing interval until synchronization is achieved. A transfer then is made from logic step 914 to logic step 915.

Further, if a bar is not present at logic step 913, a transfer is made directly to logic step 915 to test for synchronization between the bar reader electronics and the input video signal as before described with step 910. If synchronization is detected, a transfer is made from logic step 915 to logic step 916 where flip-flop 24j is clocked. The D input of the flip-flop is transferred thereby to the Q output, and applied as a data strobe along line 803. The flip-flop is not reset until the occurrence of a next interrupt along line 591 from the bit synchronizer 24c.

From step 916, a transfer is made to logic step 917. Further, if synchronization is not detected at logic step 915, a transfer is made directly from step 915 to logic step 917 without generating a data strobe on line 803.

At step 917, a test is made for the presence of an interrupt at the QC output of counter 827. If an interrupt is not present, the microprocessor merely recycles along loop 918 until an interrupt occurs. When an interrupt occurs, a transfer is made from logic step 917 to reenter step 900, where a next processing cycle is initialized. Thus, the entire process from step 900 through step 917 is executed upon the occurrence of an interrupt from bit synchronizer 24c along line 591. When a process cycle is completed, the microprocessor enters a wait state until a next interrupt occurs and the process is then repeated. It is to be understood that there are two such processing cycles in each bar time interval, as the bit synchronizer 24c interrupt defines not only the boundaries of the time interval, but also the mid-point of the time interval.

In accordance with the invention, there is provided a bar-code reading system for detecting the bars forming an encoded data field from a sensor-generated signal having a noise level high with respect to the information content. The signal is logarithmically normalized by a signal conditioner to reduce variation in signal strength due to the effects of noise. A correlator then operates upon the preprocessed signal to maximize the signal to noise ratio by performing a real time cross-correlation between the signal and a resident waveform having an expected wave shape of a detected bar signal. The resulting correlation function is processed to detect the presence of each bar read from a document surface.

Having described the invention in connection with certain specific embodiments thereof, it is to be understood that further modifications may now suggest themselves to those skilled in the art. For example, a magnetic sensor may be substituted for the photomultiplier tube 20, and differentiator 21c may be deleted from signal conditioner 21 to provide a cross-correlation bar-code reader for detecting a bar font imprinted with magnetic ink on a document surface. It is intended to cover such modifications as fall within the scope of the appended claims.

What is claimed is:

1. In reading bar-code data in the presence of noise where an analog output signal from a bar-code sensor exhibits amplitude variations dependent upon presence and absence of bars in data fields transported past said sensor as well as upon differences in backgrounds of said fields, and where an expected response to each such bar is of known waveform, the steps of:
   a. normalizing said output signal to minimize said variations;
   b. converting the normalized signal to a digital signal at a sample interval small compared to the period of said known waveform;
   c. storing a digital reference set of products formed by multiplying each quantization level of said digital signal by each sample of said known waveform taken at said sample interval;
   d. for each sample interval along said output signal selecting members of said reference set dependent upon the sample interval of said known waveform and the amplitude of said digital signal, and summing selected ones of said members for a plurality of adjacent sample intervals along said output signal to form one point on a correlation output function; and
   e. continuously sensing said correlation output function for the presence of predetermined bar dependent characteristics.

2. The method set forth in claim 1, which includes:
   a. converting said correlation output function from a discrete digital signal to a continuous analog signal;
   b. smoothing said continuous analog signal;
   c. sensing each main lobe in said continuous analog signal which has an amplitude exceeding a predetermined threshold;
   d. differentiating each said main lobe in said smoothed analog signal to indicate a time occurrence of a main lobe peak; and
   e. signaling each said time occurrence in which a differentiated main lobe has a width exceeding a threshold width to indicate travel of a bar past said sensor.

3. In a bar-code reading system including a sensor for reading bar-coded data fields printed on documents, the combination which comprises:
   a. means to move said documents as a serial stream past said sensor to produce a time amplitude variable signal;
   b. logarithmic normalizing means operating upon said signal for reducing amplitude variations in said signal;
   c. cross-correlation means responsive to stored representations of a known waveform representing an expected response to the movement of a bar past said sensor for producing a correlation output signal in real time; and
   d. means to compare said correlation output signal with predetermined limits to signal the occurrence of a bar each time said correlation output signal satisfies said limits.

4. The combination set forth in claim 3 in which said limits comprise a combination of amplitude and period thresholds of main lobes occurring in said correlation output signal.

5. The combination set forth in claim 3 wherein said logarithmic normalizing means is a logarithmic amplifier.

6. The combination set forth in claim 3, wherein said cross-correlation means includes digital circuits for solving the equation $$y(t) = \int_{t_1}^{t_2} m(T)x(t+T)dT,$$

where $y(t)$ is said correlation output signal, $m(T)$ is said known waveform corresponding to said expected response, and $x(t+T)$ is a delayed sensor signal.

7. A system for indicating the presence of a bar dependent component in a noisy signal produced by sensing the movement of bars printed on a document surface past a sensor, which comprises:
   a. conditioning means for logarithmically normalizing said signal, for removing low frequency components, and for converting said signal to a digital signal in real time as a plurality of documents having bar-code information printed thereon are transported serially past said sensor for production of said signal;
   b. cross-correlation filtering means for receiving said digital signal in real time and for generating successive correlation output data points to generate an output signal based upon successive sets of quantization levels of said digital signal and upon a like set of digitized reference levels representative of a known waveform response to movement of said bars past said sensor;
   c. bar detection means responsive to said output signal for indicating a main lobe which occurs in said output signal and satisfies a predetermined amplitude limit; and
   d. circuit means responsive to each said mail lobe which satisfies a predetermined time limit for indicating the detection of a bar.

8. The combination set forth in claim 7 wherein said conditioning means includes, in series, a first logarithmic amplifier for normalizing the variation in amplitude of said noisy signal resulting from variations in background on said document surface, and a differentiator for removing low frequency components from the normalized output of said first amplifier.

9. The combination set forth in claim 8 including a rectifier producing an absolute value signal from the output of said differentiator, and a second logarithmic amplifier for normalizing the variations in amplitude of said absolute value signal.

10. The combination set forth in claim 7 wherein said cross-correlation filtering means is digital circuitry performing a cross-correlation between said digital signal and a memory function $m(t)$ represented by the equation:

$$m(t) = [\log (\sin 2\pi t/T_R)] [\text{sgn} (\pi - 2\pi t/T_B)], \text{ where}$$

$T_B$ is the period of $m(t)$ and sgn $u = 1, u < 0$ $u = -1, u > 0.$

11. The combination set forth in claim 7 wherein said cross-correlation filtering means is digital circuitry for solving the equation $$y(t) = \int_{t_1}^{t_2} m(T)x(t+T)dt,$$

where $y(t)$ is said output signal, $m(T)$ is a memory function having a waveform corresponding to an expected sensor response, and $x(t+T)$ is a delayed sensor response.

12. The combination set forth in claim 7, wherein said bar detection means includes in a serial connection a D/A converter for converting said output signal into a continuous analog signal, a Bessel filter for smoothing said analog signal, a level detector for extracting from said analog signal that portion of said main lobe having an amplitude exceeding a threshold value, a differentiator to yield a zero-crossing of said main lobe, and a zero-cross detector for generating a time occurrence signal of a main lobe peak.

13. The combination set forth in claim 12, wherein said circuit means includes in serial connection a width detector for sensing the width of said time occurrence signal and for generating a bar presence signal, and a bar detector flip-flop which is set upon the occurrence of said bar presence signal.

14. The combination set forth in claim 13, wherein said circuit means further includes a shift register responsive to said bar detector flip-flop for resetting said cross-correlation filtering means a delayed time period after the generation of said time occurrence signal, thereby providing a real time analysis of said noisy signal.

15. A bar-coding reading system for reading a bar-encoded data field in the presence of noise, which comprises:
 a. signal conditioning means for normalizing a sensor response to said data field, including:
  i. a current-to-voltage converter to form a continuous voltage waveform from said sensor response,
  ii. a first logarithmic amplifier operating upon said voltage waveform to remove variations in amplitude caused by differing background colors,
  iii. a differentiator serially connected to said first logarithmic amplifier for removing low frequency noise from said voltage waveform,
  iv. an absolute value rectifier in serial connection with said differentiator for forming a full-wave rectified signal,
  v. a second logarithmic amplifier responsive to said rectified signal for normalizing variations in signal strength produced by reading data field overprint and printing deformations, and
  vi. an A/D converter receiving the normalized output of said second logarithmic amplifier to form plural discrete representations of said sensor response;
 b. digital correlation means operating upon said plural discrete representations for removing high frequency noise, and for forming a digital correlation function comprising a cross-correlation between said sensor response and a memory function corresponding to an expected sensor response;
 c. bar detecting means operating upon said digital correlation function for detecting the presence of a bar in said data field;
 d. bar presence signaling means receiving a time signal from said bar detecting means for measuring the elapsed time to a first return to zero of said time signal, and for generating a bar presence indication if a threshold time period is exceeded by an elapsed time measurement;
 e. delay means initialized by said bar presence signaling means for resetting said digital correlation means a delayed time after said bar presence indication;
 f. bit synchronization means responsive to said bar presence signaling means for synchronizing said bar-code reading system with said sensor response while reading either bar-no-bar or bi-phase modulated data fields; and
 g. synchronization detection means initialized by said bar presence indication and responsive to said bit synchronization means for signaling the occurrence of synchronization between said bar-code reader system and said sensor response.

16. The combination set forth in claim 15, wherein said digital correlation means includes:
 a. a ROM having stored therein program instructions for controlling the operation of said digital correlation means;
 b. a decoder responsive to the output of said ROM for applying said program instructions to succeeding subsystems of said digital correlation means;
 c. a shift register memory means receiving said plural discrete representations under the control of said program instructions for correlating a full-wave sensor response with said memory function;
 d. ROM memory means responsive to said shift register memory means for storing therein products of said memory functions and said plural discrete representations; and
 e. adding means receiving addressed ones of said products from said ROM memory means for forming said digital correlation function.

17. The combination set forth in claim 16, wherein said bar detecting means includes:
 a. a D/A converter for forming a continuous analog signal from said digital correlation function;
 b. low pass filter means responsive to said analog signal and having a linear phase characteristic for smoothing discontinuities in said analog signal;
 c. level detecting means operating upon the output of said filter means for sensing a main lobe of said analog signal;
 d. a differentiator responsive to said level detecting means for converting said main lobe to a bi-polar signal having a zero-crossover at a main lobe peak; and
 e. zero-crossover detecting means receiving said bipolar signal for indicating the time of occurrence of said main lobe peak.

18. A system for reading bar-code data in the presence of noise, where analog output signal from a bar-code sensor exhibits amplitude variations dependent upon presence and absence of bars in data fields transported past said sensor and upon differences in backgrounds of said fields, and where an expected response to each such bar is of a known waveform, which comprises:
a. means to normalize said analog output signal to minimize said variations;
b. means to convert the normalized signal to a digital signal at a sample interval small compared to the period of said known waveform;
c. means to store a digital reference set of products formed by multiplying each quantization level of said digital signal by each sample of said known waveform taken at said sample interval;
d. means operative for each sample interval along said analog output signal for selecting members of said digital reference set in dependence upon the sample interval of said known waveform and the corresponding amplitude of said digital signal, and for summing selected ones of said members to form one point on a correlation output function; and
e. means for continuously sensing said correlation output function to detect the presence of predetermined bar dependent characteristics.

* * * * *